US008594875B2

(12) United States Patent
Abe et al.

(10) Patent No.: US 8,594,875 B2
(45) Date of Patent: Nov. 26, 2013

(54) POWER OUTPUT SYSTEM

(75) Inventors: Noriyuki Abe, Saitama (JP); Shigemitsu Akutsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/395,061

(22) PCT Filed: Sep. 24, 2010

(86) PCT No.: PCT/JP2010/066607

§ 371 (c)(1), (2), (4) Date: Mar. 8, 2012

(87) PCT Pub. No.: WO2011/037211

PCT Pub. Date: Mar. 31, 2011

(65) Prior Publication Data

US 2012/0179320 A1 Jul. 12, 2012

(30) Foreign Application Priority Data

Sep. 28, 2009 (JP) ................................ 2009-223210

(51) Int. Cl.
*B60W 20/00* (2006.01)

(52) U.S. Cl.
USPC ........................................ 701/22; 180/65.285

(58) Field of Classification Search
USPC ............. 701/22; 180/65.285, 65.22; 903/902, 903/915, 951, 952; 477/3; 74/665 A; 60/716, 718
See application file for complete search history.

(56) References Cited

U.S. PATENT DOCUMENTS

| | | | | |
|---|---|---|---|---|
| 6,762,887 | B2 * | 7/2004 | Tomioka | 359/691 |
| 2003/0106729 | A1 * | 6/2003 | Noreikat et al. | 180/65.7 |
| 2004/0251064 | A1 | 12/2004 | Imai | |

FOREIGN PATENT DOCUMENTS

| | | | |
|---|---|---|---|
| JP | 2005-001563 | A | 1/2005 |
| JP | 2005-127485 | A | 5/2005 |
| JP | 2005-351381 | A | 12/2005 |
| JP | 2007-290677 | A | 11/2007 |
| JP | 2008-067592 | A | 3/2008 |
| JP | 2008-271624 | A | 11/2008 |
| JP | 2009-166723 | A | 7/2009 |
| JP | 2009-173128 | A | 8/2009 |
| JP | 2009-179208 | A | 8/2009 |

OTHER PUBLICATIONS

International Search Report.

* cited by examiner

*Primary Examiner* — Marthe Marc-Coleman
(74) *Attorney, Agent, or Firm* — Arent Fox LLP

(57) ABSTRACT

There is provided a power output system 1 comprising an internal combustion engine 6, an electric motor 2 and a transmission 20 including two transmission shafts 11, 16 which are connected to the internal combustion engine 6. The electric motor 2 includes a stator 3, a primary rotor 4 and a secondary rotor 5. The primary rotor 4 is connected to either of the two transmission shafts 11, 16. The secondary rotor 5 is connected to drive shafts 9, 9. And, the other transmission shaft of the two transmission shafts 11, 16 transmits power to the drive shafts 9, 9 without involving the electric motor 2.

15 Claims, 63 Drawing Sheets

<VEHICLE STOPPING>

FIG. 18
(a)
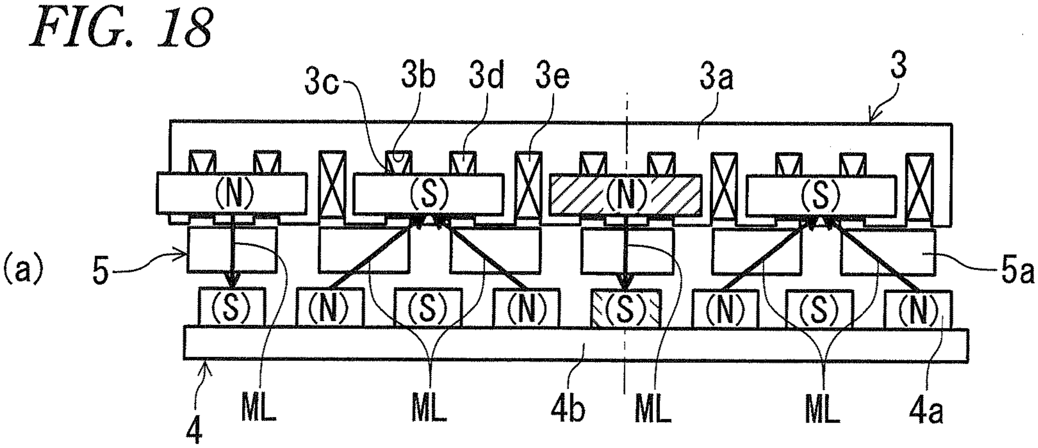
(b)
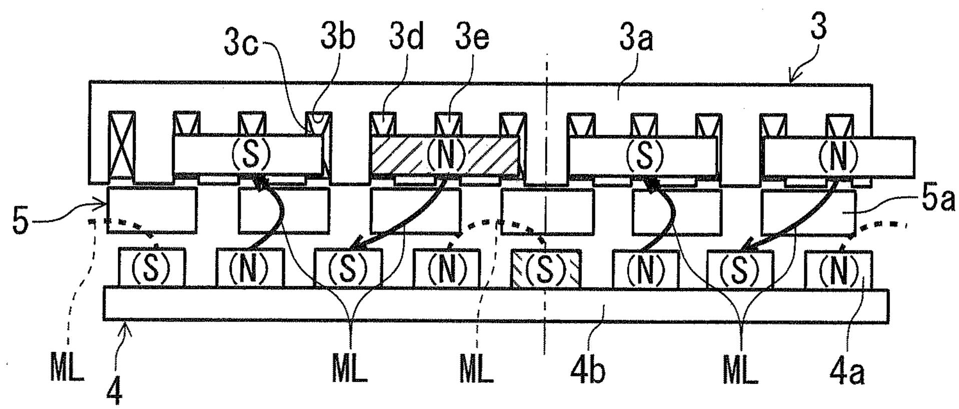
(c)
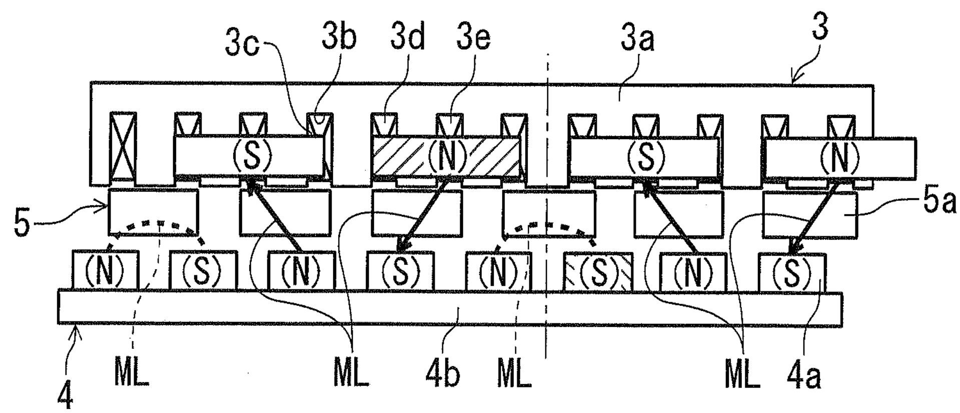

<VEHICLE STOPPING>

<TORQUE COMBINING DRIVE ACCELERATION PATTERN>
(LOW MODE)

<2ND DRIVING FIRST MODE ENGINE DRIVING ASSIST>

<2ND DRIVING SECOND MODE BATTERY CHARGING>

FIG. 34
(a)
<2ND PRE3 MODE>
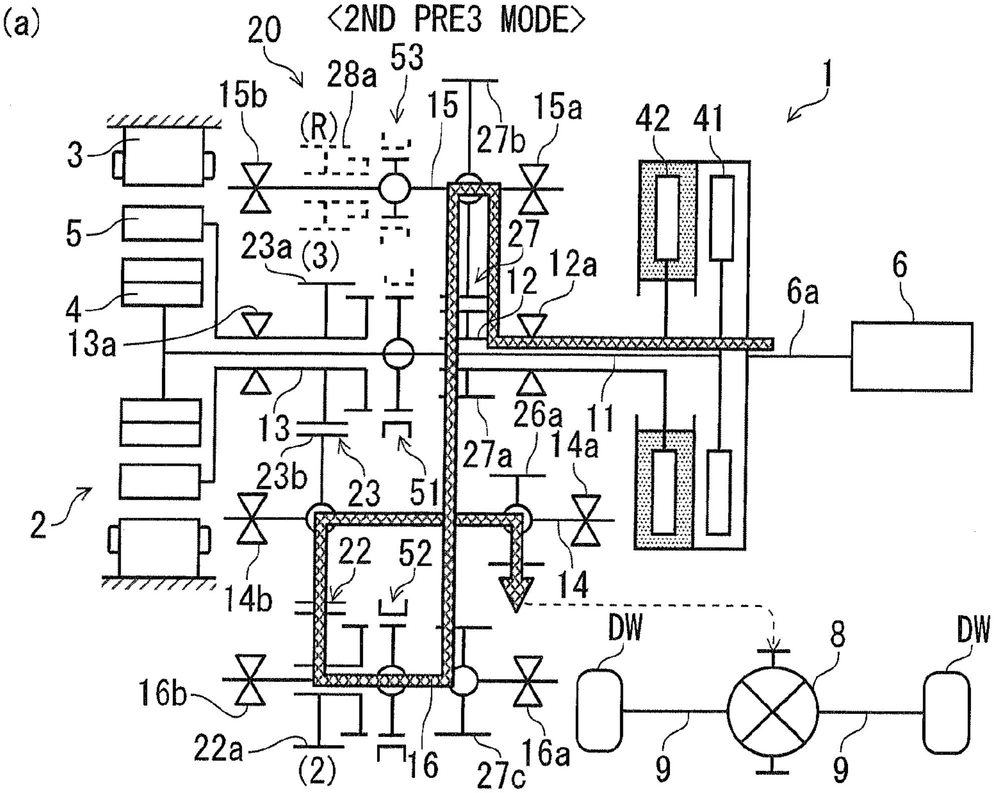
(b)
<3RD POST2 MODE>
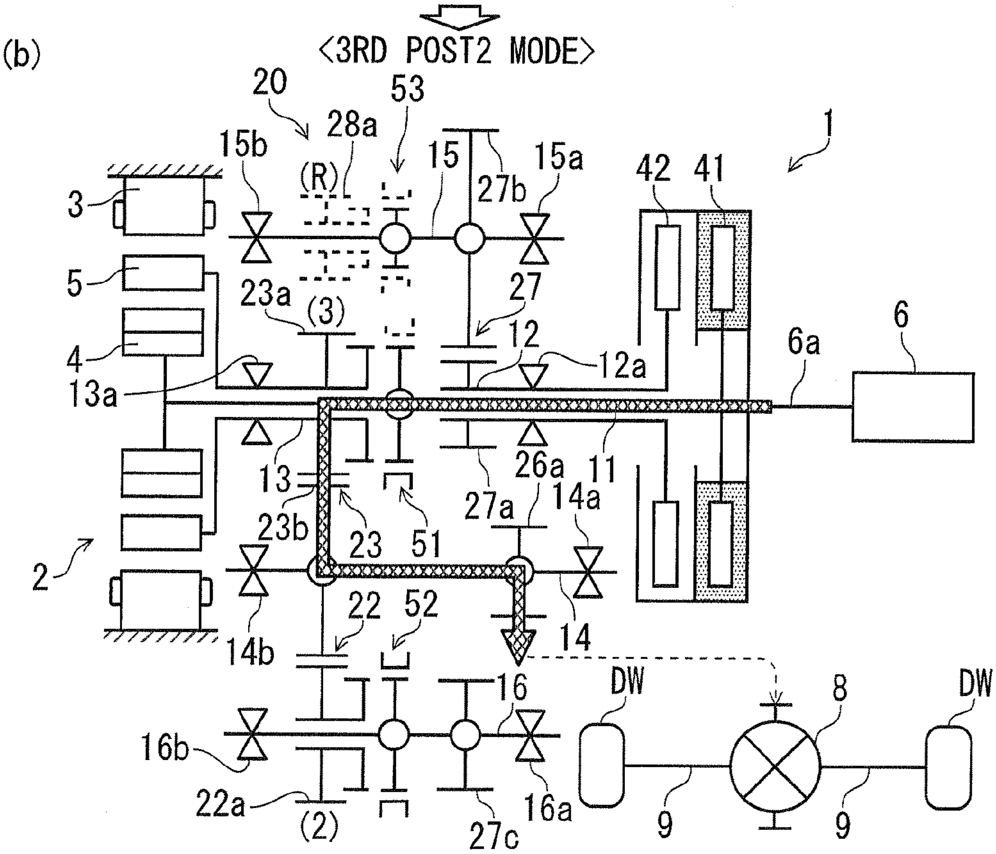

<3RD DRIVING FIRST MODE BATTERY CHARGING>

<MOTOR DRIVING SECOND START MODE>

<VEHICLE STOPPING ENGINE START>

*FIG. 42*

| VEHICLE STATES | | CLUTCHES | | CHANGE-SPEED SHIFTERS | | MOTOR | | | ENGINE |
|---|---|---|---|---|---|---|---|---|---|
| FUNCTION | STATES | PRIMARY | SECONDARY | PRIMARY | SECONDARY | REVOLVING DIRECTION OF REVOLVING MAGNETIC FIELD OF STATOR | TORQUE APPLICATION DIRECTION IN STATOR | STATES | |
| TORQUE COMBINING DRIVE | Low | ● | | – | – | REVERSE | FORWARD | CHARGING | DRIVING |
| | | ● | | – | – | FORWARD | FORWARD | DRIVING | DRIVING |
| | Low Pre2 | ● | | – | 2 | REVERSE | FORWARD | CHARGING | DRIVING |
| | | ● | | – | 2 | FORWARD | FORWARD | DRIVING | DRIVING |
| NORMAL DRIVING | 2nd | | ● | – | 2 | × | × | × | ○ |
| | | ● | ● | – | 2 | FORWARD | FORWARD | DRIVING | ○ |
| | | ● | ● | – | 2 | FORWARD | REVERSE | CHARGING | ○ |
| | 2nd Pre3 | | ● | 3 | 2 | FORWARD | FORWARD | DRIVING | ○ |
| | | | ● | 3 | 2 | FORWARD | REVERSE | CHARGING | ○ |
| | 3rd Post2 | ● | | 3 | 2 | FORWARD | FORWARD | DRIVING | ○ |
| | | ● | | 3 | 2 | FORWARD | REVERSE | CHARGING | ○ |
| | 3rd | ● | | 3 | – | FORWARD | FORWARD | DRIVING | ○ |
| | | ● | | 3 | – | FORWARD | REVERSE | CHARGING | ○ |
| MOTOR DRIVING | (3rd) | | | 3 | – | FORWARD | FORWARD | DRIVING | |
| | | | | 3 | – | FORWARD | REVERSE | REGENERATING | |
| ENGINE START DURING MOTOR DRIVING | (3rd) | ● | | 3 | – | FORWARD | FORWARD | DRIVING | STARTING |
| | | | ● | 3 | 2 | FORWARD | FORWARD | DRIVING | STARTING |
| Parking | E START | ● | | – | – | REVERSE | REVERSE | DRIVING | STARTING |
| | GENERATION | ● | | – | – | REVERSE | FORWARD | CHARGING | ○ |

FIG. 47
(a) <3RD PRE4 MODE>
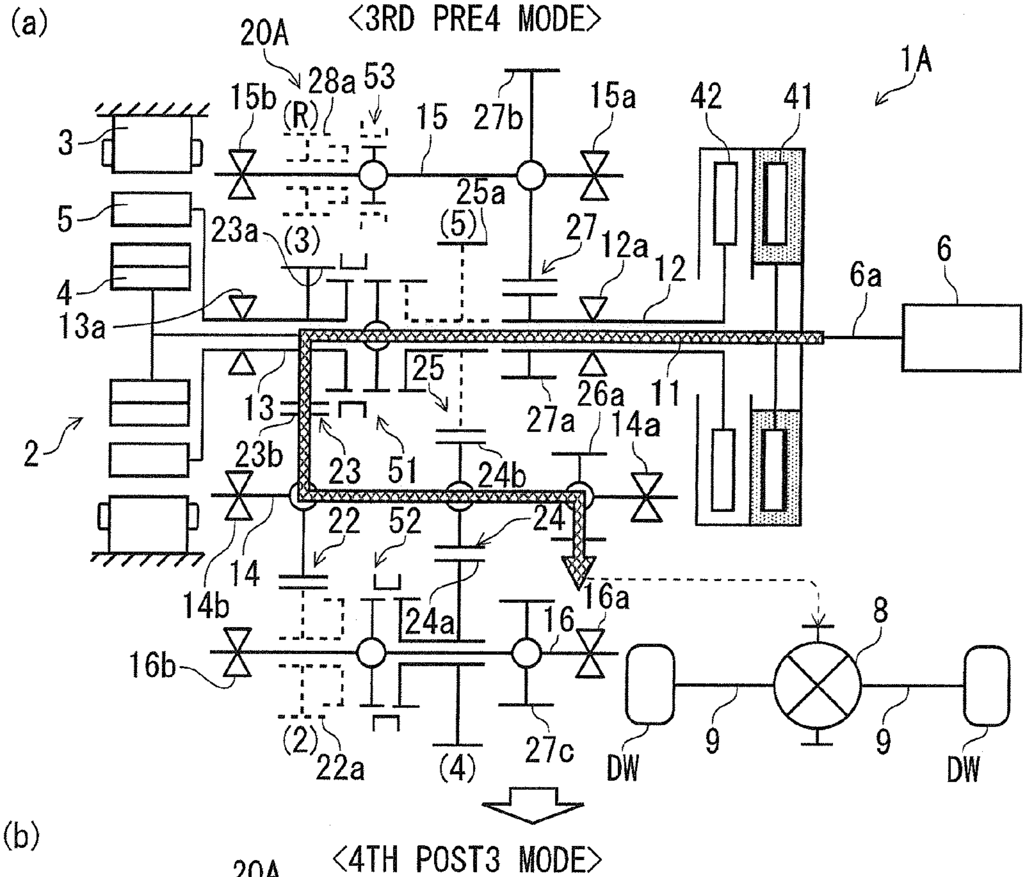
(b) <4TH POST3 MODE>
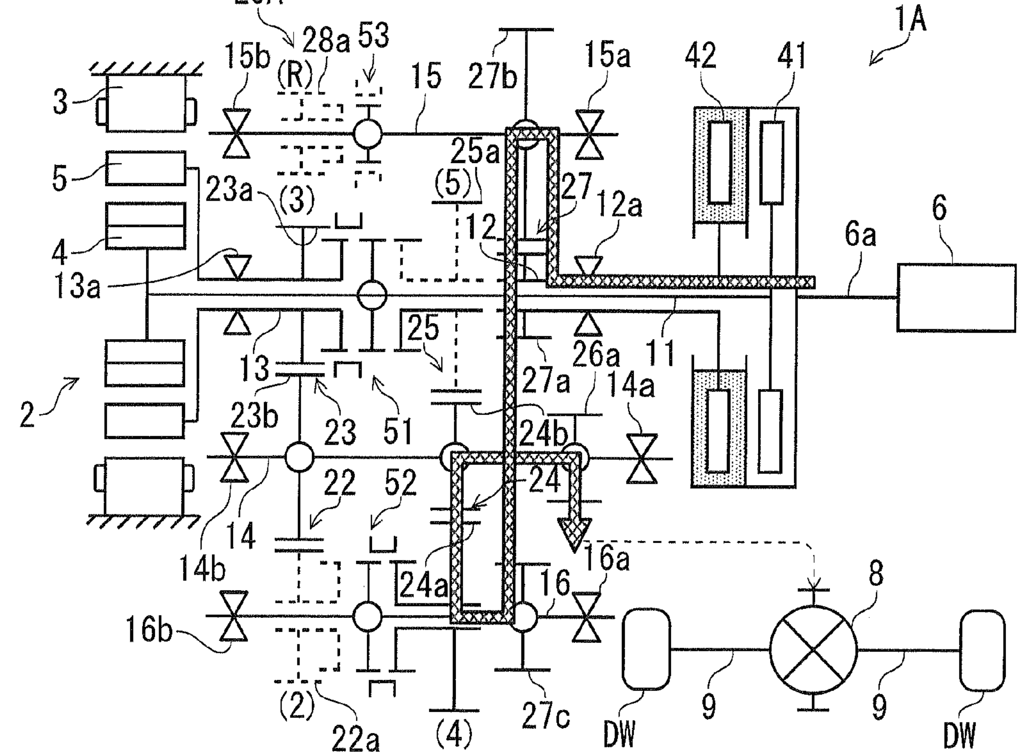

*FIG. 54*
(a)
<4TH PRE5 MODE>
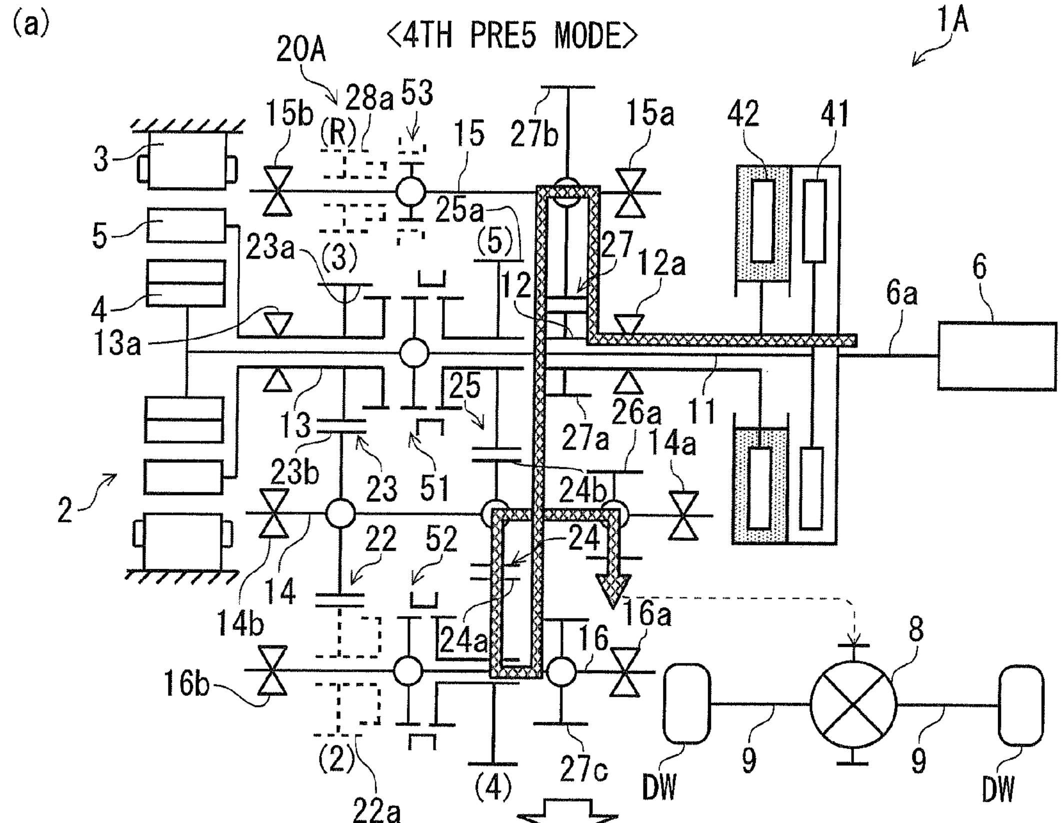
(b)
<5TH POST4 MODE>
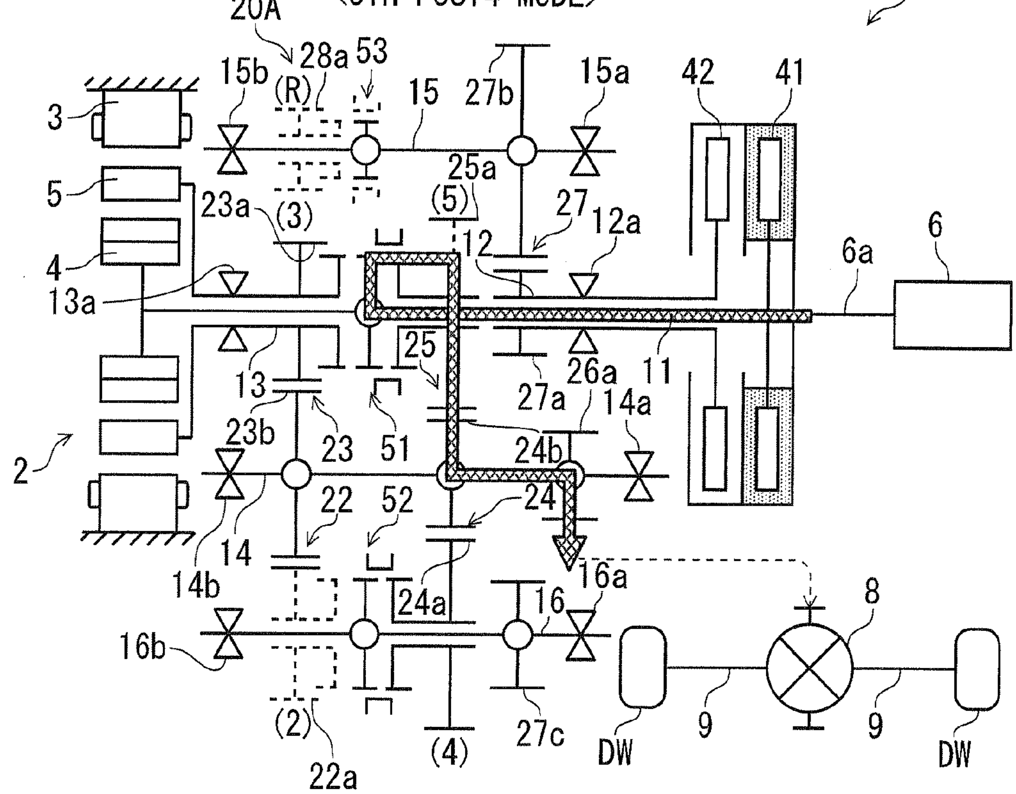

FIG. 58 <REVERSE DRIVING FIRST MODE ENGINE DRIVING ASSIST>
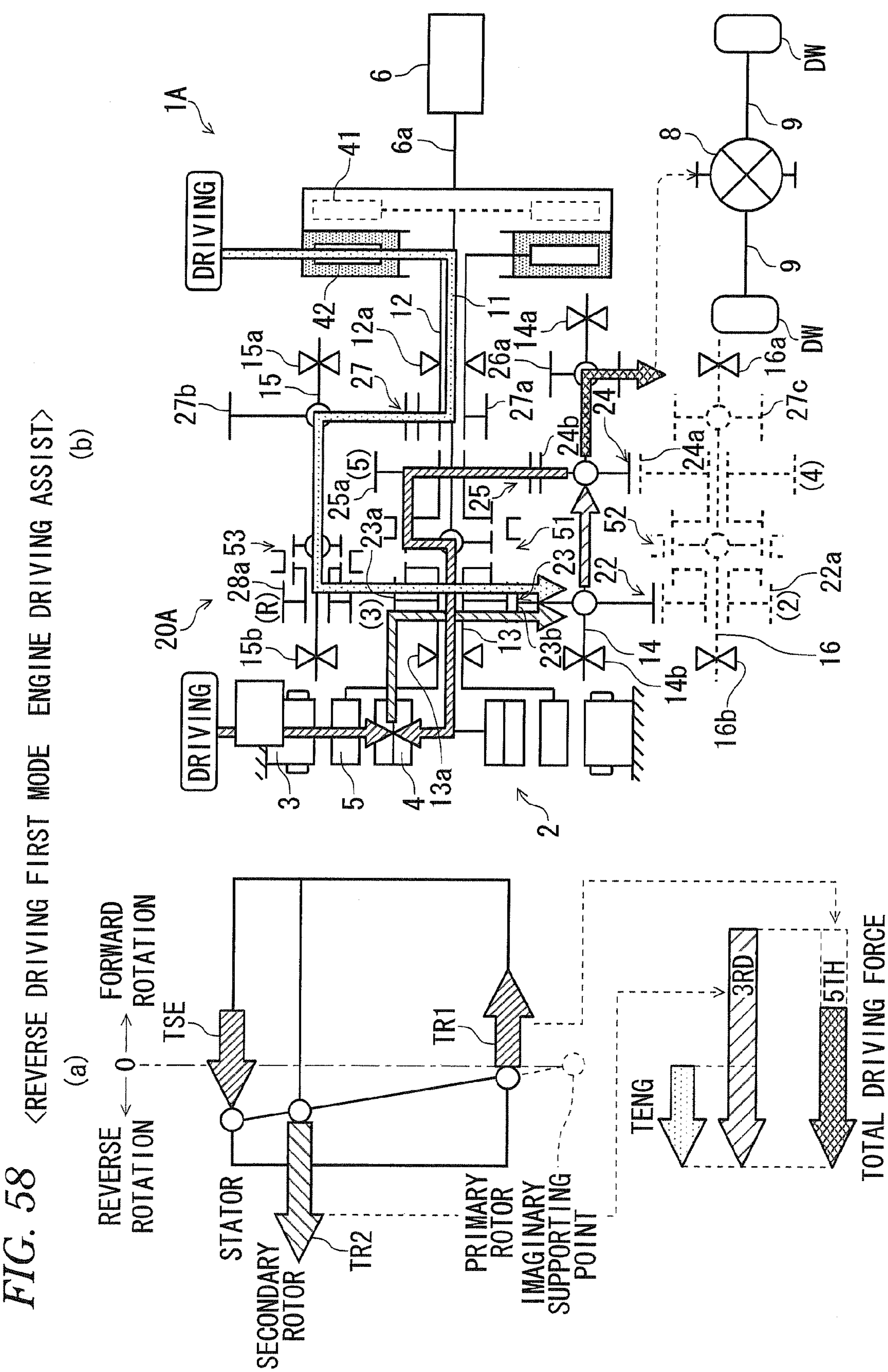

*FIG. 59*

| VEHICLE STATES | | CLUTCHES | | CHANGE-SPEED SHIFTERS | | MOTOR | | | ENGINE |
|---|---|---|---|---|---|---|---|---|---|
| FUNCTION | STATES | PRIMARY | SECONDARY | PRIMARY | SECONDARY | REVOLVING DIRECTION OF REVOLVING MAGNETIC FIELD OF STATOR | TORQUE APPLICATION DIRECTION IN STATOR | STATES | |
| TORQUE COMBINING DRIVE | Low | ● | | – | – | REVERSE | FORWARD | CHARGING | DRIVING |
| | | ● | | – | – | FORWARD | FORWARD | DRIVING | DRIVING |
| | Low Pre2 | ● | | – | 2 | REVERSE | FORWARD | CHARGING | DRIVING |
| | | ● | | – | 2 | FORWARD | FORWARD | DRIVING | DRIVING |
| NORMAL DRIVING | 2nd | | ● | – | 2 | × | × | × | ○ |
| | | ● | ● | – | 2 | FORWARD | FORWARD | DRIVING | ○ |
| | | ● | ● | – | 2 | FORWARD | REVERSE | CHARGING | ○ |
| | 2nd Pre3 | | ● | 3 | 2 | FORWARD | FORWARD | DRIVING | ○ |
| | | | ● | 3 | 2 | FORWARD | REVERSE | CHARGING | ○ |
| | 3rd Post2 | ● | | 3 | 2 | FORWARD | FORWARD | DRIVING | ○ |
| | | ● | | 3 | 2 | FORWARD | REVERSE | CHARGING | ○ |
| | 3rd | ● | | 3 | – | FORWARD | FORWARD | DRIVING | ○ |
| | | ● | | 3 | – | FORWARD | REVERSE | CHARGING | ○ |
| | 3rd Pre4 | ● | | 3 | 4 | FORWARD | FORWARD | DRIVING | ○ |
| | | ● | | 3 | 4 | FORWARD | REVERSE | CHARGING | ○ |
| | 4th Post3 | | ● | 3 | 4 | FORWARD | FORWARD | DRIVING | ○ |
| | | | ● | 3 | 4 | FORWARD | REVERSE | CHARGING | ○ |
| | 4th | | ● | – | 4 | × | × | × | ○ |
| | | ● | ● | – | 4 | FORWARD | FORWARD | DRIVING | ○ |
| | | ● | ● | – | 4 | FORWARD | REVERSE | CHARGING | ○ |
| | 4th Pre5 | | ● | 5 | 4 | FORWARD | FORWARD | DRIVING | ○ |
| | | | ● | 5 | 4 | FORWARD | REVERSE | CHARGING | ○ |
| | 5th Post4 | ● | | 5 | 4 | FORWARD | FORWARD | DRIVING | ○ |
| | | ● | | 5 | 4 | FORWARD | REVERSE | CHARGING | ○ |
| | 5th | ● | | 5 | – | FORWARD | FORWARD | DRIVING | ○ |
| | | ● | | 5 | – | FORWARD | REVERSE | CHARGING | ○ |
| MOTOR DRIVING | (3rd) | | | 3 | – | FORWARD | FORWARD | DRIVING | |
| | | | | 3 | – | FORWARD | REVERSE | REGENERATING | |
| | (5th) | | | 5 | – | FORWARD | FORWARD | DRIVING | |
| | | | | 5 | – | FORWARD | REVERSE | REGENERATING | |
| ENGINE START DURING MOTOR DRIVING | (3rd) | ● | | 3 | – | FORWARD | FORWARD | DRIVING | STARTING |
| | | | ● | 3 | 2 | FORWARD | FORWARD | DRIVING | STARTING |
| | | | ● | 3 | 4 | FORWARD | FORWARD | DRIVING | STARTING |
| | (5th) | ● | | 5 | – | FORWARD | FORWARD | DRIVING | STARTING |
| | | | ● | 5 | 2 | FORWARD | FORWARD | DRIVING | STARTING |
| | | | ● | 5 | 4 | FORWARD | FORWARD | DRIVING | STARTING |
| Parking | E START | ● | | – | – | FORWARD | REVERSE | DRIVING | STARTING |
| | GENERATION | ● | | – | – | FORWARD | FORWARD | CHARGING | ○ |

PRIOR ART

POWER OUTPUT SYSTEM

CROSS-REFERENCED TO RELATED APPLICATION

This application is a National Stage entry of International Application PCT/JP2010/066607, filed Sep. 24, 2010, which claims priority to Japanese Patent Application No. 2009-223210, filed Sep. 28, 2009, the disclosure of the prior applications are hereby incorporated in its entirety by reference.

TECHNICAL FIELD

The prevent invention relates to a power output system and more particularly to a power output system for a hybrid vehicle.

BACKGROUND ART

Conventionally, a power output system for a hybrid vehicle is known which includes, for example, an engine, a motor, and a planetary gear mechanism including a sun gear, a ring gear, a plurality of planet gears which mesh with the sun gear and the ring gear and a planet carrier which supports the plurality of planet gears (for example, refer to Patent Literature 1).

As FIG. 63 shows, in a power output system 500 described in Patent literature 1, a primary motor 504 as a generator is connected to a sun gear 502 of a planetary gear mechanism 501, an engine 506 is connected to a carrier 505, and drive shafts 508 are connected to a ring gear 507. By this arrangement, torque of the engine 506 is divided between the ring gear 507 and the sun gear 502 by the planetary gear mechanism 501. The partial torque divided to the sun gear 507 is transmitted to the drive shafts 508. In the power output system 500 described in Patent Literature 1 above, part of the torque of the engine 506 is divided to the drive shafts 508, and therefore, a secondary motor 509 is connected to the ring gear 507 to assist in transmitting torque to the drive shafts 508.

RELATED ART LITERATURE

Patent Literature

Patent Literature 1: JP-2007-290677-A

SUMMARY OF THE INVENTION

Problem that the Invention is to Solve

In the power output system 500 described in Patent Literature 1 above, however, since the power dividing method is adopted in which the engine 506 is connected to the carrier 505, engine torque is divided inevitably. When an equal torque to the engine torque needs to be transmitted to the drive shafts 508, the secondary motor 509 needs to provide motor torque to compensate for the torque divided to the sun gear 502. This makes the construction of the power output system 500 complicated to make, in turn, the resulting power output system 500 expensive, leading to a problem that it becomes difficult to mount the resulting power output system 500 in a hybrid vehicle.

The invention has been made in view of these situations, and an object thereof is to provide a power output system which can transmit combined torque made up of engine torque and motor torque.

Means for Solving the Problem

In one aspect of the invention, a power output system comprises an internal combustion engine, an electric motor, and a transmission including two transmission shafts which are connected to the internal combustion engine. The electric motor comprises a stator which generates a revolving magnetic field, a primary rotor which includes a plurality of magnetic pole portions and faces the stator in a radial direction, and a secondary rotor which includes a plurality of magnetically soft portions and which is provided between the stator and the primary rotor and is configured so as to rotate while keeping a collinear relation between a revolving speed of a magnetic field of the stator, a rotating velocity of the primary rotor and a rotating velocity of the secondary rotor. The primary rotor is connected to either of the two transmission shafts, the secondary rotor is connected to a drive shaft, and the other transmission shaft of the two transmission shafts transmits power to the drive shaft without involving the electric motor.

In another aspect of the invention, the primary rotor has a row of magnetic poles which includes the plurality of magnetic pole portions which are provided in a predetermined number and are aligned in a predetermined direction and which is disposed so that any two adjacent magnetic poles have different polarities. The stator has a row of armatures which is disposed so as to face the row of magnetic poles to generate the revolving magnetic field which moves in the predetermined direction between the row of magnetic poles and the stator by a predetermined number of armature magnetic poles which are generated in a plurality of armatures. The secondary rotor has a row of magnetically soft portions which includes the magnetically soft portions which are provided in a predetermined number and are aligned at intervals in the predetermined direction and which is disposed so as to be positioned between the row of magnetic poles and the row of armatures. A ratio of the number of the armature magnetic poles to the number of the magnetic poles and to the number of the magnetically soft portions in a predetermined section along the predetermined direction is set to $1:m:(1+m)/2$ $(m \neq 1.0)$.

According to some aspects of the invention, the row of magnetically soft portions of the secondary rotor is disposed so as to be positioned between the row of magnetic poles of the primary rotor and the row of armatures of the stator which face each other. The pluralities of magnetic poles, armatures and magnetically soft portions which make up respectively the row of magnetic poles, the row of armatures and the row of magnetically soft portions are aligned in the predetermined direction. In addition, a plurality of armature magnetic poles are generated in association with supply of electric power to the row of armatures, and a shifting magnetic field is generated between the row of magnetic poles and the row of armatures by the armature magnetic poles so generated, and the shifting magnetic field so generated shifts in the predetermined direction. Further, any two adjacent magnetic poles have different polarities, and a space is provided between any two adjacent magnetically soft portions. The shifting magnetic field is generated by the plurality of armature magnetic poles and the magnetically soft portions are disposed between the row of magnetic poles and the row of armatures, and therefore, the magnetically soft portions are magnetized by the armature magnetic poles and the magnetic poles. By this magnetization and the spaces defined any two adjacent magnetically soft portions, a magnetic line of force is generated so as to connect the magnetic poles, the magnetically soft portions and the armature magnetic poles together. In addition, the electric power supplied to the armatures is converted to power by the action of magnetic force by the magnetic line of force and is then outputted from the primary rotor, the stator or the secondary rotor.

For example, when the electric motor of the invention is configured in accordance with the following conditions (a) and (b), the shifting magnetic field, the relation of speed between the primary and secondary rotors and the relations of torque between the primary and secondary rotors and the stator will be expressed as below. In addition, an equivalent circuit which corresponds to the electric motor is depicted in FIG. 62.

(a) The electric motor is a rotary machine and the armatures have coils of three phases including phase U, phase V and phase W.

(b) There are two armature magnetic poles and four magnetic poles. Namely, a value of 1 is attained as the number of armature magnetic pole pairs, assuming that an N pole and an S pole of the armature magnetic poles make a pole pair, and a value of 2 is attained for the number of magnetic pole pairs, assuming that an N pole and an S pole of the magnetic poles make a pole pair. There are three magnetically soft portions.

When used in this description, the "pole pair" denotes a pair of N pole and S pole.

In this case, the magnetic flux Ψk1 of a magnetic pole which passes through a first magnetically soft portion in the magnetically soft portions is expressed by Equation (1).

[Equation 1]

$$\Psi k1 = \psi f \cos[2(\theta 2 - \theta 1)] \quad (1)$$

where, ψf denotes a maximum value for the magnetic flux of the magnetic pole, and θ1 and θ2 denote, respectively, a rotational angle position of the magnetic pole and a rotational angle position of the magnetically soft portion relative to the U-phase coil. In addition, in this case, the ratio of the number of pole pairs of the armature magnetic poles to the number of pole pairs of the magnetic poles assumes the value of 2.0, and therefore, the magnetic flux of the magnetic pole revolves (changes) at a period which is twice that of the shifting magnetic field. Thus, in order to express this, (θ2−θ1) is multiplied by the value of 2.0 in Equation (1) above.

Consequently, the magnetic flux Ψu of the magnetic pole which passes through the U-phase coil via the first magnetically soft portion is expressed by Equation (2) below which is obtained by multiplying Equation (1) by cos θ2.

[Equation 2]

$$\Psi u1 = \psi f \cos[2(\theta 2 - \theta 1)] \cos \theta 2 \quad (2)$$

Similarly, the magnetic flux Ψk1 of a magnetic pole which passes through a second magnetically soft portion in the magnetically soft portions is expressed by Equation (3).

[Equation 3]

$$\Psi k2 = \psi f \cdot \cos\left[2\left(\theta 2 + \frac{2\pi}{3} - \theta 1\right)\right] \quad (3)$$

The rotational angle position of the second magnetically soft portion relative to the armature advances further by 2π/3 than the first magnetically soft portion, and in order to express this, 2π/3 is added to θ2 in Equation (3) above.

Consequently, the magnetic flux Ψu of the magnetic pole which passes through the U-phase coil via the second magnetically soft portion is expressed by Equation (4) below which is obtained by multiplying Equation (3) by cos(θ2+2π/3).

[Equation 4]

$$\Psi u2 = \psi f \cdot \cos\left[2\left(\theta 2 + \frac{2\pi}{3} - \theta 1\right)\right] \cos\left(\theta 2 + \frac{2\pi}{3}\right) \quad (4)$$

Similarly, the magnetic flux Ψu3 of a magnetic pole which passes through the U-phase coil via a third magnetically soft portion in the magnetically soft portions is expressed by Equation (5).

[Equation 5]

$$\Psi u3 = \psi f \cdot \cos\left[2\left(\theta 2 + \frac{4\pi}{3} - \theta 1\right)\right] \cos\left(\theta 2 + \frac{4\pi}{3}\right) \quad (5)$$

In the electric motor shown in FIG. 62, the magnetic flux Ψu of the magnetic pole which passes through the U-phase coil via the magnetically soft portion becomes a sum of the magnetic fluxes Ψu1 to Ψu3 which are expressed by Equations (2), (4) and (5) above and is expressed by Equation (6) below.

[Equation 6]

$$\Psi u = \psi f \cdot \cos[2(\theta 2 - \theta 1)]\cos\theta 2 + \psi f \cdot \cos\left[2\left(\theta 2 + \frac{2\pi}{3} - \theta 1\right)\right]\cos\left(\theta 2 + \frac{2\pi}{3}\right) + \psi f \cdot \cos\left[2\left(\theta 2 + \frac{4\pi}{3} - \theta 1\right)\right]\cos\left(\theta 2 + \frac{4\pi}{3}\right) \quad (6)$$

In addition, when Equation (6) is generalized, the magnetic flux Ψu of the magnetic pole which passes through the U-phase coil via the magnetically soft portion is expressed by Equation (7) below.

[Equation 7]

$$\Psi u = \sum_{i=1}^{b} \psi f \cdot \cos\left\{a\left[\theta 2 + (i-1)\frac{2\pi}{b} - \theta 1\right]\right\} \cos\left\{c\left[\theta 2 + (i-1)\frac{2\pi}{b}\right]\right\} \quad (7)$$

where, a, b and c denote the number of pole pairs of the magnetic pole, the number of magnetically soft portions and the number of pole pairs of the armature magnetic pole, respectively.

In addition, when Equation (7) is transformed based on the formula of sum and product of a triangular function, Equation (8) below is obtained.

[Equation 8]

$$\Psi u = \sum_{i=1}^{b} \frac{1}{2}\psi f\left\{\cos\left[(a+c)\theta 2 - a\cdot\theta 1 + (a+c)(i-1)\frac{2\pi}{b}\right] + \cos\left[(a-c)\theta 2 - a\cdot\theta 1 + (a-c)(i-1)\frac{2\pi}{b}\right]\right\} \quad (8)$$

When Equation (8) is rearranged based on cos(θ+2π)=cos θ while assuming b=a+c, Equation (9) is obtained.

[Equation 9]

$$\Psi u=\frac{b}{2}\cdot\psi f\cdot\cos[(a+c)\theta 2-a\cdot\theta 1]+\sum_{i=1}^{b}\frac{1}{2}\cdot\psi f\left\{\cos\left[(a-c)\theta 2-a\cdot\theta 1+(a-c)(i-1)\frac{2\pi}{b}\right]\right\}\tag{9}$$

Then, when Equation (9) is rearranged based on the addition theorem of the triangular function, Equation (10) is obtained.

[Equation 10]

$$\Psi u=\frac{b}{2}\cdot\psi f\cdot\cos[(a+c)\theta 2-a\cdot\theta 1]+\frac{1}{2}\cdot\psi f\cdot\cos[(a-c)\theta 2-a\cdot\theta 1]\sum_{i=1}^{b}\cos\left[(a-c)(i-1)\frac{2\pi}{b}\right]-\frac{1}{2}\cdot\psi f\cdot\sin[(a-c)\theta 2-a\cdot\theta 1]\sum_{i=1}^{b}\sin\left[(a-c)(i-1)\frac{2\pi}{b}\right]\tag{10}$$

When a second term of a right-hand side of Equation (10) is rearranged based on the summation of series or Euler's formula while assuming a−c≠0, the second term assumes a value of 0 as is shown in Equation (11) below.

[Equation 11]

$$\begin{aligned}\sum_{i=1}^{b}\cos\left[(a-c)(i-1)\frac{2\pi}{b}\right]&=\sum_{i=1}^{b-1}\frac{1}{2}\left\{e^{j\left[(a-c)\frac{2\pi}{b}i\right]}+e^{-j\left[(a-c)\frac{2\pi}{b}i\right]}\right\}\\&=\frac{1}{2}\left\{\frac{e^{j\left[(a-c)\frac{2\pi}{b}b\right]}-1}{e^{j\left[(a-c)\frac{2\pi}{b}\right]}-1}+\frac{e^{-j\left[(a-c)\frac{2\pi}{b}b\right]}-1}{e^{-j\left[(a-c)\frac{2\pi}{b}\right]}-1}\right\}\\&=\frac{1}{2}\left\{\frac{e^{j[(a-c)2\pi]}-1}{e^{j\left[(a-c)\frac{2\pi}{b}\right]}-1}+\frac{e^{-j[(a-c)2\pi]}-1}{e^{-j\left[(a-c)\frac{2\pi}{b}\right]}-1}\right\}\\&=\frac{1}{2}\left\{\frac{0}{e^{j\left[(a-c)\frac{2\pi}{b}\right]}-1}+\frac{0}{e^{-j\left[(a-c)\frac{2\pi}{b}\right]}-1}\right\}\\&=0\end{aligned}\tag{11}$$

In addition, when a third term of the right-hand side of Equation (10) is rearranged based on the summation of series or Euler's formula while assuming a−c≠0, the third term assumes a value of 0 as is shown in Equation (12) below.

[Equation 12]

$$\begin{aligned}\sum_{i=1}^{b}\sin\left[(a-c)(i-1)\frac{2\pi}{b}\right]&=\sum_{i=1}^{b-1}\frac{1}{2}\left\{e^{j\left[(a-c)\frac{2\pi}{b}i\right]}-e^{-j\left[(a-c)\frac{2\pi}{b}i\right]}\right\}\\&=\frac{1}{2}\left\{\frac{e^{j\left[(a-c)\frac{2\pi}{b}b\right]}-1}{e^{j\left[(a-c)\frac{2\pi}{b}\right]}-1}-\frac{e^{-j\left[(a-c)\frac{2\pi}{b}b\right]}-1}{e^{-j\left[(a-c)\frac{2\pi}{b}\right]}-1}\right\}\\&=\frac{1}{2}\left\{\frac{e^{j[(a-c)2\pi]}-1}{e^{j\left[(a-c)\frac{2\pi}{b}\right]}-1}-\frac{e^{-j[(a-c)2\pi]}-1}{e^{-j\left[(a-c)\frac{2\pi}{b}\right]}-1}\right\}\\&=\frac{1}{2}\left\{\frac{0}{e^{j\left[(a-c)\frac{2\pi}{b}\right]}-1}-\frac{0}{e^{-j\left[(a-c)\frac{2\pi}{b}\right]}-1}\right\}\\&=0\end{aligned}\tag{12}$$

Thus, when assuming a−c≠0, the magnetic flux Ψu of the magnetic pole which passes through the U-phase coil via the magnetically soft portion is expressed by Equation (13) below.

[Equation 13]

$$\Psi u=\frac{b}{2}\cdot\psi f\cdot\cos[(a+c)\theta 2-a\cdot\theta 1]\tag{13}$$

In addition, when assuming a/c=α in Equation (13), Equation (14) below is obtained.

[Equation 14]

$$\Psi u=\frac{b}{2}\cdot\psi f\cdot\cos[(\alpha+1)c\cdot\theta 2-\alpha\cdot c\cdot\theta 1]\tag{14}$$

Further, when assuming c·θ2=θe2 and c·θ1=θe1 in Equation (14), Equation (15) below is obtained.

[Equation 15]

$$\Psi u=\frac{b}{2}\cdot\psi f\cdot\cos[(\alpha+1)\theta e2-\alpha\cdot\theta e1]\tag{15}$$

Here, as is clear from the fact that the rotational angle position θ2 of the magnetically soft portion relative to the U-phase coil is multiplied by the number of pole pairs c of the armature magnetic poles, θe2 denotes an electrical angular position of the magnetically soft portion relative to the U-phase coil. In addition, as is clear from the fact that the rotational angle position θ1 of the magnetic pole relative to the U-phase coil is multiplied by the number of pole pairs c of the armature magnetic poles, θe1 denotes an electrical angular position of the magnetic pole relative to the U-phase coil.

Similarly, the magnetic flux Ψu of a magnetic pole which passes through the V-phase coil via the magnetically soft portion is expressed by Equation (16), since an electrical angular position of the V-phase coil advances further by 2π/3 in terms of electrical angle than the U-phase coil. Additionally, the magnetic flux Ψu of a magnetic pole which passes through the W-phase coil via the magnetically soft portion is expressed by Equation (17), since an electrical angular position of the W-phase coil delays further by 2π/3 in terms of electrical angle than the U-phase coil.

[Equation 16]

$$\Psi v = \frac{b}{2} \cdot \psi f \cdot \cos\left[(\alpha + 1)\theta e2 - \alpha \cdot \theta e1 - \frac{2\pi}{3}\right] \quad (16)$$

[Equation 17]

$$\Psi w = \frac{b}{2} \cdot \psi f \cdot \cos\left[(\alpha + 1)\theta e2 - \alpha \cdot \theta e1 + \frac{2\pi}{3}\right] \quad (17)$$

In addition, when the magnetic fluxes Ψu to Ψw which are expressed by Equations (15) to (17) above are time differentiated, Equations (18) to (20) are obtained.

[Equation 18]

$$\frac{d\Psi u}{dt} = -\frac{b}{2} \cdot \psi f\{[(\alpha + 1)\omega e2 - \alpha \cdot \omega e1]\sin[(\alpha + 1)\theta e2 - \alpha \cdot \theta e1]\} \quad (18)$$

[Equation 19]

$$\frac{d\Psi v}{dt} = -\frac{b}{2} \cdot \psi f\left\{[(\alpha + 1)\omega e2 - \alpha \cdot \omega e1]\sin\left[(\alpha + 1)\theta e2 - \alpha \cdot \theta e1 - \frac{2\pi}{3}\right]\right\} \quad (19)$$

[Equation 20]

$$\frac{d\Psi w}{dt} = -\frac{b}{2} \cdot \psi f\left\{[(\alpha + 1)\omega e2 - \alpha \cdot \omega e1]\sin\left[(\alpha + 1)\theta e2 - \alpha \cdot \theta e1 + \frac{2\pi}{3}\right]\right\} \quad (20)$$

where, ωe1 denotes a time differentiated value of θe1, that is, a value obtained when the angular velocity of the primary rotor relative to the stator is converted into electric angular velocity. In addition, ωe2 denotes a time differentiated value of θe2, that is, a value obtained when the angular velocity of the secondary rotor relative to the stator is converted into electric angular velocity.

Further, magnetic fluxes which pass directly through the U-phase, V-phase and W-phase coils by bypassing the magnetically soft portions are extremely small, and hence, influences of those magnetic fluxes can be ignored. Because of this, the time differentiated values dΨu/dt to dΨw/dt of the magnetic fluxes Ψu to Ψw of the magnetic poles which pass through the U-phase to W-phase coils via the magnetically soft portions denote respectively counter electromotive voltages (induced electromotive voltages) which are generated in the U-phase to W-phase coils as the magnetic poles and the magnetically soft portions revolve (shift) relative to the row of armatures.

From this fact, currents Iu, Iv and Iw which flow through the U-phase coil, the V-phase coil and the W-phase coil, respectively, are expressed by Equations (21), (22), (23) below, respectively.

[Equation 21]

$$Iu = I \cdot \sin[(\alpha + 1)\theta e2 - \alpha \cdot \theta e1] \quad (21)$$

[Equation 22]

$$Iv = I \cdot \sin\left[(\alpha + 1)\theta e2 - \alpha \cdot \theta e1 - \frac{2\pi}{3}\right] \quad (22)$$

-continued

[Equation 23]

$$Iw = I \cdot \sin\left[(\alpha + 1)\theta e2 - \alpha \cdot \theta e1 + \frac{2\pi}{3}\right] \quad (23)$$

where, I denotes amplitudes (maximum values) of the currents which flow through the U-phase to W-phase coils.

In addition, from Equations (21) to (23), an electrical angular position θmf of the vector of the shifting magnetic field (the revolving magnetic field) relative to the U-phase coil is expressed by Equation (24) below. In addition, an electrical angular velocity wmf of the shifting magnetic field relative to the U-phase coil is expressed by Equation (25) below.

[Equation 24]

$$\theta mf = (\alpha+1)\theta e2 - \alpha \cdot \theta e1 \quad (24)$$

[Equation 25]

$$\omega mf = (\alpha+1)\omega e2 - \alpha \cdot \omega e1 \quad (25)$$

In addition, when the row of armatures is designed not to shift together with the stator, a mechanical output (power) W excluding a portion thereof corresponding to reluctance which is outputted to the primary and secondary rotors by causing the currents Iu to Iw to flow through the U-phase to W-phase coils, respectively, is expressed by Equation (26).

[Equation 26]

$$W = \frac{d\Psi u}{dt} \cdot Iu + \frac{d\Psi v}{dt} \cdot Iv + \frac{d\Psi w}{dt} \cdot Iw \quad (26)$$

When Equations (18) to (23) are substituted for Equation (26) to rearrange Equation (26), Equation (27) below is obtained.

[Equation 27]

$$W = -\frac{3 \cdot b}{4} \cdot \psi f \cdot I[(\alpha + 1)\omega e2 - \alpha \cdot \omega e1] \quad (27)$$

Further, a relation between the mechanical output W, a torque T1 transmitted to the primary rotor via the magnetic poles (hereinafter, referred to as a "primary torque"), a torque T2 transmitted to the secondary rotor via the magnetically soft portions (hereinafter, referred to as a "secondary torque"), and the electrical angular velocity ω1 of the primary rotor and the electrical angular velocity ω2 of the secondary rotor is expressed by Equation (28) below.

[Equation 28]

$$W = T1 \cdot \omega e1 + T2 \cdot \omega e2 \quad (28)$$

As is clear from Equations (27) and (28), the primary and secondary torques T1 and T2 are expressed by Equation (29) and Equation (30) below, respectively.

[Equation 29]

$$T1 = \alpha \cdot \frac{3 \cdot b}{4} \cdot \psi f \cdot I \quad (29)$$

-continued

[Equation 30]

$$T2 = -(\alpha + 1) \cdot \frac{3 \cdot b}{4} \cdot \psi f \cdot I \quad (30)$$

In addition, when a torque equivalent to the electric power supplied to the row of armatures and the electrical angular velocity wmf of the shifting magnetic field is referred to as a driving equivalent torque Te, this driving equivalent torque Te is expressed by Equation (31) from the fact that the electric power supplied to the row of armatures and the mechanical output W are equal to each other (however, loss is to be ignored) and from Equation (28).

[Equation 31]

$$Te1 = -\frac{3 \cdot b}{4} \cdot \psi f \cdot I \quad (31)$$

Further, Equation (32) is obtained from Equations (29) to (31).

[Equation 32]

$$Te1 = \frac{T1}{\alpha} = \frac{-T2}{(\alpha + 1)} \quad (32)$$

The relation of torque expressed by Equation (32) and the relation of electrical angular velocity expressed by Equation (25) are completely the same as the relations between rotating velocity and torque at the sun gear, the ring gear and the carrier of the planetary gear mechanism. The relation of electrical angular velocity and the ration of torque are not limited to the case where the row of armatures is designed not to rotate together with the stator but can be established under every condition with respect to the movement of the stator relative to the primary and secondary rotors.

Further, as has been described above, the relation of electrical angular velocity expressed by Equation (25) and the relation of torque expressed by Equation (32) are established under the condition of b=a+c and a−c≠0. This condition b=a+c is expressed by b=(p+q)/2, that is, b/q=(1+p/q)/2 when assuming that the number of magnetic poles is p and the number of armature magnetic poles is q. Here, as is clear from the fact that b/q=(1+m)/2 is obtained when assuming p/q=m, the establishment of the condition b=a+c means that a ratio of the number of armature magnetic poles to the number of magnetic poles to the number of magnetically soft portions is 1:m:(1+m)/2. In addition, the establishment of the condition a−c≠0 denotes m≠1.0. According to the electric motor of the invention, the ratio of the number of armature magnetic poles to the number of magnetic poles to the number of magnetically soft portions along the predetermined section in the predetermined direction is set to 1:m:(1+m)/2(m≠1.0). Therefore, it is seen that the relation of electrical angular velocity expressed by Equation (25) and the relation of torque expressed by Equation (32) are established, whereby the electric motor operates properly.

In addition, as is clear from Equations (25) and (32), by setting a=a/c, that is, by setting the ratio of the number of pole pairs of the armature magnetic poles to the number of pole pairs of the magnetic poles, the relation of electrical angular velocity between the shifting magnetic field, the stator and the secondary rotor and the relation of torque between the primary and secondary rotors and the stator can be set freely. Consequently, the degree of freedom in design of the electric motor can be enhanced. This advantage can also be obtained when the number of phases of a plurality of armature coils is other than 3.

In the power output system including this electric motor, the primary rotor is connected to either of the two transmission shafts and the secondary rotor is connected to the drive shafts, whereby the secondary rotor can transmit a combined power of the power transmitted from the primary rotor and the power (electric power) transmitted from the stator to the drive shafts. Thus, the power from the internal combustion engine and the power from the stator can be combined so as to be transmitted to the drive shafts. In addition, the other transmission shaft of the two transmission shafts transmits power to the drive shafts without involvement of the power combining mechanism. Therefore, the power output system can be designed so as to be in use with the connection with the electric motor cut off when the electric motor is not used, thereby making it possible to increase the efficiency thereof.

In another aspect of the invention, the power output system further comprises a control unit for controlling the electric motor, wherein the control unit comprises a feedback control device for performing a control to reduce a deviation between a target current which is to be supplied to the electric motor and an actual current which is supplied to the electric motor on an orthogonal two-phase coordinates where a first phase and a second phase intersect orthogonally for each phase so as to output a command value for a voltage for each phase which is to be applied to the electric motor. The control unit further comprises a decoupling control device for correcting a command value outputted for the second phase by the feedback control device by use of a component of the target current or the actual current which corresponds to the first phase and correcting a command value outputted for the first phase by the feedback control device by use of a component of the target current or the actual current which corresponds to the second phase on the orthogonal two-phase coordinates.

According to the control unit, the respective phase currents that are supplied to the electric motor are not influenced by each other, and the respective phase currents can be controlled independently.

In yet another aspect of the invention, the control unit supplies electric power to the stator so that the revolving magnetic field in a forward revolving direction is increased when the electric motor is driven.

In another aspect of the invention, the control unit applies a generating equivalent torque in a reverse rotating direction to the stator so that the revolving magnetic field is reduced when the electric motor is driven for regeneration.

In yet another aspect of the invention, at least one of the two transmission shafts is connected to the internal combustion engine via a first connecting device, the other transmission shaft of the two transmission shafts is connected to the internal combustion engine via a second connecting device, and either or both of the two transmission shafts and the internal combustion engine can be connected to each other selectively.

In yet another aspect of the invention, either of the two transmission shafts is a primary main shaft, and a secondary main shaft which is shorter than the primary main shaft and is made hollow, and is disposed relatively rotatably on a periphery of the primary main shaft which is situated on an internal combustion side.

In another aspect of the invention, the power output system further comprises a primary intermediate shaft, and a first idle driven gear adapted to mesh with a first idle drive gear mounted on the secondary main shaft is mounted on the primary intermediate shaft.

In another aspect of the invention, the power output system further comprises a secondary intermediate shaft, and a second idle driven gear adapted to mesh with the first idle driven gear mounted on the primary intermediate shaft is mounted on the secondary intermediate shaft.

In another aspect of the invention, an odd-numbered transmission gear is provided on the primary main shaft, and an even-numbered transmission gear is provided on the secondary main shaft.

In another aspect of the invention, an even-numbered transmission gear is provided on the primary main shaft, and an odd-numbered transmission gear is provided on the secondary main shaft.

In another aspect of the invention, the power output system further comprises a required power setting device for setting a required power and an electric motor output detecting device for detecting an output of the electric motor. When an output of the electric motor that is detected by the electric motor output detecting device exceeds a rated output of the electric motor, the control unit drives the electric motor at the rated output thereof so as to control the revolution speed of the internal combustion engine.

In another aspect of the invention, the power output system further comprises an electric motor revolution speed detecting device for detecting a revolution speed of the electric motor. When the output of the electric motor that is detected by the electric motor output detecting device does not exceed the rated output of the electric motor and the revolution speed of the electric motor that is detected by the electric motor revolution speed detecting device exceeds a maximum revolution speed of the electric motor, the control unit drives the electric motor at the maximum revolution speed so as to control the revolution speed of the internal combustion engine.

In yet another aspect of the invention, when the output of the electric motor that is detected by the electric motor output detecting device does not exceed the rated output of the electric motor and the revolution speed of the electric motor that is detected by the electric motor revolution speed detecting device does not exceed the maximum revolution speed of the electric motor, the control unit drives the electric motor while keeping the internal combustion engine driven in a proper drive range.

BRIEF DESCRIPTION OF THE DRAWINGS

FIG. 18 shows diagrams which illustrate operations when electric power is supplied to the stator with the secondary rotor of the electric motor shown in FIG. 3 fixed.

FIG. 34(*a*) is a diagram illustrating a state of torque transmission of the power output system in a Low Pre3 mode, and FIG. 34(*b*) is a diagram illustrating a state of torque transmission of the power output system in a $3^{rd}$ Pre2 mode.

FIG. 42 is a chart summarizing vehicle states and states of the clutch, change-speed shifter, motor and engine of the power output system according to the first embodiment.

FIG. 47(*a*) is a diagram illustrating a state of torque transmission of the power output system in a $3^{rd}$ Pre4 mode, and FIG. 47(*b*) is a diagram illustrating a state of torque transmission of the power output system in a $4^{th}$ Pre3 mode.

FIG. 54(*a*) is a diagram illustrating a state of torque transmission of the power output system in a $4^{th}$ Pre5 mode, and FIG. 54(*b*) is a diagram illustrating a state of torque transmission of the power output system in a $5^{th}$ Pre4 mode.

FIG. 58 shows diagrams illustrating states when assist is made in a first reverse mode, of which (a) is a speed diagram, and (b) is a diagram illustrating a state of torque transmission of the power output system.

FIG. 59 is a chart summarizing vehicle states and states of a clutch, change-speed shifter, motor and engine of the power output system according to the second embodiment.

MODE FOR CARRYING OUT THE INVENTION

Embodiments of the invention will be described specifically by reference to the drawings.

First Embodiment

Figure 1:
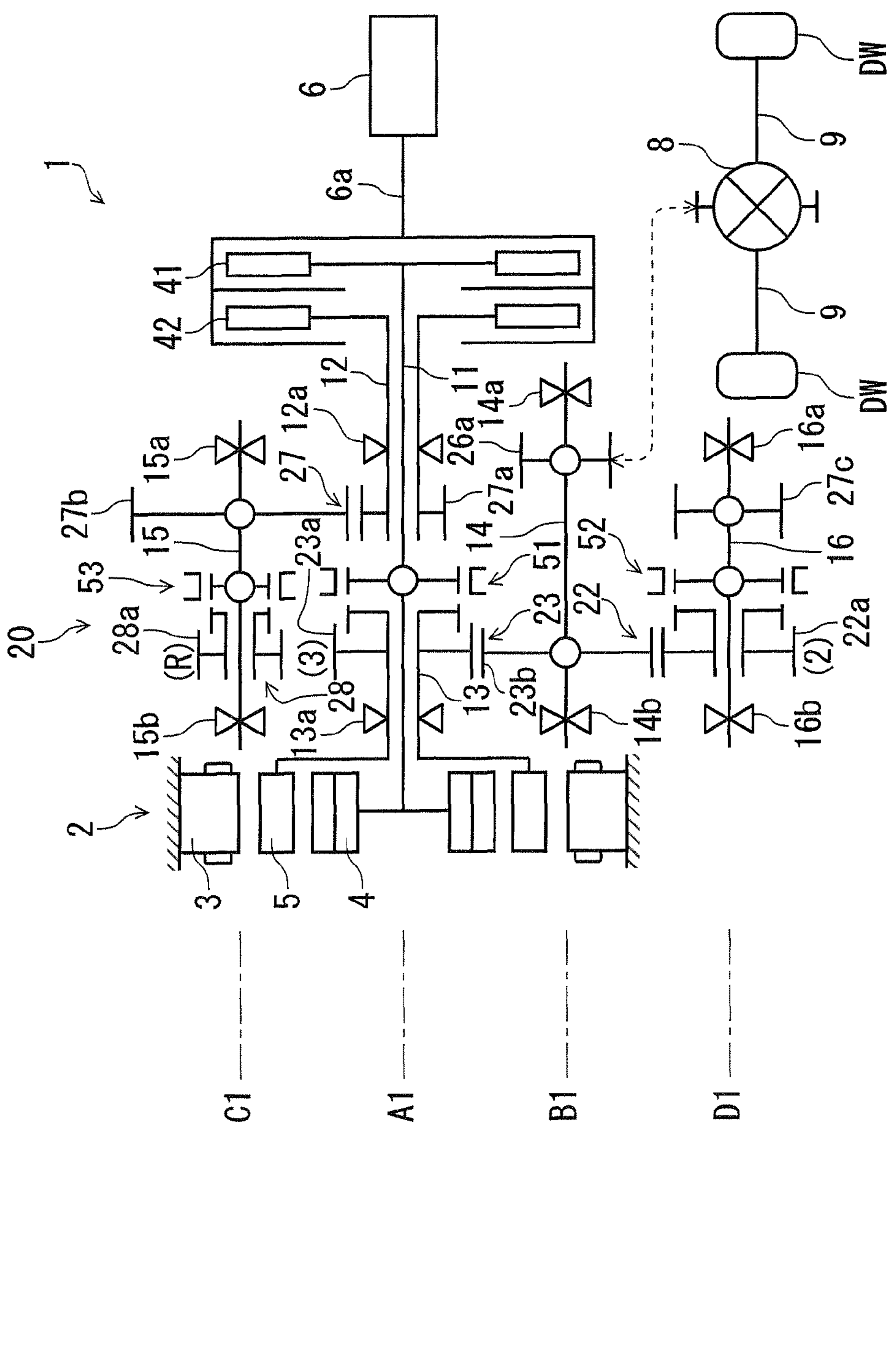
FIG. 1 is a diagram showing schematically a power output system according to a first embodiment of the invention and is a sectional view taken along the line A-A in FIG. 2.

FIG. 1 shows schematically a power output system 1 according to a first embodiment of the invention. This power output system 1 drives drive wheels DW, DW via drive shafts 9, 9 of a vehicle (not shown). The power output system 1 includes an internal combustion engine (hereinafter, referred to an "engine") which is a drive source, an electric motor 2, a transmission 20 for transmitting power to the drive wheels DW, DW, a differential gear mechanism 8 and the drive shafts 9, 9.

The engine 6 is a gasoline engine, and a primary clutch 41 (a primary engaging and disengaging device) and a secondary clutch 42 (a secondary engaging and disengaging device) are connected to a crankshaft 6*a* of the engine 6.

Figure 3:
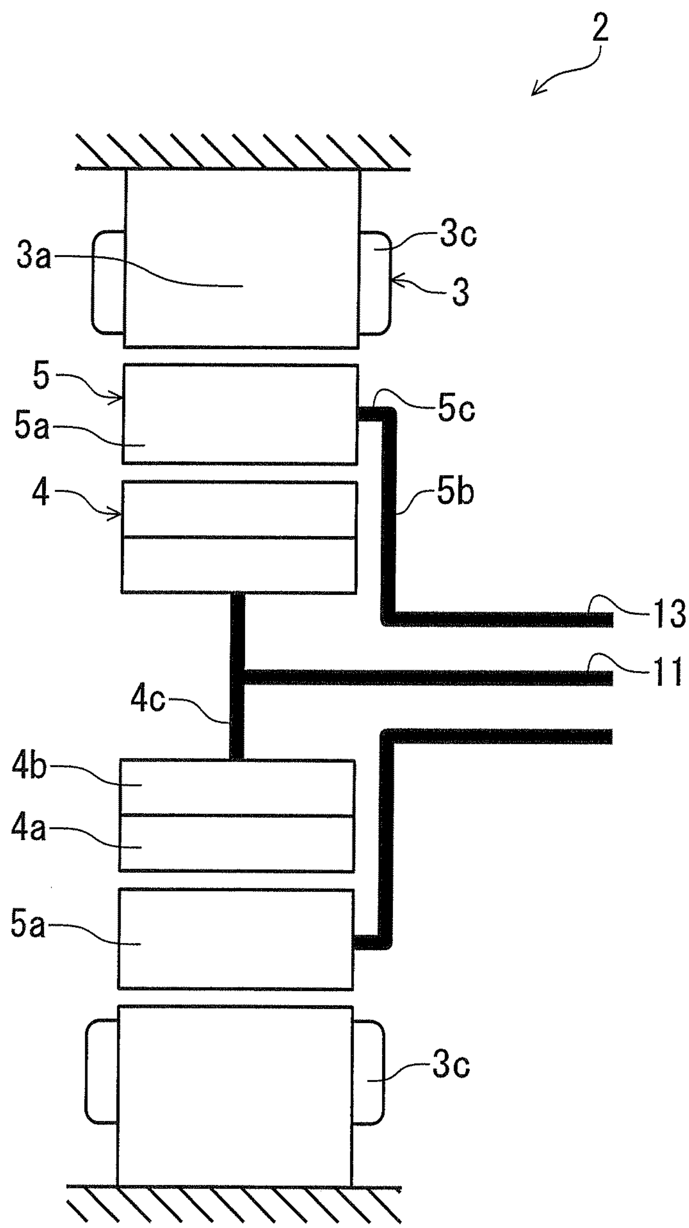
FIG. 3 is an enlarged view of an electric motor of the power output system shown in FIG. 1.

As FIG. 3 shows, the electric motor 2 includes a stator 3, a primary rotor 4 which is provided so as to face the stator 3 in a radial direction, and a secondary rotor 5 which is provided between the stator 3 and the primary rotor 4. The primary rotor 4 is connected to a primary main shaft 11 of the transmission 20 which will be described later, and the secondary rotor 5 is connected to a connecting shaft 13 of the transmission 20 which will be described later.

Figure 12:
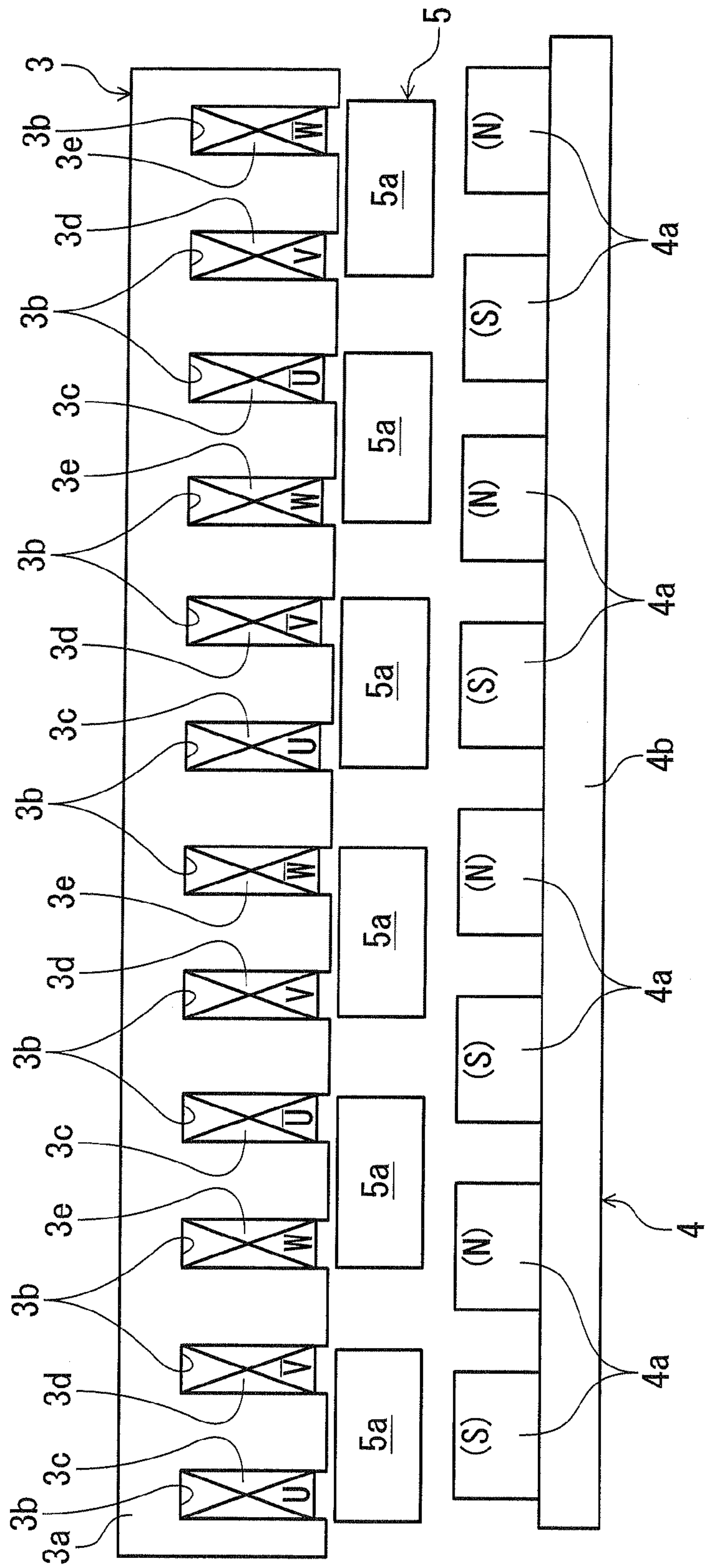
FIG. 12 is a diagram showing schematically a stator and primary and secondary rotors of the electric motor shown in FIG. 1 which are deployed in a circumferential direction.

The stator 3 generates a revolving magnetic field and has, as FIG. 12 shows, an iron core 3*a* and U-phase, V-phase and W-phase coils 3*c*, 3*d*, 3*e* which are provided on the iron core 3*a*. In FIG. 3, as a matter of convenience, only U-phase coils are shown. The iron core 3*a* is made up of a plurality of laminated steel plates and has a cylindrical shape and is fixed in place within a case, not shown. In addition, 12 slots 3*b* are formed in an inner circumferential surface of the iron core 3*a*. These slots 3*b* extend in an axial direction and are aligned at equal intervals in a circumferential direction of the primary main shaft 11 (hereinafter, referred to simply as a "circumferential direction"). The U-phase to W-phase coils are shunt wound (wave wound) in the slots 3*b* and are connected to an inverter 115 (refer to FIG. 4).

Figure 14:
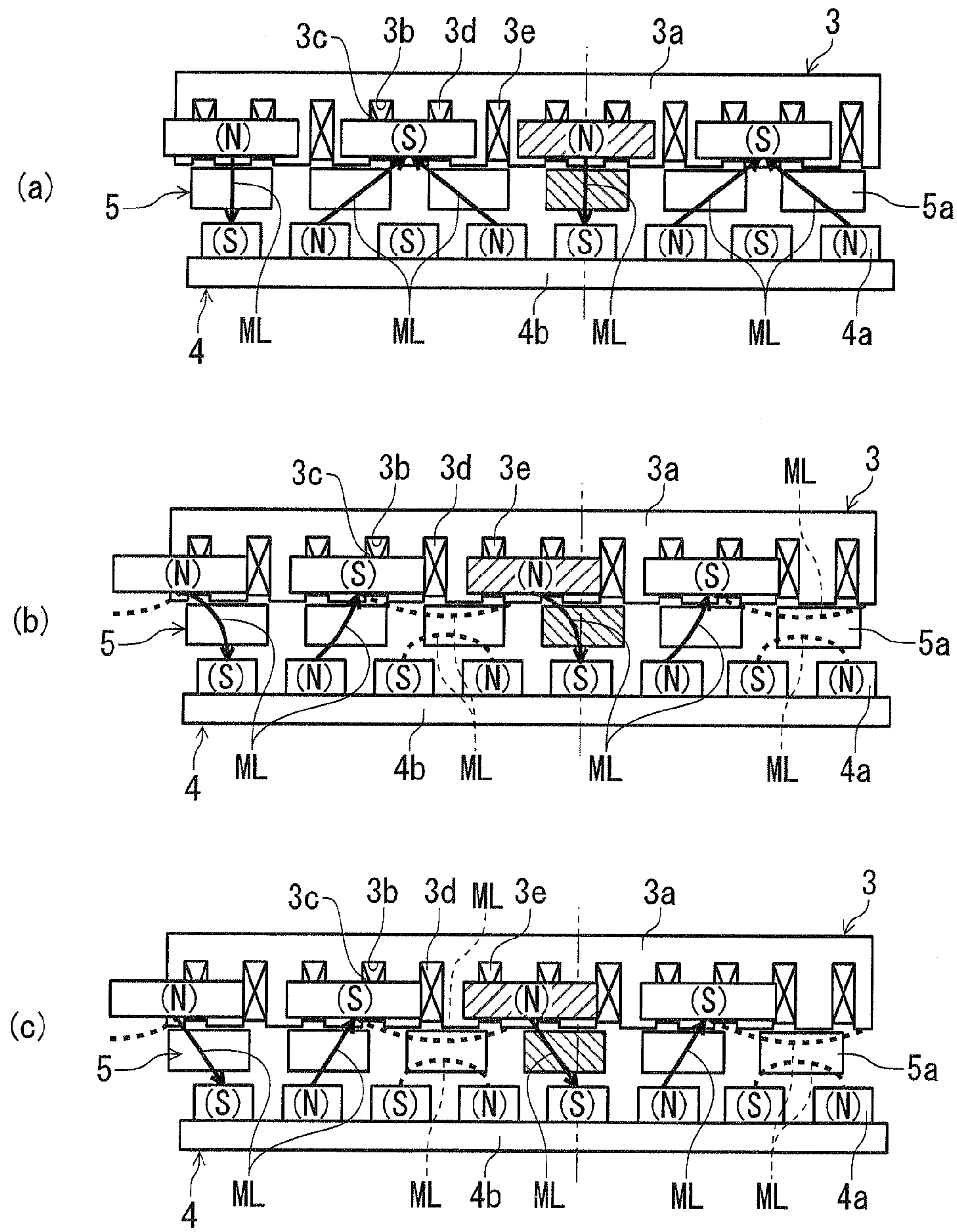
FIG. 14 shows diagrams which illustrate operations when electric power is supplied to the stator with the primary rotor of the electric motor shown in FIG. 3 fixed.

In the stator 3 that is configured in the way described above, when electric power is supplied thereto from a battery 114 (refer to FIG. 4) via the inverter 115, four magnetic poles are generated at equal intervals in the circumferential direction at an edge portion of the iron core 3*a* which is situated on a side facing the primary rotor 4 (refer to FIG. 14), and a revolving magnetic field generated by these magnetic poles revolves in the circumferential direction. Hereinafter, magnetic poles generated in the iron core 3*a* are referred to as "armature magnetic poles." In addition, any two circumferentially adjacent armature magnetic poles have polarities which are different from each other. In FIG. 14 and other drawings which will be described later, the armature magnetic poles are shown above the iron core 3*a* and the U-phase to W-phase coils 3*c* to 3*e* and are denoted by (N) and (S).

As FIG. 12 shows, the primary rotor 4 has a row of magnetic poles made up of eight permanent magnets 4*a*. These permanent magnets 4*a* are aligned at equal intervals in the circumferential direction, and this row of magnetic poles faces the iron core 3*a* of the stator 3. Each permanent magnet 4*a* extends in an axial direction, and an axial length of the permanent magnet 4*a* is set to be the same as that of the iron core 3*a* of the stator 3.

In addition, the permanent magnets 4*a* are mounted on an outer circumferential surface of a ring-shaped fixing portion 4*b*. This fixing portion 4*b* is made of a magnetically soft material such as iron or a plurality of laminated steel plates, and an inner circumferential surface thereof is attached to an outer circumferential surface of a circular disk-shaped flange 4*c* which is provided integrally and concentrically on the primary main shaft 11 as FIG. 3 shows. By this configuration, the primary rotor 4 which includes the permanent magnets 4*a* rotates freely together with the primary main shaft 11. Further, since the permanent magnets 4*a* are mounted on the outer circumferential surface of the fixing portion 4*b* which is made of the magnetically soft material as is described above, one magnetic pole of (N) or (S) is produced in an edge portion of each permanent magnet 4*a* which is situated a side facing the stator 3. In FIG. 12 and other drawings which will be described later, the magnetic pole of each of the permanent magnets 4*a* is denoted by (N) or (S). In addition, any two circumferentially adjacent permanent magnets 4*a* have polarities which are different from each other.

The secondary rotor 5 has a row of magnetically soft members made up of six cores 5*a*. These cores 5*a* are aligned at equal intervals in the circumferential direction. The row of magnetically soft members is disposed between the iron core 3*a* of the stator 3 and the row of magnetic poles of the primary rotor 4 with predetermined spaces defined therebetween. Each core 5*a* is made of a magnetically soft material or a plurality of laminated steel plates and extends in the axial direction. As with the permanent magnet 4*a*, an axial length of the core 5*a* is set to be the same as that of the iron core 3*a* of the stator 3. Further, as FIG. 3 shows, the cores 5*a* are mounted at a radially outer end portion of a circular disk-shaped flange 5*b* via a cylindrical connecting portion 5*c* which slightly extends in the axial direction. This flange 5*b* is provided integrally and concentrically on the connecting shaft 13. By this configuration, the secondary rotor 5 which includes the cores 5*a* rotates freely together with the connecting shaft 13. In FIG. 12, as a matter of convenience, the connecting portion 5*c* and the flange 5*b* are omitted from the illustration.

Figure 4:
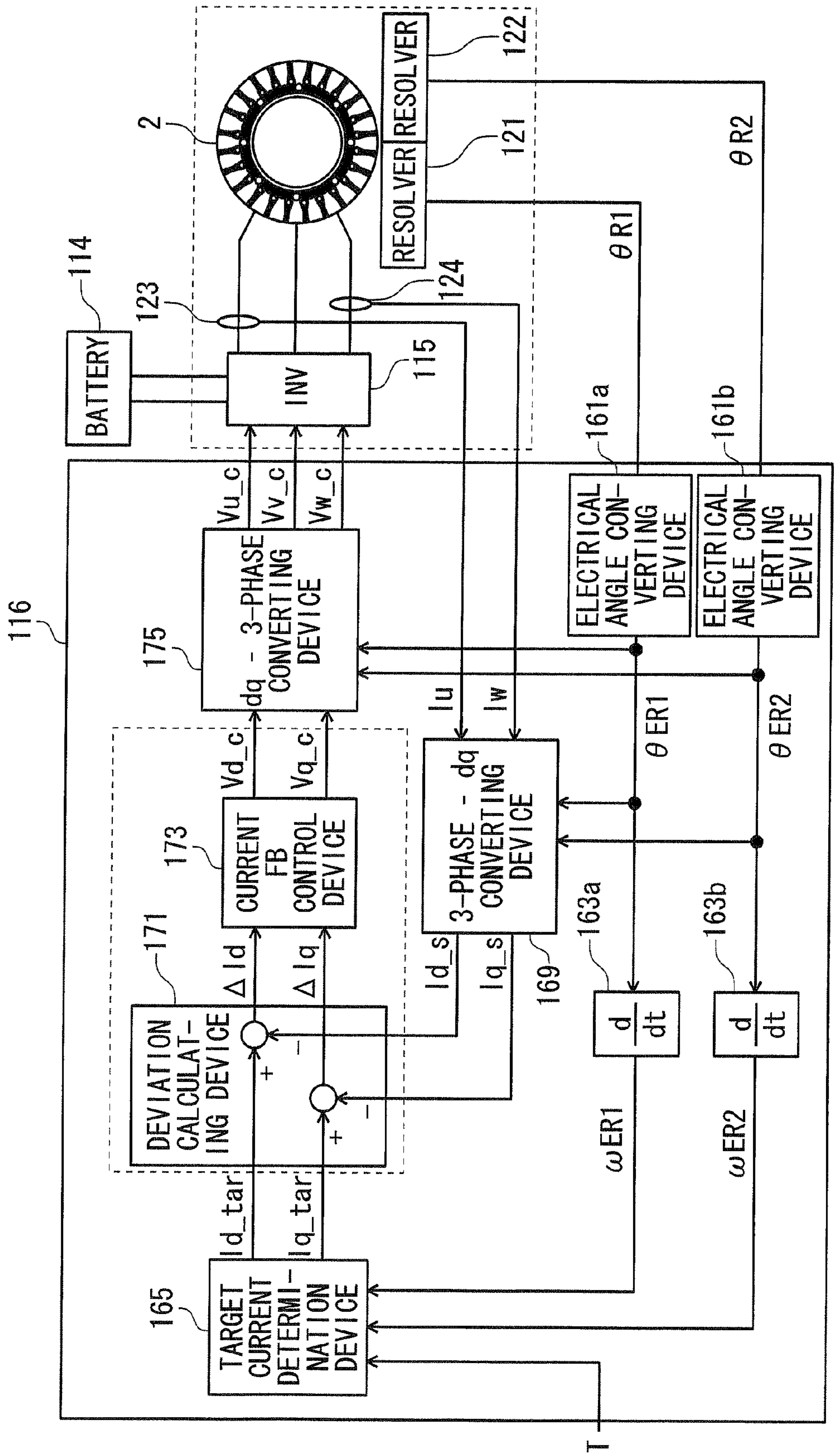
FIG. 4 is a block diagram showing internal configurations of the electric motor and an ECU shown in FIG. 1.

FIG. 4 is a diagram illustrating a system configuration for driving the electric motor 2 and an internal configuration of an ECU 116. A system shown in FIG. 4 includes the electric motor 2, the battery 114, the inverter 115, the ECU 116, a first rotational position sensor 121, a second rotational position sensor 122, a first current sensor 123, and a second current sensor 124. The battery 114 supplies electric power to the electric motor 2. The inverter 115 converts a direct current voltage supplied from the battery 114 into an alternating current voltage of three phases (U, V, W) based on a command from the ECU 116. A converter for increasing or decreasing the voltage may be provided between the battery 114 and the inverter 115.

The ECU 116 controls the operation of the inverter 115. The ECU 116 is made up of a microcomputer which includes an I/O interface, a CPU, a RAM and a ROM and controls the operation of the inverter 115 in response to detection signals from the rotational position and current sensors 121 to 124 and a torque command value T for the electric motor 2.

The first rotational position sensor 121 detects a rotational angle position of a specific permanent magnet 4*a* of the primary rotor 4 (hereinafter, referred to a "primary rotor rotational angle θR1") relative to a specific U-phase coil 3*c* of the stator 3 (hereinafter, referred to as a "reference coil"). The second rotational position sensor 122 detects a rotational angle position of a specific core 5*a* of the secondary rotor 5 (hereinafter, referred to as a "secondary rotor rotational angle θR2) relative to the reference coil. Note that the primary rotor rotational angle θR1 and the secondary rotor rotational angle θR2 are mechanical angles. The first rotational position sensor 121 and the second rotational position sensor 122 are resolvers, for example.

The first current sensor 123 detects a current which flows through the U-phase coils 3*c* of the electric motor 2 (hereinafter, referred to as a "U-phase current Iu"). The second current sensor 124 detects a current which flows through the W-phase coils 3*e* of the electric motor 2 (hereinafter, referred to as a "W-phase current").

In this embodiment, the permanent magnets 4*a* correspond to the magnetic poles of the invention, and the iron cores 3*a* and the U-phase to W-phase coils 3*c* to 3*e* correspond to the armatures of the invention. Further, the cores 5*a* correspond to the magnetically soft portions of the invention, and the ECU 116 corresponds to the control unit of the invention. The magnetically soft portions are not always made of a magnetically soft material but may be made by providing alternately portions where magnetic resistance is high and portions where magnetic resistance is low.

As has been described above, the electric motor 2 includes four armature magnetic poles, eight magnetic poles of the permanent magnets 4*a* (hereinafter, referred to as "magnet magnetic poles"), and six cores 5*a*. Namely, a ratio of the number of armature magnetic poles to the number of magnet magnetic poles to the number of cores 5*a* (hereinafter, referred to as a "pole number ratio") is set to 1:2.0:(1+2.0)/2. As is clear from this pole number ratio and Equations (18) to (20) described above, counter electromotive voltages (hereinafter, referred to respectively as a "U-phase counter electromotive voltage Vcu," a "V-phase counter electromotive voltage Vcv," and a "W-phase counter electromotive voltage") which are generated in the U-phase to W-phase coils 3*c* to 3*e* as the primary rotor 4 and the secondary rotor 5 rotate relative to the stator 3 are expressed by Equations (33), (34) and (35), respectively.

[Equation 33]

$$Vcu = -3\cdot\psi F[(3\cdot\omega ER2 - 2\cdot\omega ER1)\sin(3\cdot\theta ER2 - 2\cdot\theta ER1)] \quad (33)$$

[Equation 34]

$$Vcv = -3\cdot\psi F\left[(3\cdot\omega ER2 - 2\cdot\omega ER1)\sin\left(3\cdot\theta ER2 - 2\cdot\theta ER1 - \frac{2\pi}{3}\right)\right] \quad (34)$$

[Equation 35]

$$Vcw = -3\cdot\psi F\left[(3\cdot\omega ER2 - 2\cdot\omega ER1)\sin\left(3\cdot\theta ER2 - 2\cdot\theta ER1 + \frac{2\pi}{3}\right)\right] \quad (35)$$

where, I denotes amplitudes (maximum values) of currents which flow through the U-phase to W-phase coils 3*c* to 3*e*, and ψf denotes a maximum value of a magnetic flux of the magnet magnetic poles. θER1 denotes a value obtained by converting the primary rotor rotational angle θR1, which is a so-called mechanical angle, into an electrical angular position (hereinafter, referred to as a "primary rotor electrical angle"). Specifically speaking, θER1 denotes a value obtained by multiplying the primary rotor rotational angle ORI by the number of pole pairs of the armature magnetic poles, that is, a value of 2. θER2 denotes a value obtained by converting the secondary rotor rotational angle θR2, which is a so-called mechanical angle, into an electrical angular position (hereinafter, referred to as a "secondary rotor electrical angle"). Specifically speaking, θER2 denotes a value obtained by multiplying the secondary rotor rotational angle θR2 by the number of pole pairs of the armature magnetic poles (the value of 2). In addition, ωER1 denotes a time differentiated value of θER1, that is, a value obtained by converting the angular velocity of the primary rotor 4 relative to the stator 3 into electrical angular velocity (hereinafter, referred to as a "primary rotor electrical angular velocity"). Further, ωER2 denotes a time differentiated value of θER2, that is, a value obtained by converting the angular velocity of the secondary rotor 5 relative to the stator 3 into electrical angular velocity (hereinafter, referred to as a "secondary rotor electrical angular velocity").

As is clear from the pole number ratio and Equations (21) to (23) described above, the U-phase current Iu, the V-phase current Iv and a current which flows through the W-phase coil 3*e* (hereinafter, referred to as a "W-phase current Iw") are expressed by Equations (36), (37) and (38) below, respectively.

[Equation 36]

$$Iu = I\cdot\sin(3\cdot\theta ER2 - 2\cdot\theta ER1) \quad (36)$$

[Equation 37]

$$Iv = I\cdot\sin\left(3\cdot\theta ER2 - 2\cdot\theta ER1 - \frac{2\pi}{3}\right) \quad (37)$$

[Equation 38]

$$Iw = I\cdot\sin\left(3\cdot\theta ER2 - 2\cdot\theta ER1 + \frac{2\pi}{3}\right) \quad (38)$$

In addition, as is clear from the pole number ratio and Equations (24) and (25) described above, an electrical angular position of a vector of the revolving magnetic field of the stator 3 relative to the reference coil (hereinafter, referred to as a "magnetic field electrical angular position θMFR") is expressed by Equation (39) below, and an electrical angular velocity of the revolving magnetic field relative to the stator 3 (hereinafter, referred to as a "magnetic field electrical angular velocity ωMFR") is expressed by Equation (40) below.

[Equation 39]

$$\theta MFR = 3\cdot\theta ER2 - 2\cdot\theta ER1 \quad (39)$$

[Equation 40]

$$\omega MFR = 3\cdot\omega ER2 - 2\cdot\omega ER1 \quad (40)$$

Figure 13:
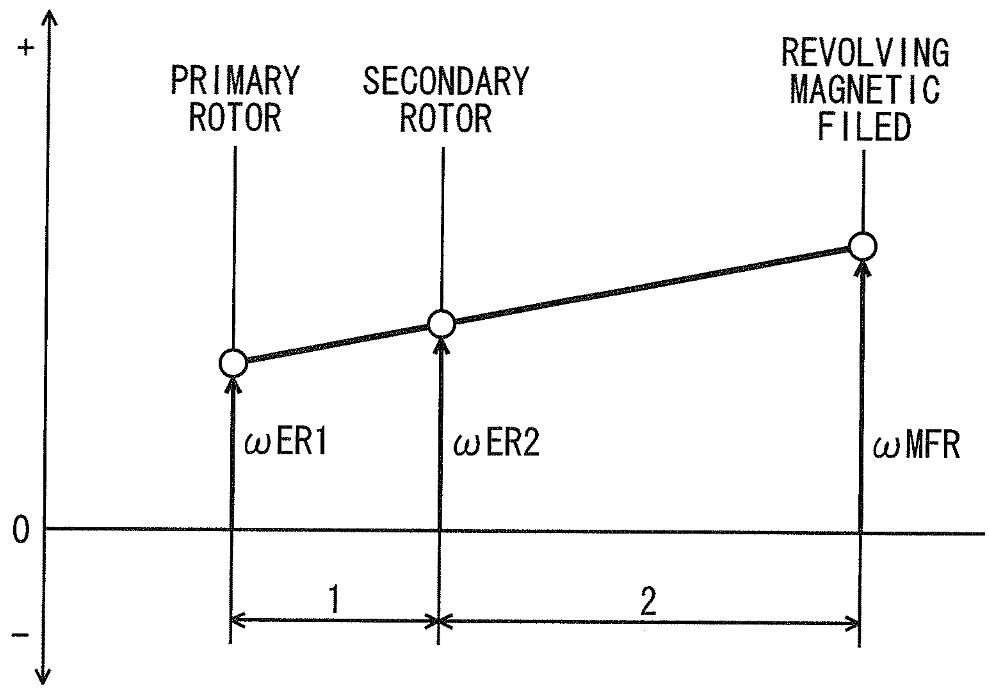
FIG. 13 is a collinear chart showing an example of a relation of magnetic field electrical angular velocity and electrical angular velocities of the primary and secondary rotors of the electric motor shown in FIG. 3.

Because of this, when a relation between the magnetic field electrical angular velocity ωMFR, the primary rotor electrical angular velocity ωER1 and the secondary rotor electrical angular velocity ωER2 is expressed by a so-called collinear chart, the relation is expressed as is shown in FIG. 13.

In addition, when a torque equivalent to the electric power supplied to the stator 3 and the magnetic field electrical angular velocity ωMFR is referred to as a driving equivalent torque TSE, a relation between the driving equivalent torque TSE, a torque TR1 transferred to the primary rotor 4 (hereinafter, referred to as a "primary rotor transfer torque") and a torque TR2 transferred to the secondary rotor 5 (hereinafter, referred to as a "secondary rotor transfer torque") is expressed by Equation (41) below as is clear from the pole number ratio and Equation (32) described above.

[Equation 41]

$$TSE = \frac{TR1}{2} = \frac{-TR2}{3} \quad (41)$$

The relation of electrical angular velocity expressed by Equation (40) and the relation of torque expressed by Equation (41) are completely the same as the relations of rotating velocity and torque between the sun gear, the ring gear and the carrier of the planetary gear mechanism in which the gear ratio between the sun gear and the ring gear is 1:2.

The ECU 116 controls the revolving magnetic field by controlling the energization of the U-phase to W-phase coils 3*c* to 3*e* based on Equation (39) above. As FIG. 4 shows, the ECU 116 has electrical angle converting devices 161*a*, 161*b*, angular velocity calculating devices 163*a*, 163*b*, a target current determination device 165, a 3-phase-dq converting device 169, a deviation calculating device 171, a current FB control device 173 and dp-3-phase converting device 175.

The electrical angle converting device 161*a* calculates the primary rotor electrical angle θER1 by multiplying the primary rotor rotational angle θR1 which is detected by the first rotational position sensor 121 by the pole pair number of the armature magnetic poles (the value of 2). The electrical angle converting device 161*b* calculates the secondary rotor electrical angle θER2 by multiplying the secondary rotor rotational angle θR2 which is detected by the second rotational position sensor 122 by the pole pair number of the armature magnetic poles (the value of 2). The primary and secondary rotor electrical angles θER1, θER2 which are calculated by the electrical angle converting devices 161*a*, 161*b*, respectively, are inputted into the angular velocity calculating devices 163*a*, 163*b*, the 3-phase-dq converting device 169 and the dp-3-phase converting device 175.

The angular velocity calculating device 163*a* calculates an electrical angular velocity ωER1 of the primary rotor 4 of the electric motor 2 by time differentiating the primary rotor electrical angle θER1 induced by the electrical angle converting device 161*a*. The angular velocity calculating device 163*b* calculates an electrical angular velocity ωER2 of the secondary rotor 5 of the electric motor 2 by time differentiating the secondary rotor electrical angle θER2 induced by the electrical angle converting device 161*b*. The electrical angular velocities ωER1, ωER2 which are calculated by the angular velocity calculating devices 163*a*, 163*b* are inputted into the target current determination device 165.

The target current determination device 165 determines a target value Id_tar of a d-axis component (hereinafter, referred to as a "d-axis current") and a target value Iq_tar of a q-axis component (hereinafter, referred to as a "q-axis current") of the current flowing to the stator 3 based on a torque command value T and electrical angular velocities ωER1, ωER2 which are inputted from the other component devices. The target value Id_tar of the d-axis current and the target value Iq_tar of the q-axis current are inputted into the deviation calculating device 171.

The 3-phase-dq converting device 169 calculates a detection value Ids of the d-axis current and a detection value Iq_s of the q-axis current by performing conversions based on respective detection values of the U-phase current Iu and the W-Phase current Iw and the primary and secondary rotor electrical angles θER1, θER2. On the dq coordinates, a d-axis represents (3·θER2−2·θER1), and an axis intersecting the d-axis at right angles is referred to as a q-axis. Rotation is performed at (3·ωER2−2·ωER1). The d-axis current Ids and the q-axis current Iq_s are calculated by Equation (42) below. The d-axis current Ids and the q-axis current Iq_s are inputted into the deviation calculating device 171.

[Equation 42]

$$\begin{bmatrix} Id \\ Iq \end{bmatrix} = \sqrt{\frac{2}{3}} \begin{bmatrix} \cos(3\cdot\theta ER2 - 2\cdot\theta ER1) & \cos\left(3\cdot\theta ER2 - 2\cdot\theta ER1 - \frac{2}{3}\pi\right) & \cos\left(3\cdot\theta ER2 - 2\cdot\theta ER1 + \frac{2}{3}\pi\right) \\ -\sin(3\cdot\theta ER2 - 2\cdot\theta ER1) & -\sin\left(3\cdot\theta ER2 - 2\cdot\theta ER1 - \frac{2}{3}\pi\right) & -\sin\left(3\cdot\theta ER2 - 2\cdot\theta ER1 + \frac{2}{3}\pi\right) \end{bmatrix} \begin{bmatrix} Iu \\ Iv \\ Iw \end{bmatrix} \tag{42}$$

The deviation calculating device 171 calculates a deviation ΔId between the target value Id tar of the d-axis current and the d-axis current Ids. In addition, the deviation calculating device 171 calculates a deviation ΔIq between the target value Iq_tar of the q-axis current and the q-axis current Iq_s. The deviations ΔId and ΔIq which are calculated by the deviation calculating device 171 are inputted into the current FB control device 173.

The current FB control device 73 determines a command value Vdc of a d-axis voltage and a command value Vq_c of a q-axis voltage on the dq coordinates by performing, for example, a PI control (Proportional-Integral control) so as to reduce the deviation ΔId and the deviation ΔIq. A transfer function Fd of the PI control performed on the deviation ΔId by the current FB control device 173 is ωMFR(Ld+Ra/s). In addition, a transfer function Fq of the PI control performed on the deviation ΔIq by the current FB control device 173 is ωMFR(Lq+Ra/s). Ra is a parameter denoting a resistance component of the electric motor, Ld is a parameter denoting an inductance component on a d-axis side of the electric motor 2 and Lq is a parameter denoting an inductance component on a q-axis side of the electric motor 2. The command value Vd_c of the d-axis voltage and the command value Vq_c of the q-axis current which are determined by the current FB control device 173 are inputted into the dq-3-phase converting device 175.

The dq-3-phase converting device 175 calculates respective voltage command values Vu c, Vv_c, Vw_c of the U-phase to the W-phase by performing a dq-3-phase conversion based on the command value Vd_c of the d-axis voltage and the command value Vq_c of the q-axis voltage and the primary and secondary rotor electrical angles θER1, θER2. The voltage command values Vu_c, Vv_c, Vw_c are calculated by Equation (43) below. The calculated voltage command values Vu_c, Vv_c, Vw_c are inputted into the inverter 115.

[Equation 43]

$$\begin{bmatrix} Vu\_cmd \\ Vv\_cmd \\ Vw\_cmd \end{bmatrix} = \sqrt{\frac{2}{3}} \begin{bmatrix} \cos(3\cdot\theta ER2 - 2\cdot\theta ER1) & -\sin(3\cdot\theta ER2 - 2\cdot\theta ER1) \\ \cos\left(3\cdot\theta ER2 - 2\cdot\theta ER1 - \frac{2}{3}\pi\right) & -\sin\left(3\cdot\theta ER2 - 2\cdot\theta ER1 - \frac{2}{3}\pi\right) \\ \cos\left(3\cdot\theta ER2 - 2\cdot\theta ER1 + \frac{2}{3}\pi\right) & -\sin\left(3\cdot\theta ER2 - 2\cdot\theta ER1 + \frac{2}{3}\pi\right) \end{bmatrix} \begin{bmatrix} Vd \\ Vq \end{bmatrix} \tag{43}$$

The inverter 115 applies phase voltages Vu to Vw which are indicated by the voltage command values Vu_c, Vv_c, Vw_c to the electric motor 2. The U-phase to W-phase currents Iu to Iw are controlled by this. In this case, the phase currents Iu to Iw are expressed by Equations (36) to (38) above, respectively. The amplitudes I of the currents are determined based on the command value Id c of the d-axis current and the command value Iq_c of the q-axis current.

By the controls of the ECU 116 that have been described heretofore, the magnetic field electrical angular position OMFR is controlled so that Equation (39) is established, and the magnetic field electrical angular velocity ωMFR is controlled so that Equation (40) is established. The current FB control device 173 may perform a P control (proportional control) or a PID control (proportional-integral-differential control) in addition to the PI control.

Figure 5:
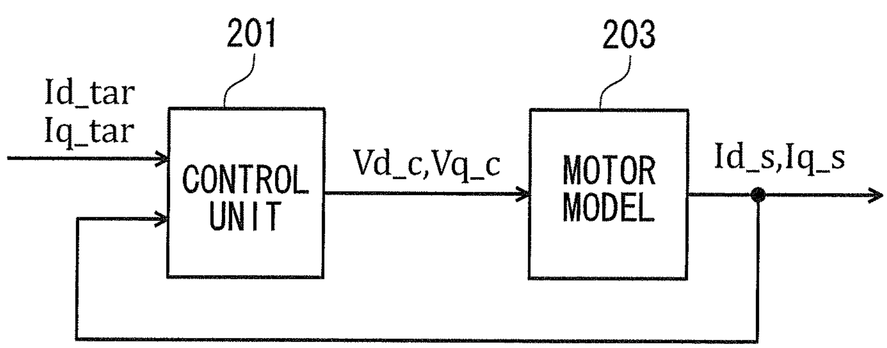
FIG. 5 is an example of a block diagram of the system shown in FIG. 4.

FIG. 5 shows an example of a block diagram of the system shown in FIG. 4. A control unit 201 shown in FIG. 5 is mainly made up of the 3-phase-dq converting device 169, the deviation calculating device 171 and the current FB control device 173 which are included in the ECU 116 in the system. In addition, a motor model 203 shown in FIG. 5 is mainly made up of the electric motor 2 and the inverter 115 in the system.

A voltage equation of the motor model 203 on the dq coordinates is expressed by Equation (44). ΨPa in Equation (44) denotes a magnetic flux which passes through the coils of the electric motor 2. In addition, Ra is a parameter denoting a resistance component of the motor model 203, Ld is a parameter denoting an inductance component on a d-axis side of the motor model 203, and Lq is a parameter denoting an inductance component on a q-axis side of the motor model 203.

[Equation 44]

$$\begin{bmatrix} \text{Vd\_c} \\ \text{Vq\_c} \end{bmatrix} = \begin{bmatrix} Ra + sLd & -\omega MFR \times Lq \\ \omega MFR \times Ld & Ra + sLq \end{bmatrix} \begin{bmatrix} \text{Id\_s} \\ \text{Iq\_s} \end{bmatrix} + \begin{bmatrix} 0 \\ \omega MFR \times \Psi a \end{bmatrix} \quad (44)$$

The magnetic field electrical angular velocity ωMFR is expressed by Equation (45) below based on Equation (25) and Equation (40).

[Equation 45]

$$\omega MFR = (\alpha + 1)\omega ER2 - \alpha\omega ER1 \quad (45)$$

Equation (45) above can be transformed into Equation (46) and Equation (47) below.

[Equation 46]

$$\text{Id\_s} = \frac{\text{Vd\_c} + \omega MFR \times Lq \times \text{Iq\_s}}{Ra + sLd} \quad (46)$$

$$\text{Iq\_s} = \frac{\text{Vq\_c} - (\omega MFR \times Ld \times \text{Id\_s} + \omega MFR \times \Psi a)}{Ra + sLq} \quad (47)$$

Figure 6:
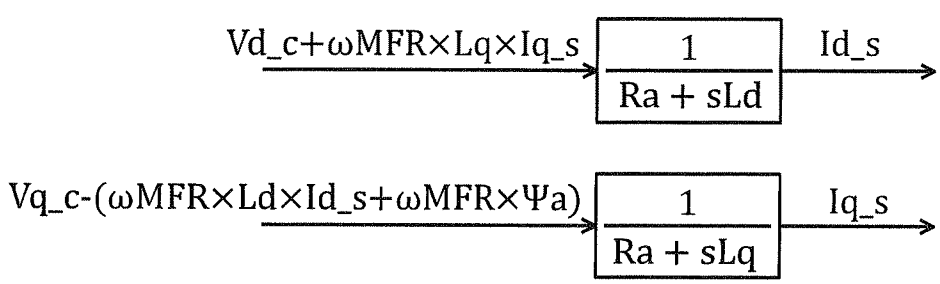
FIG. 6 is a block diagram which represents what is expressed by Equation (46) and Equation (47), respectively.

FIG. 6 shows block diagrams representing Equation (46) and Equation (47), respectively. The block diagrams shown in FIG. 6 are also expressed like a block diagram shown in FIG. 7.

Figure 7:
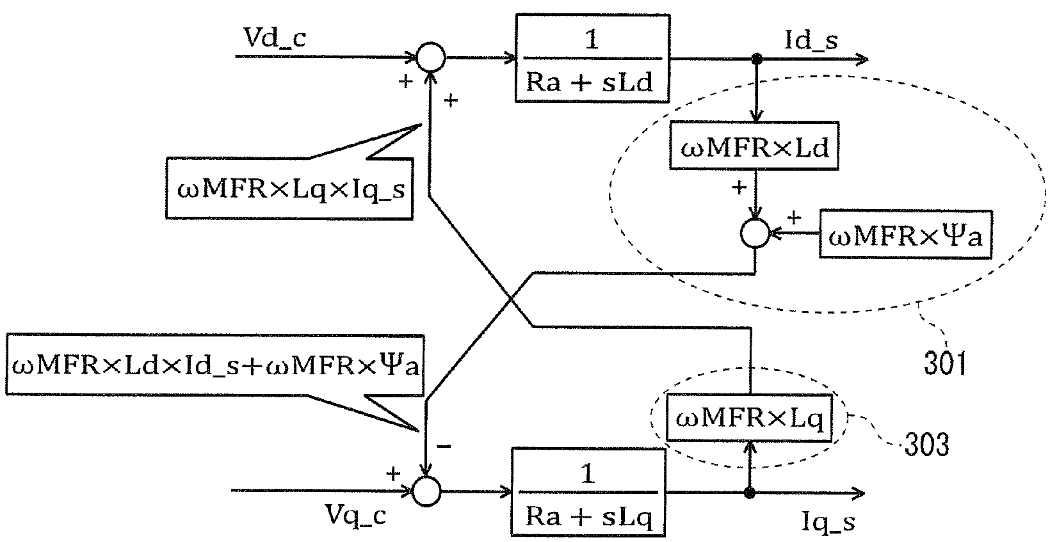
FIG. 7 is a block diagram which represents differently what is expressed by Equation (46) and Equation (47).

As FIG. 7 shows, the q-axis current Iq_s is influenced by a component of the d-axis current Ids which is indicated by a dotted line 301 in FIG. 7. In addition, the d-axis current Id_s is influenced by a component of the q-axis current Iq_s which is indicated by a dotted line 303 in FIG. 7. The components which influence the d- and q-axis currents are changed by the magnetic field electrical angular velocity ωMFR. In this embodiment, a system is provided in which the d- and q-axis currents can be controlled independently from each other without being influenced by each other.

Figure 8:
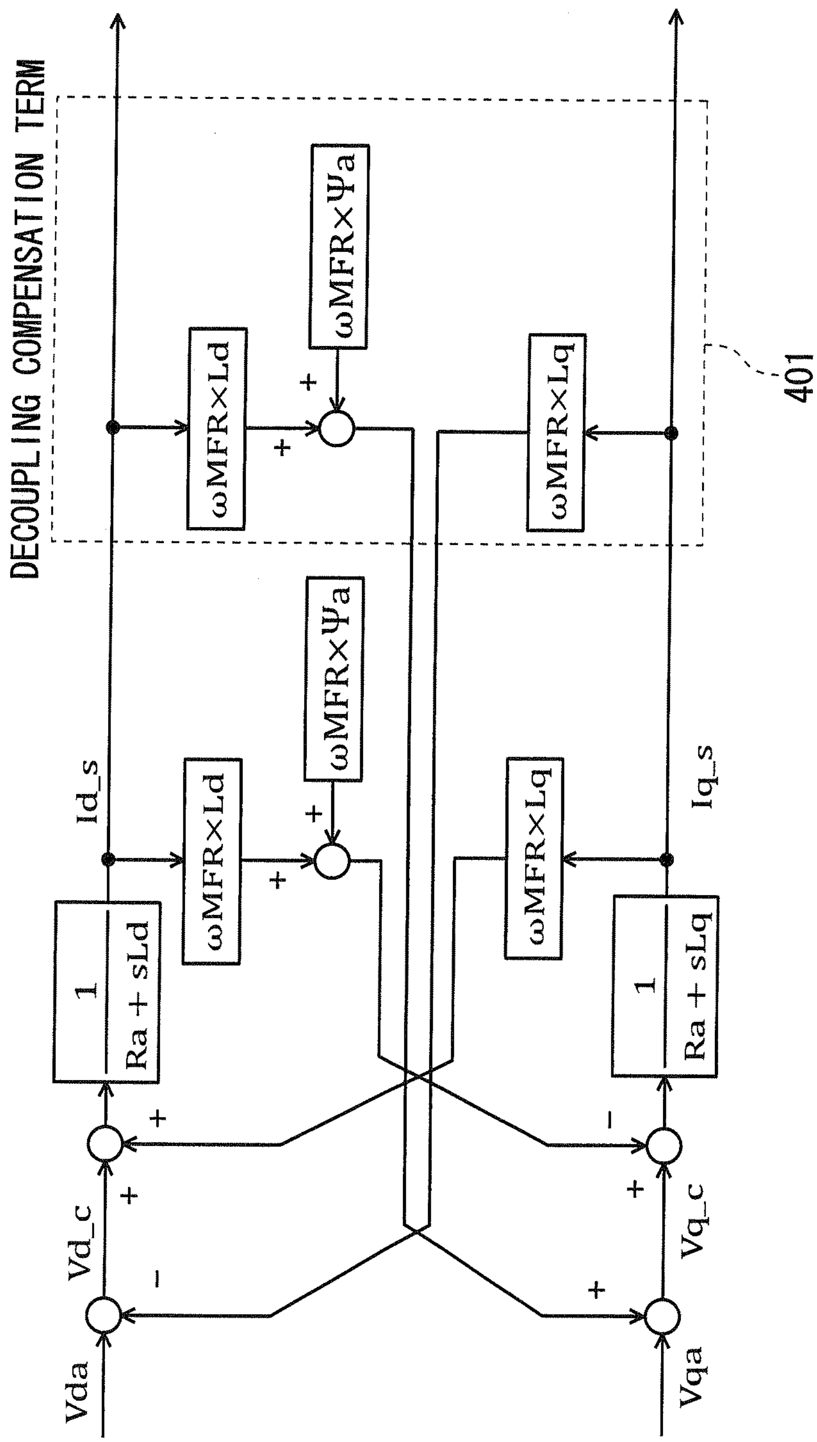
FIG. 8 is a block diagram in which a decoupling compensation term is added to a block diagram of a motor model.

FIG. 8 is a block diagram in which a decoupling compensation term is added to the block diagram of the motor model 203. A decoupling compensation term 401 which is surrounded by a dotted line in FIG. 8 offsets the influences received by the d- and q-axis currents. By performing a control indicated by the decoupling compensation term 401, the d-axis voltage command value Vd_c and the q-axis voltage command value Vq_c in Equation (46) and Equation (47) above are expressed by Equation (48) and Equation (49) below, respectively.

[Equation 47]

$$Vd\_c = Vda - \omega MFR \times Lq \times Iq\_s \quad (48)$$

$$Vq\_c = Vqa + (\omega MFR \times Ld \times Id\_s + \omega MFR \times \Psi\alpha) \quad (49)$$

Figure 9:
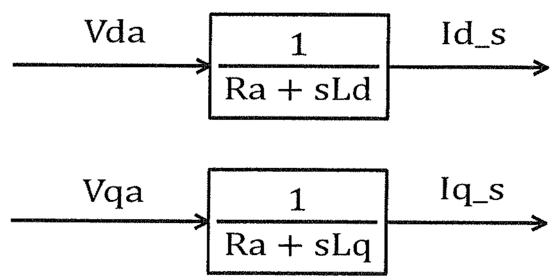
FIG. 9 is a block diagram which represents what is expressed by Equation (50) and Equation (51), respectively.

When Equation (46) and Equation (47) are substituted for by Equation (48) and Equation (49) above, Equation (50) and Equation (51) below are established. FIG. 9 shows block diagrams representing Equation (50) and Equation (51), respectively.

[Equation 48]

$$\frac{\text{Id\_s}}{Vda} = \frac{1}{Ra + sLd} \quad (50)$$

$$\frac{\text{Iq\_s}}{Vqa} = \frac{1}{Ra + sLq} \quad (51)$$

In this way, when the control indicated by the decoupling compensation term 401 is performed, the components on the respective axes of the dq coordinates are expressed by the transfer functions of the first degree which are independent from each other. Consequently, in the control unit included in the block diagram of the system of this embodiment, in addition to the PI control which is performed by the current FB control device 173, the decoupling control indicated by the decoupling compensation term 401 is performed.

Figure 10:
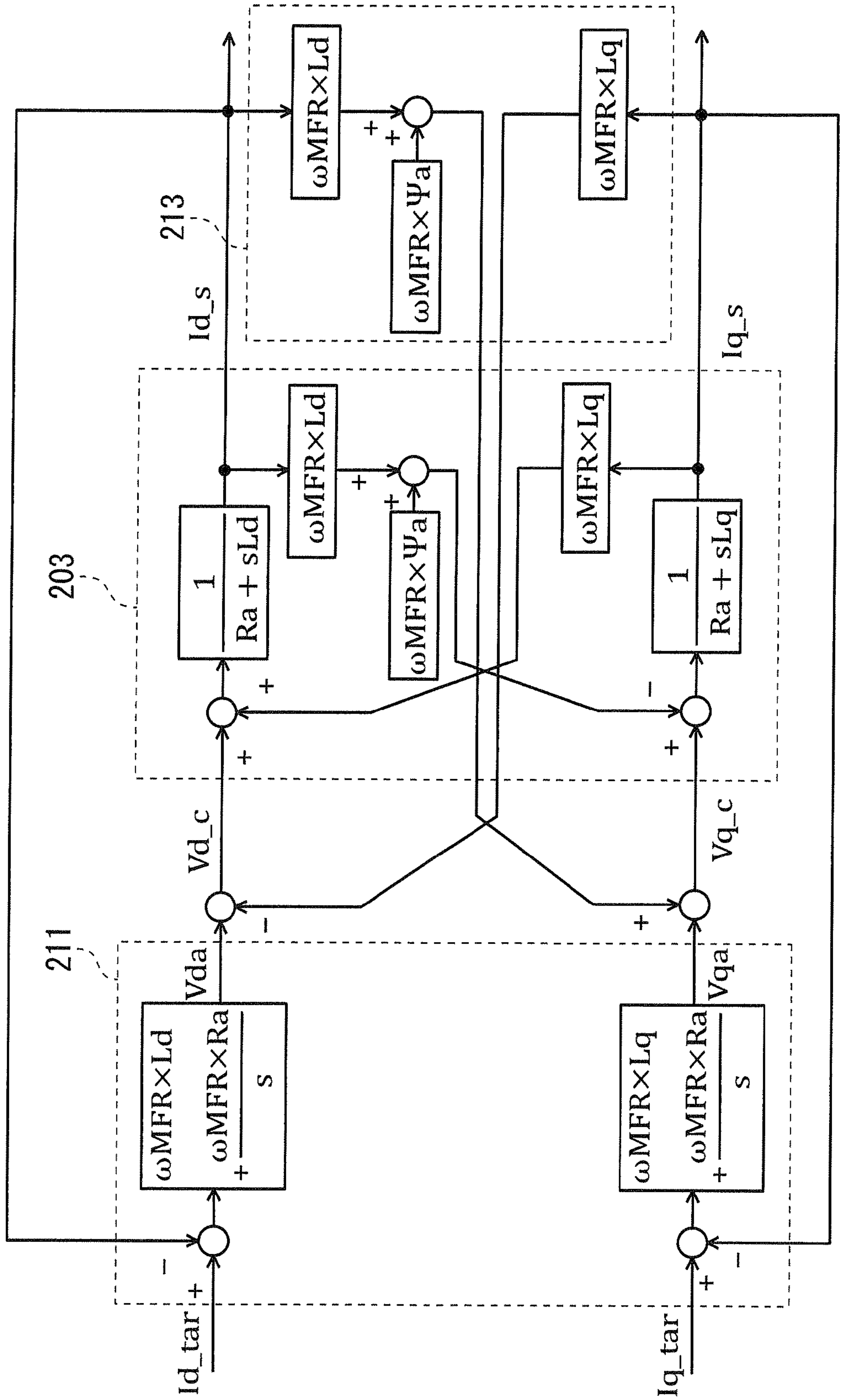
FIG. 10 is an example of a block diagram of a power output system according to another embodiment.

FIG. 10 is an example of a block diagram of a system of another embodiment. In the system shown in FIG. 10, a control unit for a motor model 203 is made up of a PI control device 211 and a decoupling control device 213. Namely, a current FB control device of an ECU of this embodiment determines a command value Vd_c of a d-axis voltage and a command value Vq_c of a q-axis voltage by performing a decoupling control as well as the PI control that has been described above.

Figure 11:
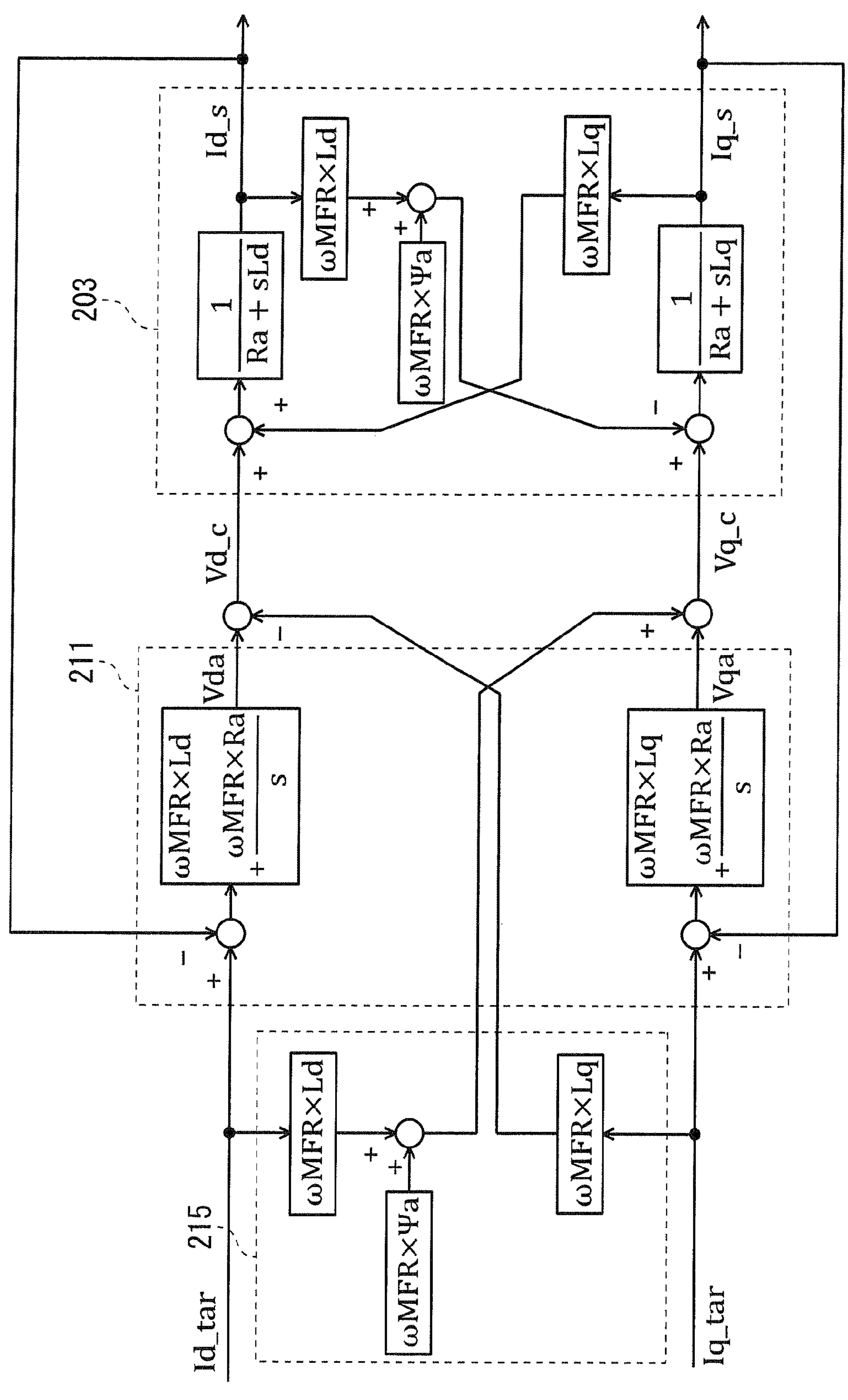
FIG. 11 is a block diagram of a modified example to the system shown in FIG. 10.

In the example shown in FIG. 10, a detection value Ids of a d-axis current and a detection value Iq_s of a q-axis current are inputs to the decoupling control device 213. However, as FIG. 11 show, a target value Id tar of the d-axis current and a target value of the q-axis current may be used as inputs to the decoupling control device 215.

Figure 15:
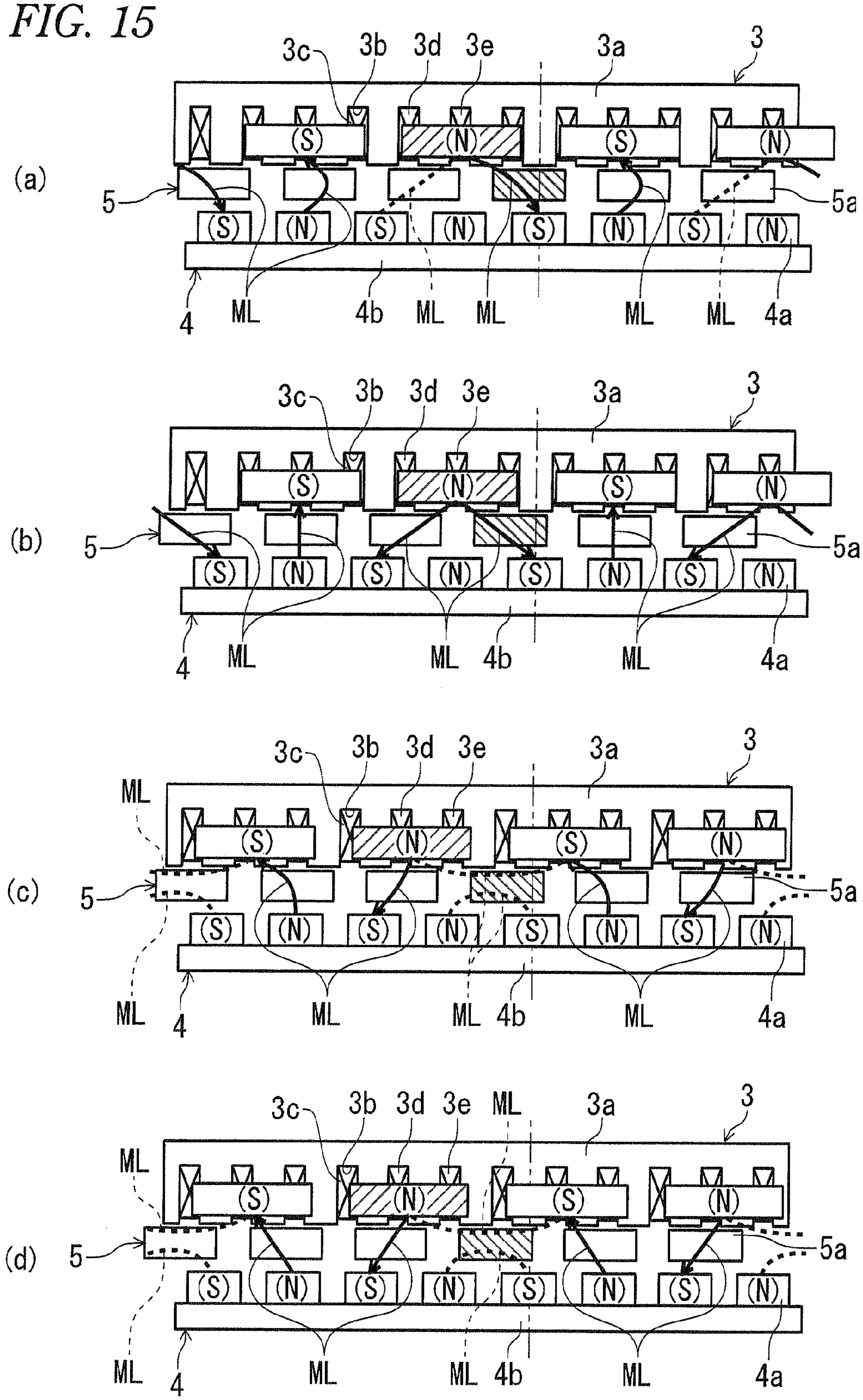
FIG. 15 shows diagrams which illustrate operations subsequent to the operations shown in FIG. 14.
Figure 16:
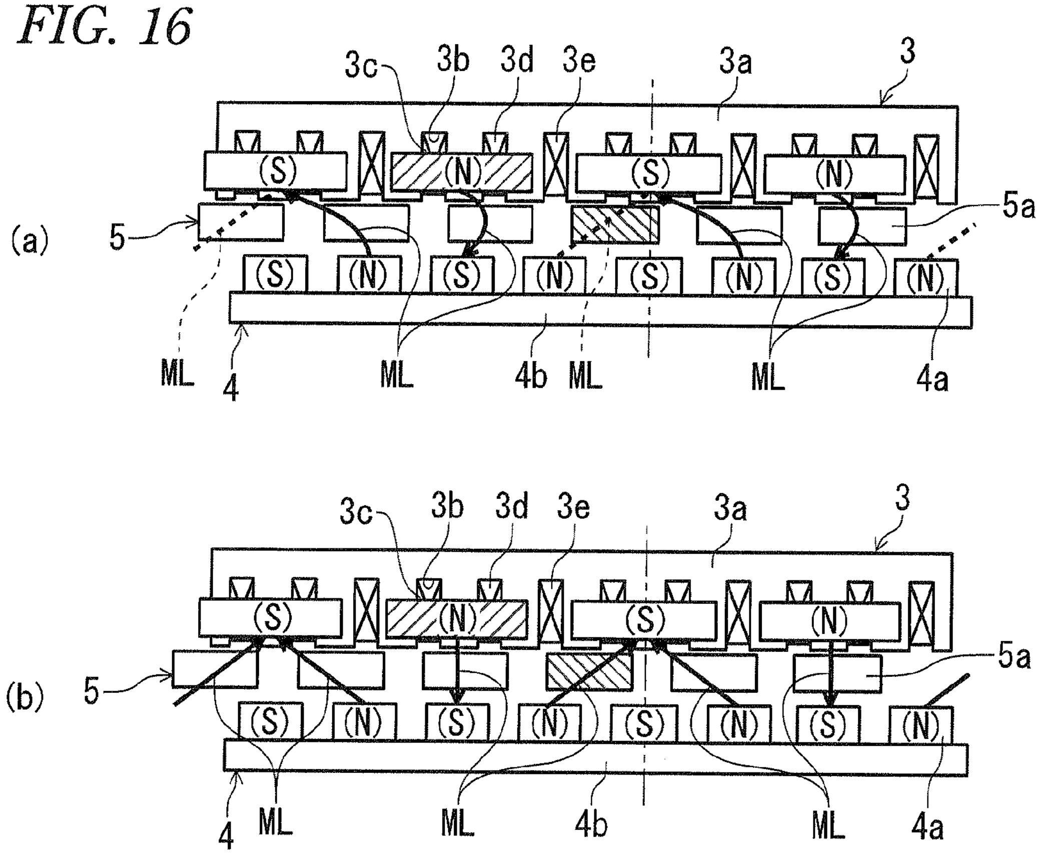
FIG. 16 shows diagrams which illustrate operations subsequent to the operations shown in FIG. 15.

Next, how electric power supplied to the stator 3 is converted into power to be outputted from the primary rotor 4 and the secondary rotor 5 will be described. Firstly, referring to FIGS. 14 to 16, a case will be described in which electric power is supplied to the stator 3 in such a state that the primary rotor 4 is fixed. In FIGS. 14 to 16, as a matter of convenience, reference numerals of a plurality of constituent elements are omitted. This will be true with the other drawings which will be described later. In addition, for the sake of easy understanding, the same armature magnetic pole and core 5*a* are hatched in FIGS. 14 to 16.

Firstly, as FIG. 14(*a*) shows, a revolving magnetic field is generated so as to revolve to the left in FIG. 14(*a*) from such a state that the center of a certain core 5*a* and the center of a certain permanent magnet 4*a* coincide with each other in the circumferential direction and the center of a third core 5*a* from the certain core 5*a* and the center of a fourth permanent magnet 4*a* from the certain permanent magnet 4*a* coincide with each other in the circumferential direction. When the revolving magnetic field starts to be generated, the positions of the armature magnetic poles which are generated every other one and which have the same polarity are caused to coincide with the centers of the permanent magnets 4*a* of which the centers coincide with those of the cores 5*a* in the circumferential direction, and the polarities of the armature magnetic poles are caused to differ from the polarities of the magnet magnetic poles of the permanent magnets 4*a*.

As has been described before, since the revolving magnetic field generated by the stator 3 is generated between the primary rotor 4 and the stator 3 and the secondary rotor 5 which has the cores 5*a* is disposed between the stator 3 and the primary rotor 4, the cores 5*a* are magnetized by the armature magnetic poles and the magnet magnetic poles. From this fact and the fact that spaces are formed between the adjacent cores 5*a*, a magnetic line of force ML is generated so as to connect the armature magnetic pole with the core 5*a*. In FIGS. 14 to 16, as a matter of convenience, magnetic lines of force ML at the iron core 3*a* and the fixing portion 4*b* are omitted. This will also be true with the other drawings which will be described later.

In the state shown in FIG. 14(*a*), magnetic lines of force ML are generated so as to connect the armature magnetic poles, the cores 5*a* and the magnet magnetic poles which correspond in circumferential position to each other and to connect the armature magnetic poles, the cores 5*a* and the magnet magnetic poles which lie adjacent to circumferential sides of the armature magnetic poles, the cores 5*a* and the magnet magnetic poles which correspond in circumferential position to each other in the circumferential direction. In addition, in this state, a magnetic force which attempts to rotate the cores 5*a* in the circumferential direction does not act on the cores 5*a*, since the magnetic lines of force ML generated are rectilinear.

Then, when the armature magnetic poles rotate from the positions shown in FIG. 14(*a*) to positions shown in FIG. 14(*b*) as the revolving magnetic fields revolves, the magnetic lines of force ML are curved, and in association with the magnetic lines of force ML being so curved, a magnetic force acts on the cores 5*a* so that the magnetic lines of force ML become rectilinear. As this occurs, the magnetic lines of force ML are curved so as to be convex in an opposite direction to the rotational direction of the revolving magnetic filed (hereinafter, referred to as a "magnetic field revolving direction" in the cores 5*a* to which the magnetic force is being applied relative to the straight lines which connect the armature magnetic poles and the magnet magnetic poles which are connected by the magnetic lines of force ML. Therefore, the magnetic force acts so as to drive the cores 5*a* in the magnetic field rotational direction. The cores 5*a* are driven in the magnetic field rotational direction by the action of the magnetic force applied by the magnetic lines of force ML to rotate to positions shown in FIG. 14(*c*). Then, the secondary rotor 2 on which the cores 5*a* are provided and the connecting shaft 13 also rotate in the magnetic field rotational direction. Broken lines in FIGS. 14(*b*) and 14(*c*) represent that the amount of magnetic flux in the magnetic lines of force ML is extremely small and the magnetic connection between the armature magnetic poles, the cores 5*a* and the magnet magnetic poles is weak. This will be true with the other drawings which will be described later.

In addition, as the revolving magnetic field revolves further, the series of operations, that is, "the magnetic lines of force ML are curved so as to be convex in the opposite direction to the magnetic field rotational direction in the cores 5*a* the magnetic force acts on the cores 5*a* so that the magnetic lines of force ML become rectilinear→the cores 5, the secondary rotor 5 and the connecting shaft 13 rotate in the magnetic field rotational direction" is performed repeatedly as is shown in FIGS. 15(*a*) to 15(*d*) and FIGS. 16(*a*) and (*b*). Thus, the electric power supplied to the stator 3 is converted into power by the action of the magnetic force resulting from the magnetic lines of force ML in the way described above so as to be outputted from the connecting shaft 13.

Figure 17:
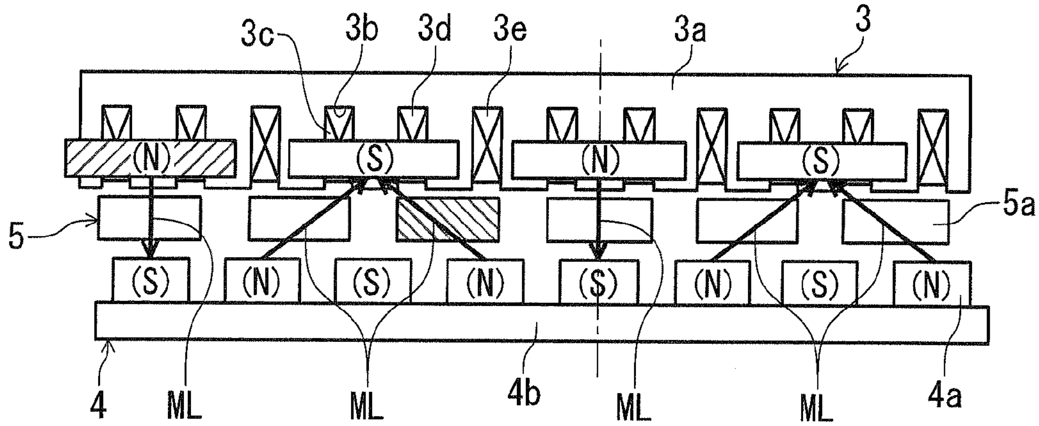
FIG. 17 is a diagram illustrating a positional relation of armature magnetic poles and cores when the armature magnetic poles rotate by an electrical angle $2\pi$.

In addition, FIG. 17 shows a state resulting when the armature magnetic poles rotate by an electrical angle of $2\pi$ from the state shown in FIG. 14(*a*). As is clear from a comparison of FIG. 17 with FIG. 14(*a*), it is seen that the cores 5*a* rotate in the same direction by one third of the rotational angle relative to the armature magnetic poles. This result coincides with the fact that ωER2=ωMFR/3 is obtained by giving ωER2=0 in Equation (40).

Figure 19:
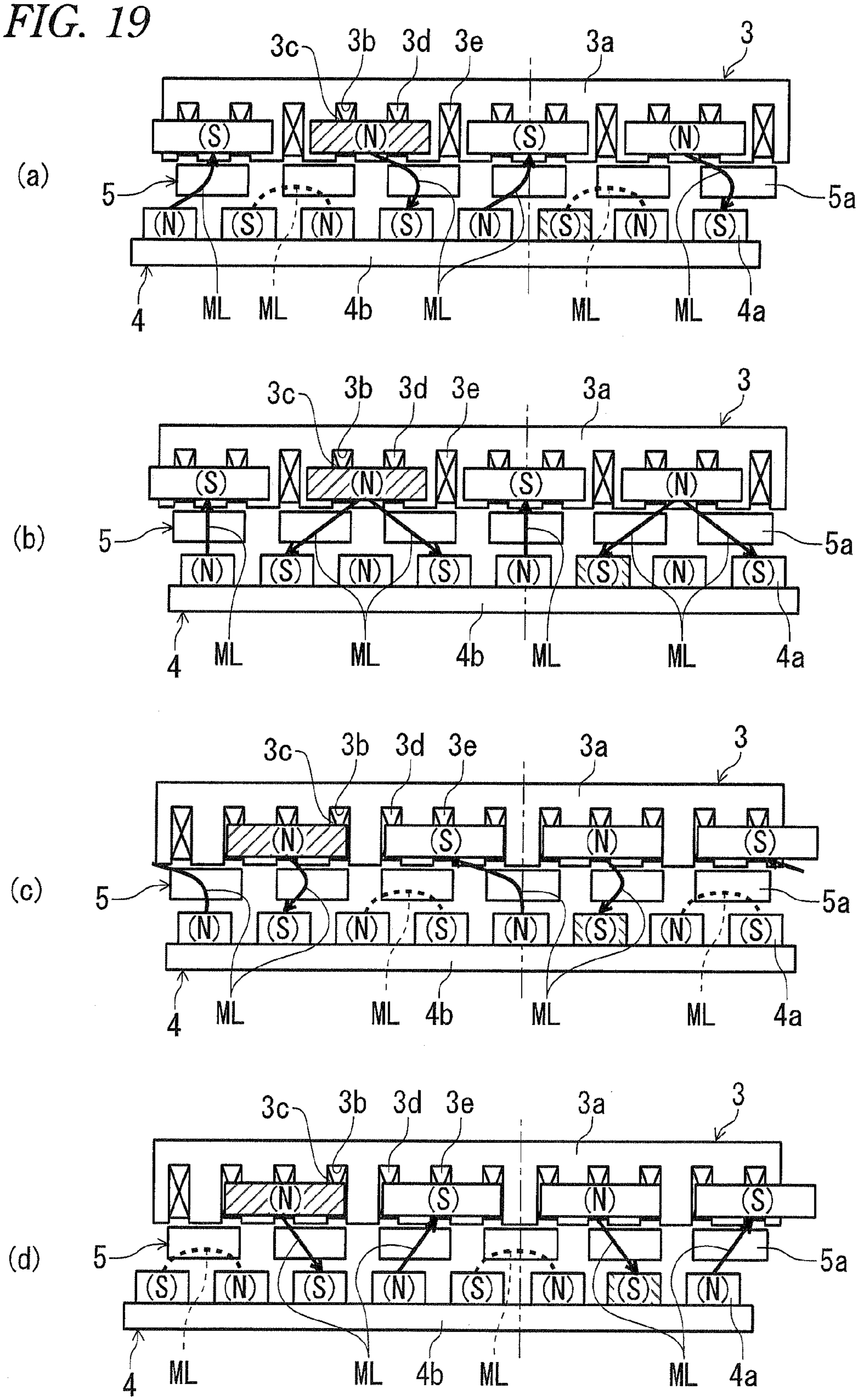
FIG. 19 shows diagrams illustrating operations subsequent to the operations shown in FIG. 18.
Figure 20:
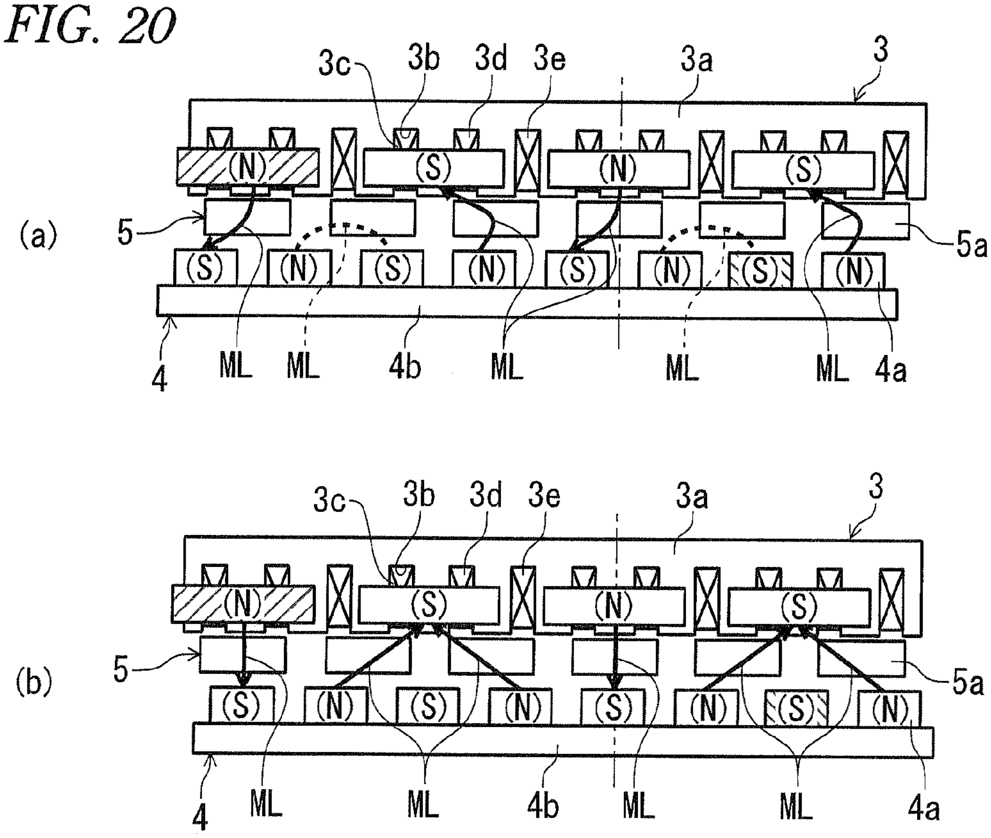
FIG. 20 shows diagrams illustrating operations subsequent to the operations shown in FIG. 19.

Next, referring to FIGS. 18 to 20, a case will be described in which electric power is supplied to the stator 3 in such a state that the secondary rotor 5 is fixed. In FIGS. 18 to 20, for the sake of easy understanding, the same armature magnetic pole and permanent magnet 4*a* are hatched. Firstly, as FIG. 18(*a*) shows, similarly to the case shown in FIG. 14(*a*), the revolving magnetic field is generated so as to revolve to the left in FIG. 18(*a*) from such a state that the center of a certain core 5*a* and the center of a certain permanent magnet 4*a* coincide with each other in the circumferential direction and the center of a third core 5*a* from the certain core 5*a* and the center of a fourth permanent magnet 4*a* from the certain permanent magnet 4*a* coincide with each other in the circumferential direction. When the revolving magnetic field starts to be generated, the positions of the armature magnetic poles which are generated every other one and which have the same polarity are caused to coincide with the centers of the permanent magnets 4*a* of which the centers coincide with those of the cores 5*a* in the circumferential direction, and the polarities of the armature magnetic poles are caused to differ from the polarities of the magnet magnetic poles of the permanent magnets 4*a*.

In the state shown in FIG. 18(*a*), similarly to the case shown in FIG. 14(*a*), magnetic lines of force ML are generated so as to connect the armature magnetic poles, the cores 5*a* and the magnet magnetic poles which correspond in circumferential position to each other and to connect the armature magnetic poles, the cores 5*a* and the magnet magnetic poles which lie adjacent to circumferential sides of the armature magnetic poles, the cores 5*a* and the magnet magnetic poles which correspond in circumferential position to each other in the circumferential direction. In addition, in this state, a magnetic force which attempts to rotate the permanent magnets 4*a* in the circumferential direction does not act on the permanent magnets 4*a*, since the magnetic lines of force ML generated are rectilinear.

Then, when the armature magnetic poles rotate from the positions shown in FIG. 18(*a*) to positions shown in FIG. 18(*b*) as the revolving magnetic fields revolves, the magnetic lines of force ML are curved, and in association with the magnetic lines of force ML being so curved, a magnetic force acts on the permanent magnets 4*a* so that the magnetic lines of force ML become rectilinear. As this occurs, the permanent magnets 4*a* are positioned to advance further in the magnetic field rotational direction than extensions of the armature magnetic poles and the cores 5*a* which are connected to each other by the magnetic lines of force ML. Therefore, the magnetic force acts so as to position the permanent magnets 4*a* on the extensions, that is, so as to drive the permanent magnets 4*a* in an opposite direction to the magnetic field rotational direction. The permanent magnets 4*a* are driven in the opposite direction to the magnetic field rotational direction by the action of the magnetic force applied by the magnetic lines of force ML to rotate to positions shown in FIG. 18(*c*). Then, the primary rotor 1 on which the permanent magnets 4*a* are provided and the primary main shaft 11 also rotate in the opposite direction to the magnetic field rotational direction.

In addition, as the revolving magnetic field revolves further, the series of operations, that is, "the magnetic lines of force ML are curved and the permanent magnets 4$a$ are positioned to advance further in the magnetic field rotational direction than the extensions of the armature magnetic poles and the cores 5$a$ which are connected to each other by the magnetic lines of force ML→the magnetic force acts on the permanent magnets 4$a$ so that the magnetic lines of force ML become rectilinear→the permanent magnets 4$a$, the primary rotor 4 and the primary main shaft 11 rotate in the opposite direction to the magnetic field rotational direction" is performed repeatedly as is shown in FIGS. 19($a$) to 19($d$) and FIGS. 20($a$) and ($b$). Thus, the electric power supplied to the stator 3 is converted into power by the action of the magnetic force resulting from the magnetic lines of force ML in the way described above so as to be outputted from the primary main shaft 11.

In addition, FIG. 20($b$) shows a state resulting when the armature magnetic poles rotate by an electrical angle of 2π from the state shown in FIG. 18($a$). As is clear from a comparison of FIG. 20($b$) with FIG. 18($a$), it is seen that the permanent magnets 4$a$ rotate in the opposite direction by half the rotational angle relative to the armature magnetic poles. This result coincides with the fact that −ωER1=ωMFR/2 is obtained by giving ωER2=0 in Equation (40) above.

Figure 21:
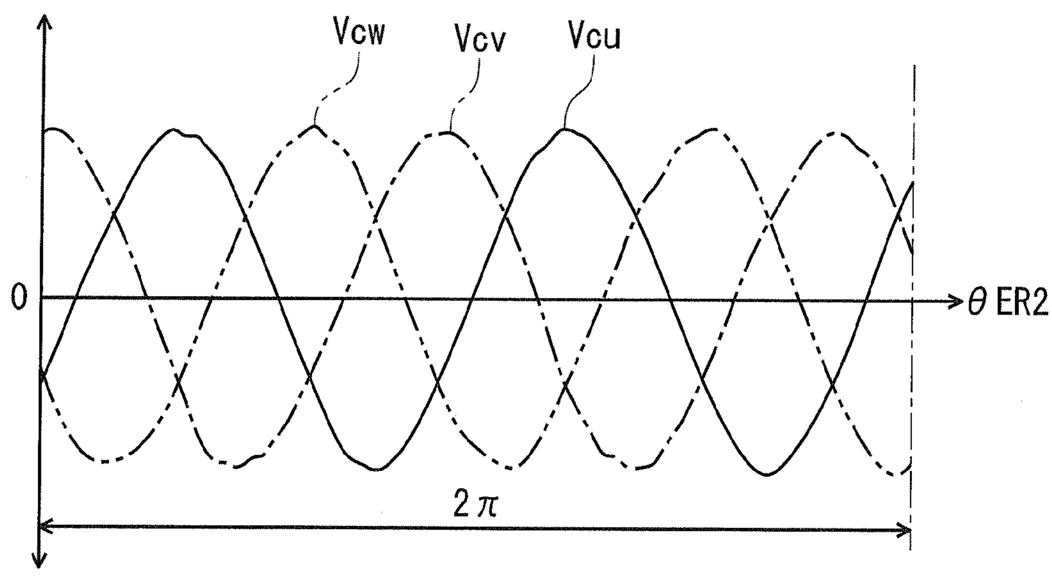
FIG. 21 is a chart showing an example of transition of counter electromotive voltages of phases U to W with the primary rotor of the electric motor of the embodiment fixed.
Figure 22:
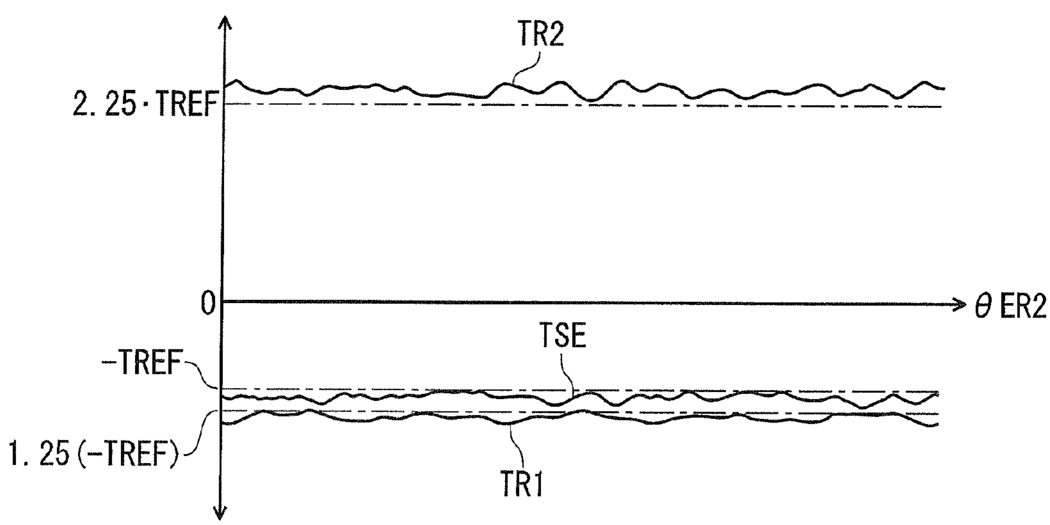
FIG. 22 is a chart showing an example of transition of drive equivalent torque and torques transmitted to the primary and secondary rotors with the primary rotor of the electric motor fixed.

In addition, FIGS. 21 and 22 show the result of a simulation made to simulate a case where the numbers of armature magnetic poles, cores 5$a$ and permanent magnets 4$a$ are set to a value of 16, a value 18 and a value of 20, respectively, and with the primary rotor 4 fixed, electric power is supplied to the stator 3 so that power is outputted from the secondary rotor 5. FIG. 21 shows an example of transition of counter electromotive voltages Vcu to Vcw of the phases U to W while the secondary rotor electrical angle θER2 changes through 2π after having started to change from 0.

In this case, the relation between the magnetic field electrical angular velocity ωMFR and the primary and secondary rotor electrical angular velocities ωER1, ωER2 is expressed by ωMFR=2.25.ωER2 from the fact that the primary rotor 4 is fixed, the fact that the pole pair numbers of the armature magnetic poles and the magnet magnetic poles assume a value of 8 and a value of 10, respectively and from Equation (25). As FIG. 21 shows, the counter electromotive voltages Vcu to Vcw of the phases U to W are generated almost 2.25 cycles while the secondary rotor electrical angle θER2 changes through 2π after having started to change from 0. In addition, FIG. 21 shows how the counter electromotive voltages Vcu to Vcw of the phases U to W change when seen from the secondary rotor 5. As FIG. 21 shows, these counter electromotive voltages are aligned sequentially in the order of the counter electromotive voltage Vcw of the phase W, the counter electromotive voltage Vcv of the phase V and the counter electromotive voltage Vcu of the phase U along the axis of abscissas denoting the secondary rotor electrical angle θER2. This represents that the secondary rotor 5 rotates in the magnetic field rotational direction. Thus, it can be confirmed from the result of the simulation shown in FIG. 21 that ωMFR=2.25·ωER2 is established.

Further, FIG. 22 shows an example of transition of driving equivalent torque TSE and primary and secondary rotor transfer torques TR1, TR2. In this case, a relation between the driving equivalent torque TSE and the primary and secondary transfer torques TR1, TR2 is expressed by TSE=TR1/1.25=−TR2/2.25 from the fact that the pole pair numbers of the armature magnetic poles and the magnet magnetic poles assume the value of 8 and the value of 10, respectively, and Equation (32) above. As FIG. 22 shows, the driving equivalent torque TSE is almost −TREF, the primary rotor transfer torque TR1 is almost 1.25.(−TRF), and the secondary rotor transfer torque R2 is almost 2.25·TREF. This TREF is a predetermined torque value (for example, 200 Nm). In this way, it can be confirmed from the result of the simulation shown in FIG. 22 that TSE=TR1/1.25=−TR2/2.25 is established.

Figure 23:
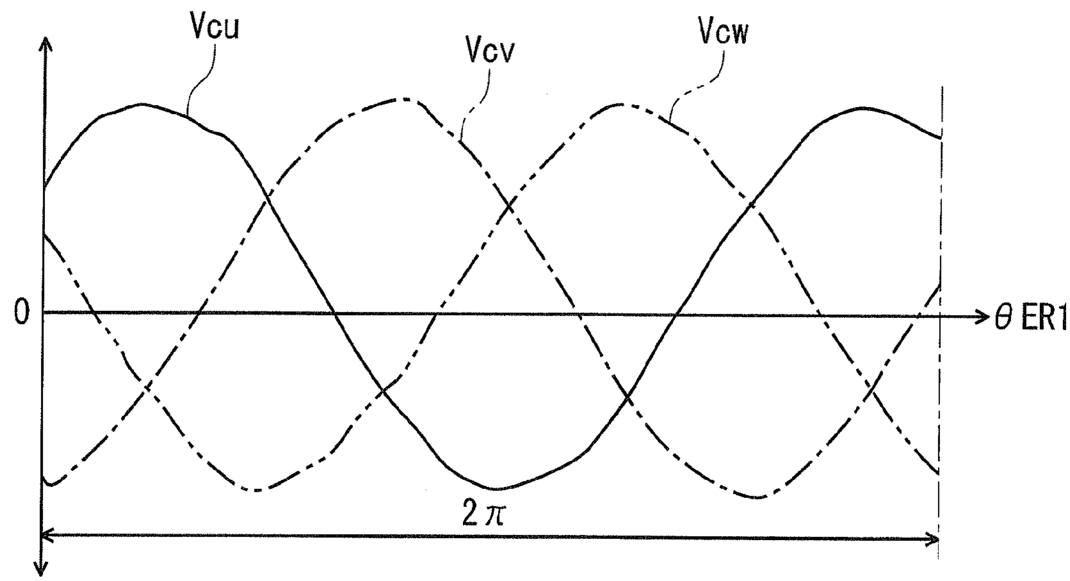
FIG. 23 is a chart showing an example of transition of counter electromotive voltages of phases U to W with the secondary rotor of the electric motor of the embodiment fixed.
Figure 24:
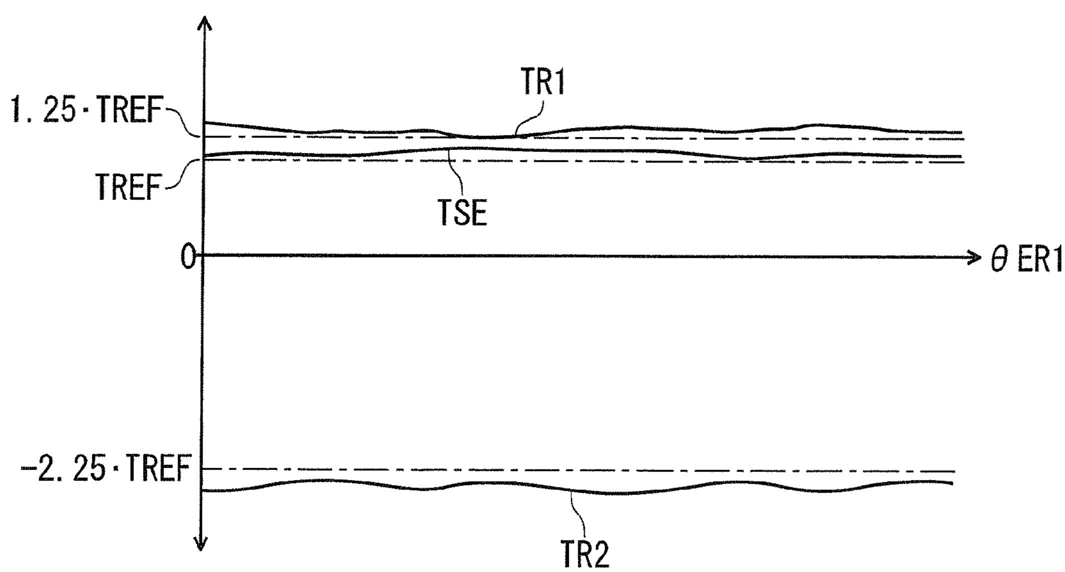
FIG. 24 is a chart showing an example of transition of drive equivalent torque and torques transmitted to the primary and secondary rotors with the secondary rotor of the electric motor fixed.

In addition, FIGS. 23 and 24 show the result of a simulation made to simulate a case where the numbers of armature magnetic poles, cores 5$a$ and permanent magnets 4$a$ are set in the same way as the case shown in FIGS. 21 and 22, and with the secondary rotor 5 fixed in place of the primary rotor, electric power is supplied to the stator 3 so that power is outputted from the primary rotor 4. FIG. 23 shows an example of transition of counter electromotive voltages Vcu to Vcw of the phases U to W while the primary rotor electrical angle θER1 changes through 2π after having started to change from 0.

In this case, the relation between the magnetic field electrical angular velocity colVIFR and the primary and secondary rotor electrical angular velocities ωER1, ωER2 is expressed by ωMFR=−1.25·ωER1 from the fact that the secondary rotor 5 is fixed, the fact that the pole pair numbers of the armature magnetic poles and the magnet magnetic poles assume a value of 8 and a value of 10, respectively and from Equation (25). As FIG. 23 shows, the counter electromotive voltages Vcu to Vcw of the phases U to W are generated almost 1.25 cycles while the primary rotor electrical angle θER1 changes through 2π after having started to change from 0. In addition, FIG. 23 shows how the counter electromotive voltages Vcu to Vcw of the phases U to W change when seen from the primary rotor 4. As FIG. 23 shows, these counter electromotive voltages are aligned sequentially in the order of the counter electromotive voltage Vcu of the phase U, the counter electromotive voltage Vcv of the phase V and the counter electromotive voltage Vcw of the phase W along the axis of abscissas denoting the primary rotor electrical angle θER1. This represents that the primary rotor 4 rotates in the opposite direction to the magnetic field rotational direction. Thus, it can also be confirmed from the result of the simulation shown in FIG. 23 that wMFR=−1.25−ωER1 is established.

Further, FIG. 24 shows an example of transition of driving equivalent torque TSE and primary and secondary rotor transfer torques TR1, TR2. In this case, too, similarly to the case shown in FIG. 22, a relation between the driving equivalent torque TSE and the primary and secondary transfer torques TR1, TR2 is expressed by TSE=TR1/1.25=−TR2/2.25 from Equation (32) above. As FIG. 24 shows, the driving equivalent torque TSE is almost TREF, the primary rotor transfer torque TR1 is almost 1.25·(TRF), and the secondary rotor transfer torque R2 is almost −2.25.TREF. In this way, it can also be confirmed from the result of the simulation shown in FIG. 24 that TSE=TR1/1.25=−TR2/2.25 is established.

Thus, as has been described heretofore, in the electric motor 2, when electric power is supplied to the stator 3 to generate the revolving magnetic field, the magnetic line of force ML is generated so as to connect the first magnetic pole, the core 5$a$ and the armature magnetic pole. Then, the electric power supplied to the stator 3 is converted into power by the action of the magnetic force applied by the magnetic line of force ML. Eventually, the power so converted is output from the primary rotor 4 or the secondary rotor 5. As this occurs, the relation expressed by Equation (40) above is established between the magnetic field electrical angular velocity ωMFR and the rotor electrical angular velocities ωER1, ωER2 of the primary rotor 4 and the secondary rotor 5. In addition, the relation expressed by Equation (41) is established between the driving equivalent torque TSE, the rotor transfer torques TR1, TR2 of the primary rotor 4 and the secondary rotor 5.

Because of this, when at least either of the primary rotor 4 or the secondary rotor 5 is caused to rotate relative to the stator 3 by inputting power into at least either of the primary rotor 4 and the secondary rotor 5 with no electric power supplied to the stator 3, electric power is generated in the stator 3, and at the same time, the revolving magnetic field is generated. In this case, too, a magnetic line of force ML is generated so as to connect the first armature magnetic pole, the core 5*a* and the first armature magnetic pole, and the relation of electrical angular velocity expressed by Equation (40) and the relation expressed by Equation (41) are established by the action of the magnetic force applied by the magnetic line of force ML so generated.

Namely, when a torque equivalent to the electric power generated and the first magnetic field electrical angular velocity ωMFR is referred to as a generating equivalent torque TGE, a relation expressed by Equation (52) below is established between the generating equivalent torque TGE 1 and the rotor transfer torques TR 1, TR2 of the primary rotor 4 and the secondary rotor 5.

[Equation 49]

$$TGE=TR1/2=-TR2/3 \quad (52)$$

In addition, Equation (53) below is established between the revolving velocity of the revolving magnetic field (hereinafter, referred to as the "magnetic field revolving velocity VMF") and the rotating velocities of the primary rotor 4 and the secondary rotor 5 (hereinafter, referred to as the "primary rotor rotating velocity VR1" and "secondary rotor rotating velocity VR2", respectively).

[Equation 50]

$$VMF=3\cdot VR2-2\cdot VR1 \quad (53)$$

As is clear from what has been discussed, the electric motor 2 has the same function as that of an apparatus made up of a combination of a planetary gear set and a general one rotor type rotating machine.

Next, the transmission 20 of the power output system 1 will be described.

The transmission 20 is a so-called twin-clutch transmission which includes at least two or more transmission mechanisms and two transmission shafts which are connected to the primary clutch 41 and the secondary clutch 42, respectively. The power output system 1 of this embodiment is a two-stage transmission including two transmission mechanisms of a second speed transmission gear pair 22 and a third speed transmission gear pair 23 of which a gear ratio is smaller than that of the second speed transmission gear pair 22.

Figure 2:
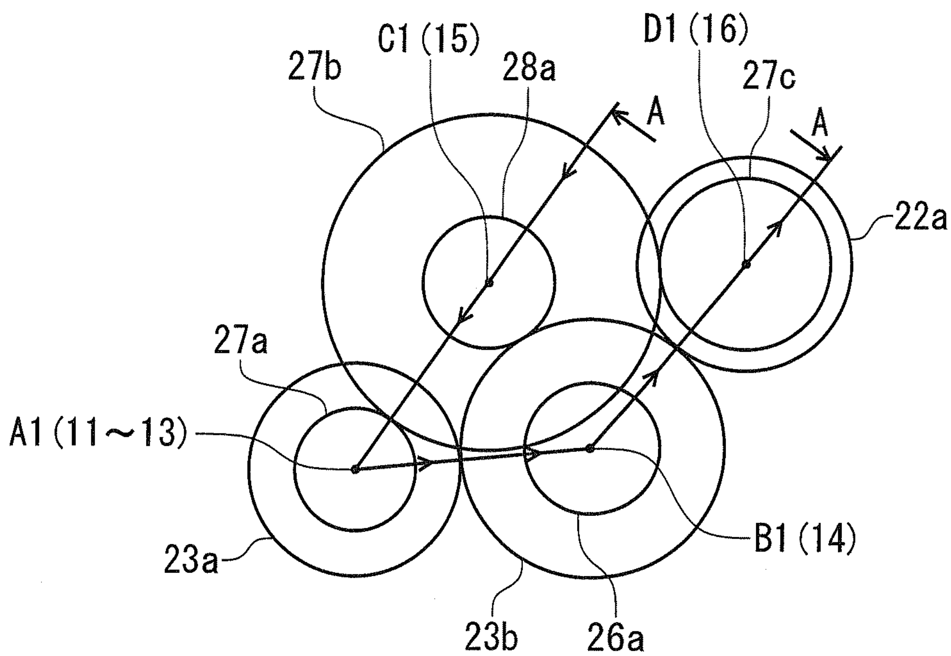
FIG. 2 is an explanatory diagram showing a relation of a power transmission mechanism of the power output system shown in FIG. 1.

More specifically speaking, as FIGS. 1 and 2 show, the transmission 20 includes the primary main shaft 11 (the primary transmission shaft), a secondary main shaft 12 and the connecting shaft 13 which are disposed on the same axis (a rotational axis A1), a counter shaft 14 which can rotate freely about a rotational axis B1 which is disposed parallel to the rotational axis A1, a primary intermediate shaft 15 (an intermediate shaft) which can rotate freely about a rotational axis C1 which is disposed parallel to the rotational axis A1 and a secondary intermediate shaft 16 (a secondary transmission shaft) which can rotate freely about a rotational axis D1 which is disposed parallel to the rotational axis A1.

The primary clutch 41 is connected to the primary shaft 11 on an engine 6 side thereof, and the primary rotor 4 of the electric motor 2 is mounted on the primary shaft 11 on an opposite side to the engine 6 side, whereby the power transfer from a crankshaft 6*a* to the primary rotor 4 can be controlled by engaging or disengaging the primary clutch 41.

The secondary main shaft 12 is shorter than the primary main shaft 11 and has a hollow construction. The secondary main shaft 12 is disposed so as to rotate freely relative to the primary main shaft 11 while covering the engine 6 side of the primary main shaft 11 around the circumference thereof. The secondary main shaft 12 is supported by a bearing 12*a* which is fixed to a casing, not shown. The secondary clutch 42 is connected to an engine 6 side of the secondary main shaft 12, and an idle drive gear 27*a* is mounted on a side of the secondary main shaft 12 which is opposite to the engine 6 side thereof, whereby the power transfer from the crankshaft 6*a* to the idle drive gear 27*a* is controlled by engaging and disengaging the secondary clutch 42.

The connecting shaft 13 is shorter than the primary main shaft 11 and has a hollow construction. The connecting shaft 13 is disposed so as to rotate freely relative to the primary main shaft 11 while covering a side of the primary main shaft 11 which is opposite to the engine 6 side of the primary main shaft 11 around the circumference thereof. The connecting shaft 13 is supported by a bearing 13*a* which is fixed to the casing, not shown. A third speed drive gear 23*a* is mounted on an engine 6 side of the connecting shaft 13, and the secondary rotor 5 of the electric motor 2 is mounted on an opposite side to the engine 6 side across the bearing 13*a*. Consequently, the secondary rotor 5 and the third speed drive gear 23*a* are designed to rotate together.

Further, a first change-speed shifter 51 is provided on the primary main shaft 11 so as to connect and disconnect the third speed drive gear 23*a* mounted on the connecting shaft 13 to and from the primary main shaft 11. When the first change-speed shifter 51 is shifted in a third speed connecting position for gear engagement, the primary main shaft 11 and the third speed drive gear 23*a* are connected together to rotate together. When the first change-speed shifter 51 is in a neutral position, the primary main shaft 11 and the third speed drive gear 23*a* are disconnected from each other, whereby the primary main shaft 11 and the third speed drive gear 23*a* rotate relatively to each other. When the primary main shaft 11 and the third speed drive gear 23*a* rotate together, the primary rotor 4 mounted on the primary shaft 11 and the secondary rotor 5 connected to the third speed drive gear 23*a* via the connecting shaft 13 rotate together.

The counter shaft 14 is supported rotatably by bearings 14*a*, 14*b* which are fixed to the casing, not shown, at both end portions thereof. Mounted on the counter shaft 14 are a third speed driven gear 23*b* which meshes with the third speed drive gear 23*a* and a final gear 26*a* which meshes with the differential gear mechanism 8. This final gear 26*a* is connected to the differential gear mechanism 8, and the differential gear mechanism 8 is connected to the drive wheels DW, DW by way of the drive shafts 9, 9. Consequently, power transferred to the third speed driven gear 23*b* is outputted to the drive shafts 9, 9 from the final gear 26*a*. In the power output system 1, the counter shaft 14 is made to function as an output shaft. The third speed driven gear 23*b* makes a third speed gear pair 23 together with the third speed drive gear 23*a*.

The primary intermediate shaft 15 is supported rotatably by bearings 15*a*, 15*b* which are fixed to the casing, not shown. Mounted on the primary intermediate shaft 15 is a first idle driven gear 27*b* which meshes with the idle drive gear 27*a* which is mounted on the secondary main shaft 12. In addition, mounted on the primary intermediate shaft 15 is a reverse drive gear 28*a* which can rotate relatively to the primary intermediate shaft 15. This reverse drive gear 28*a* meshes with the third speed driven gear 23*b* which is mounted on the counter shaft 14 and makes a reverse gear pair 28 together with the third speed driven gear 23*b*. Further, a reverse driving shifter 53 is provided on the primary intermediate shaft 15, and the reverse drive gear 28*a* is connected and disconnected to and from the primary intermediate shaft 15 by the reverse driving shifter 53. When the reverse driving shifter 53 is shifted into a reverse connecting position for gear engagement, the first idle driven gear 27*b* and the reverse drive gear 28*a* which are mounted on the primary intermediate shaft 15 rotate together, while when the reverse driving shifter 53 is in a neutral position, the first idle driven gear 27*b* and the reverse drive gear 28*a* rotate relatively to each other.

The secondary intermediate shaft 16 is supported rotatably by bearings 16*a*, 16*b* which are fixed to the casing, not shown, at both end portions thereof. Mounted on the secondary intermediate shaft 16 is a second idle driven gear 27*c* which meshes with the first idle driven gear 27*b* which is mounted on the primary intermediate shaft 15. The second idle driven gear 27*c* makes up an idle gear train 27 together with the idle drive gear 27*a* and the first idle driven gear 27*b*. In addition, a second speed drive gear 22*a* is mounted on the secondary intermediate shaft 16. This second speed drive gear 22*a* meshes with the third speed driven gear 23*b* which is provided on the counter shaft 14 and makes a second speed gear pair 22 together with the third speed driven gear 23*b*. Further, mounted on the secondary intermediate shaft 16 is a second change-speed shifter 52 which connects and disconnects the second speed drive gear 22*a* to and from the secondary intermediate shaft 16. When the second change-speed shifter 52 is shifted in a second speed connecting position for gear engagement, the second idle drive gear 27*c* and the second speed drive gear 22*a* which are mounted on the secondary intermediate shaft 16 rotate together, while when the second change-speed shifter 52 is in a neutral position, the second idle driven gear 27*c* and the second speed drive gear 22*a* rotate relatively to each other.

Consequently, in the transmission 20, the third speed drive gear 23*a* which is an odd numbered transmission gear is provided on the primary main shaft 11 which is one of the two transmission shafts, while the second speed drive gear 22*a* which is an even numbered transmission gear is provided on the secondary intermediate shaft 16 which is the other transmission shaft of the two transmission shafts, and the primary rotor 4 of the electric motor 2 is mounted on the primary main shaft 11.

For example, a claw clutch such as a dog clutch can be used for the first change-speed shifter 51, the second change-speed shifter 52 and the reverse driving shifter 53. In this embodiment, a clutch mechanism is used which was a synchronizing mechanism (a synchronizer mechanism) which synchronizes a rotating speed of a shaft with a rotating speed of another shaft which is connected to the shaft or a rotating speed of a shaft with a rotating speed of a gear which is connected to the shaft. The first and second change-speed shifters 51, 52 and the reverse driving shifter 53 are controlled by the ECU 116.

By adopting the configuration that has been described heretofore, the crankshaft 6*a* of the engine 6 is connected to the drive wheels DW, DW by way of the primary main shaft 11, the third speed gear pair 23 (the third speed drive gear 23*a*, the third speed driven gear 23*b*), the counter shaft 14, the final gear 26*a*, the differential gear mechanism 8 and the drive shafts 9, 9, when the primary clutch 41 is engaged and the first change-speed shifter 51 is shifted into the third speed connecting position for gear engagement. Hereinafter, the series of paths from the primary main shaft 11 to the drive shafts 9, 9 is referred to as a "first transmission path" from time to time.

In addition, the crankshaft 6*a* of the engine 6 is connected to the drive wheels DW, DW by way of the secondary main shaft 12, the idle gear train 27 (the idle drive gear 27*a*, the first idle driven gear 27*b*, the second idle driven gear 27*c*), the secondary intermediate shaft 16, the second speed gear pair 22 (the second speed drive gear 22*a*, the third speed driven gear 23*b*), the counter shaft 14, the final gear 26*a*, the differential gear mechanism 8 and the drive shafts 9, 9, when the secondary clutch 42 is engaged and the second change-speed shifter 52 is shifted into the second speed connecting position for gear engagement. Hereinafter, the series of paths from the secondary main shaft 12 to the drive shafts 9, 9 is referred to as a "second transmission path" from time to time.

In addition, the secondary rotor 5 of the electric motor 2 is connected to the drive wheels DW, DW by way of the connecting shaft 13, the third speed gear pair 23 (the third speed drive gear 23*a*, the third speed driven gear 23*b*), the counter shaft 14, the final gear 26*a*, the differential gear mechanism 8, and the drive shafts 9, 9. Hereinafter, the series of paths is referred to as a "third transmission path" from time to time.

The power output system 1 which is configured as has been described above has modes such as a combined torque drive, a normal driving, a motor driving, and an engine starting during the motor driving. The combined torque driving refers to a state in which the engine 6 and the electric motor 2 are connected by engaging only the primary clutch 41 with no gear engaged (including a state, for example, in which even when the second change-speed shifter 52 is shifted for gear engagement, the secondary clutch 42 is disengaged), and in this state, a combined toque of the torque of the engine 6 and the torque of the electric motor 2 is transmitted to the drive shafts 9, 9 via the third transmission path as a drive force corresponding to a first speed (Low). Hereinafter, this state is referred to as a Low mode.

Firstly, a state in which the vehicle is at a halt will be described.

Figure 25:
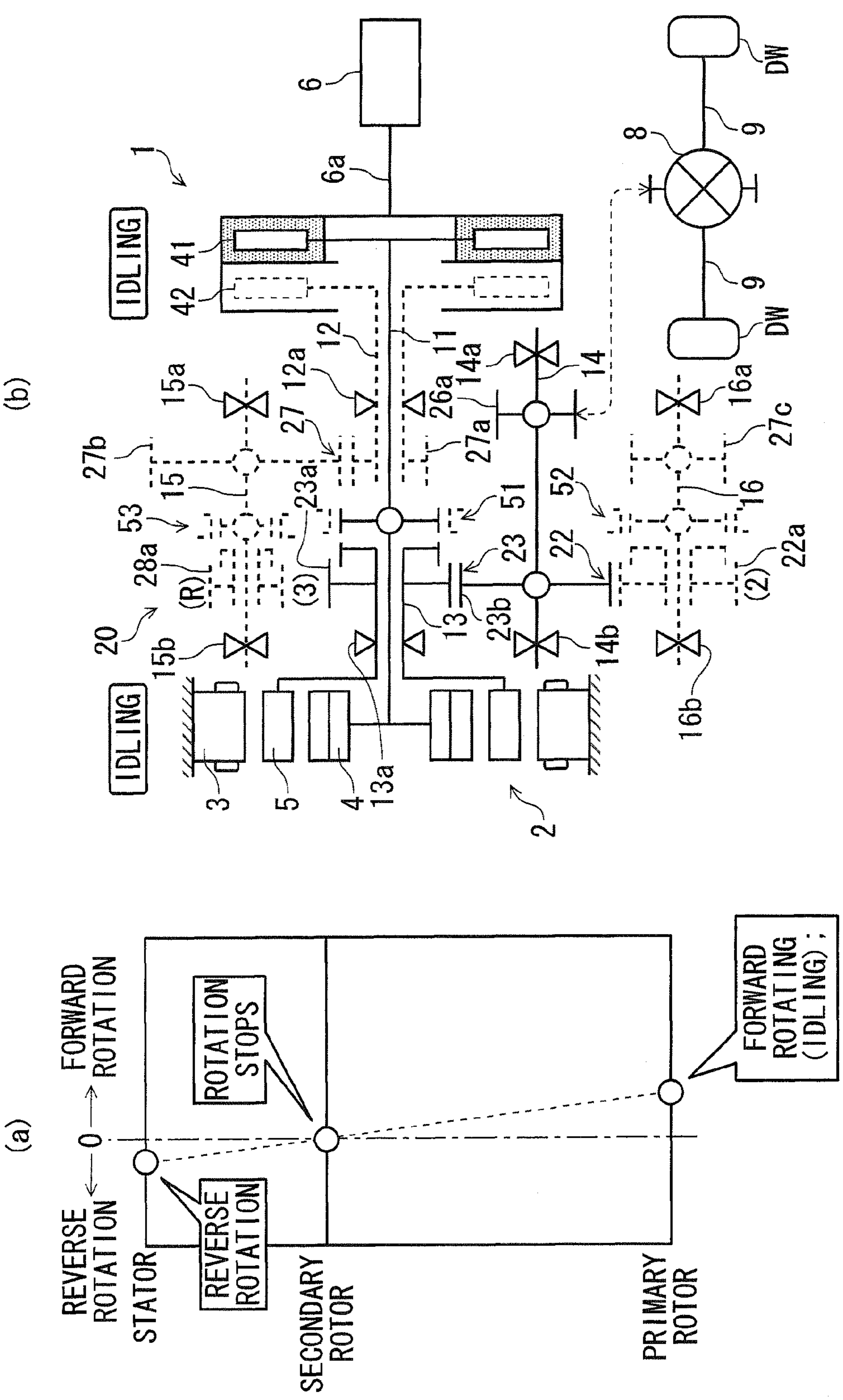
FIG. 25 shows diagrams illustrating states resulting when the vehicle is at a halt, of which (a) is a speed diagram, and (b) is a diagram illustrating a state of torque transmission of the power output system.

FIG. 25(*b*) shows a state in which the engine 6 is idling with the primary clutch engaged. As this occurs, torque of the engine 6 is transmitted from the primary main shaft 11 to the primary rotor 4. While the vehicle is at a halt, the drive shafts 9, 9 or the secondary rotor 5 is being stopped to rotate, and therefore, all the torque of the engine 6 is transmitted to the stator 3. As this occurs, as FIG. 25(*a*) shows, the primary rotor 4 rotates forwards, and a revolving magnetic field is generated in a reverse rotating direction in the stator 3.

In a speed diagram of FIG. 25(*a*), a rotation stop position is denoted by 0, and a right-hand side of the rotation stop position or 0 is referred to as a forward rotating direction, while a left-hand side of the rotation stop position or 0 is referred to as a reverse rotating direction. This will be true with speed diagrams which will be described later. In addition, in a diagram (for example, FIG. 26(*b*)) illustrating a torque transmitting condition which will be described later, hatched thick arrows denote flows of torque, and the hatchings in the arrows correspond to hatchings of arrows indicating torques in a speed diagram (for example, FIG. 26(*a*)).

Next, acceleration of the combined torque drive (Low mode) in the power output system 1 will be described.

There are the following acceleration patterns: (i) as FIG. 26(*a*) shows, the revolving speeds of the electric motor 2 and the engine 6 are both increased, or (ii) as FIG. 27(*a*) shows, the revolving speed of the engine 6 is increased while the revolving speed of the electric motor 2 is kept unchanged, or (iii) as FIG. 27(*b*) shows, the revolving speed of the electric motor 2 is increased while the revolving speed of the engine 6 is kept unchanged. In the case of (i), the power of the vehicle is determined by a combined power of the power of the engine 6 and the power of the electric motor 2. In the case of (ii), the power of the vehicle is determined by the power of the engine 6. In the case of (iii), the power of the vehicle is determined by the power of the electric motor 2.

For example, when the residual capacity of a battery system is small, the acceleration pattern described under (ii) is selected. When no energy becomes available from the battery system on an uphill, as FIG. 27(*a*) shows, the engine torque is increased, and the generating equivalent torque TGE is caused to act in a direction (a forward rotating direction) in which the revolving speed of the revolving magnetic field in the reverse rotating direction is decreased, whereby the combined power can be transmitted to the drive shafts 9, 9 while the electric motor 2 is caused to operate in a regenerative mode. Here, in the power output system of the invention, the electric motor 2 and the third transmission path are configured so that the combined power of the engine torque TENG which is transmitted from the secondary rotor 5 to the drive shafts 9, 9 by way of the third transmission path and the generating equivalent torque TGE becomes a torque which is equivalent to the torque of a starting gear or a first speed gear, while the electric motor 2 is caused to operate in the regenerative mode by the power of the engine 6 transmitted from the primary rotor 4 by engaging the primary clutch 41. Consequently, even when the residual capacity of the battery system of the hybrid vehicle becomes nil, the vehicle can be started or driven at low speeds while the electric motor 2 is caused to operate in the regenerative mode to charge the battery system, thus, making it possible to deal with the case where the residual capacity of the battery system becomes nil.

On the other hand, for example, when the residual capacity of the battery system is large, the acceleration pattern described under (iii) is selected. When the residual capacity of the battery system is large, no more regenerative energy can be stored. Therefore, the residual capacity of the battery system is decreased by driving the hybrid vehicle using the electric motor 2 so as to increase the coefficient of use of regenerative energy.

When the revolving speed of the engine 6 is excessively higher than that of the electric motor 2, an overspeed is induced, whereas when the revolving speed of the electric motor 2 is excessively higher than that of the engine 6, an engine stall is induced. Therefore, the balance between the engine 6 and the electric motor 2 needs to be controlled.

Figure 26:
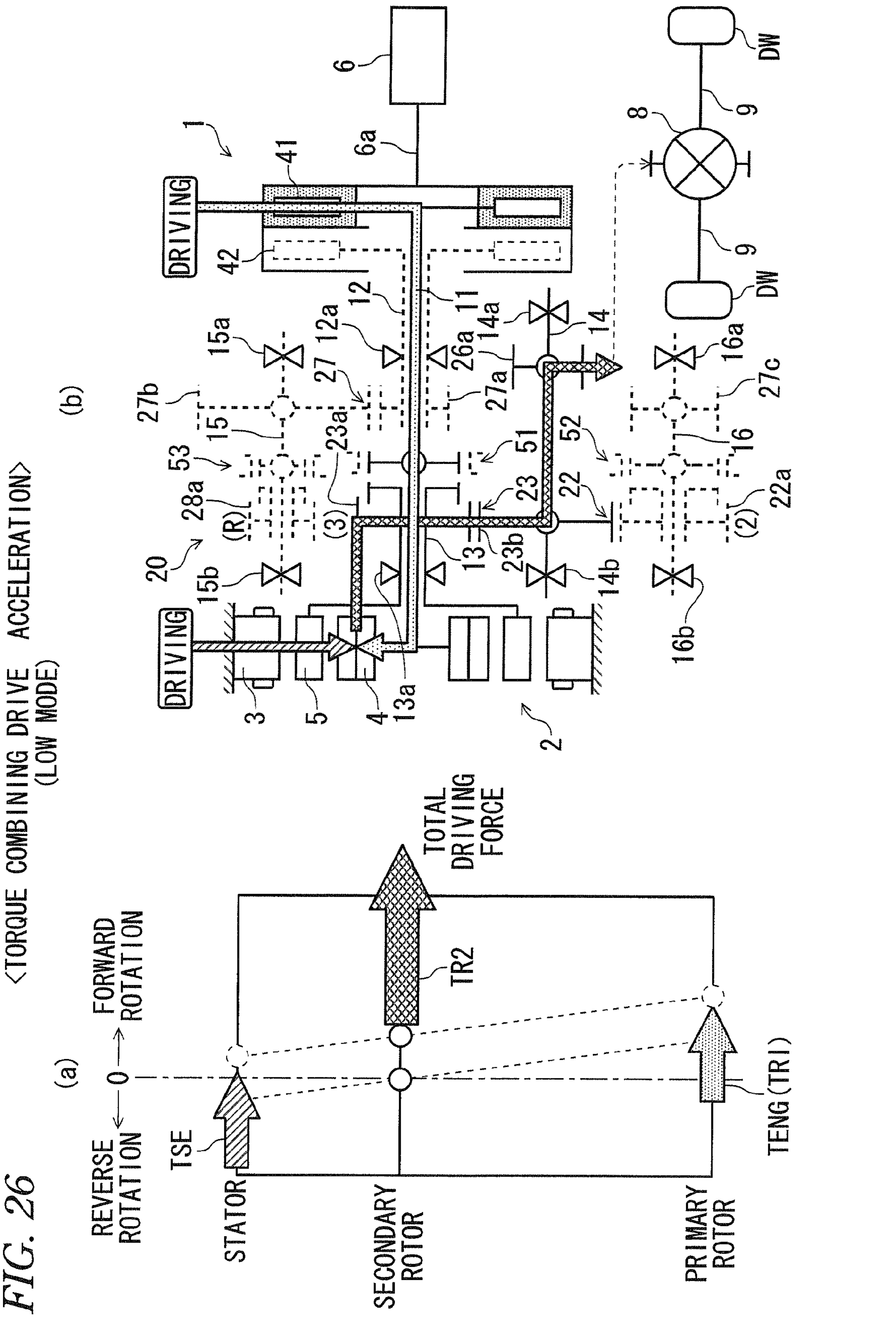
FIG. 26 shows diagrams illustrating states when the vehicle is accelerated during a torque combined drive (Low mode), of which (a) is a speed diagram, and (b) is a diagram illustrating a state of torque transmission of the power output system.
Figure 27:
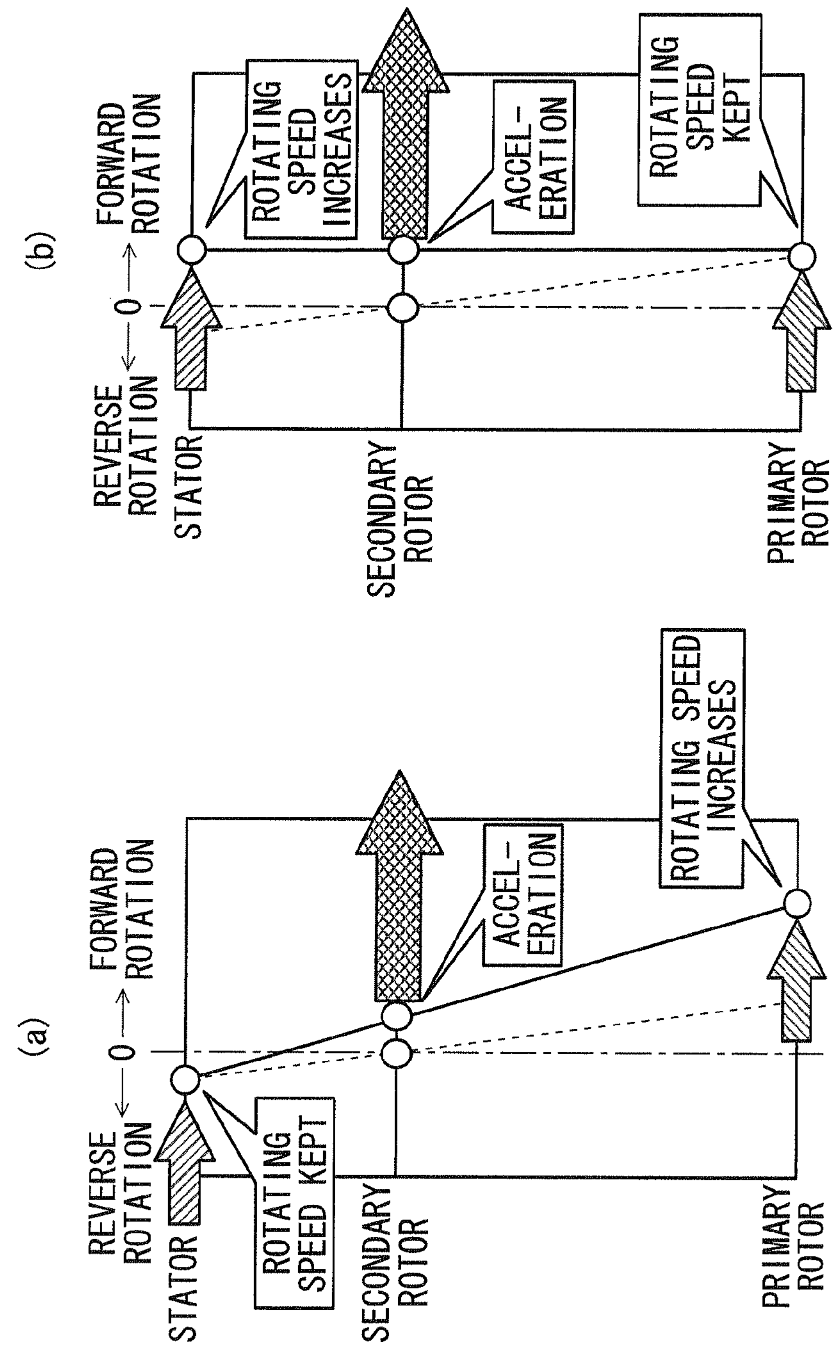
FIG. 27 shows diagrams illustrating acceleration patterns during the torque combined drive, of which (a) is a speed diagram with the revolution speed of the motor fixed, and (b) is a speed diagram with the revolution speed of the engine fixed.

To describe the control of acceleration of the vehicle in the Low mode by taking the case described under (i) as an example, as FIG. 26(*a*) shows, by increasing the engine torque TENG and the electric power supplied to the stator 3, the primary rotor transfer torque TR1 which acts in the forward rotating direction and which is transferred from the primary rotor 4 and the driving equivalent torque TSE which acts in the forward rotating direction and which corresponds to the electric power supplied to the stator 3 are combined together, and the combined secondary rotor transfer torque TR2 is applied to the secondary rotor 5. This combined secondary rotor transfer torque TR2 constitutes a total driving force, which is transmitted to the drive wheels DW, DW by way of the third transmission path as is shown in FIG. 26(*b*), thereby making it possible to accelerate the vehicle.

Figure 28:
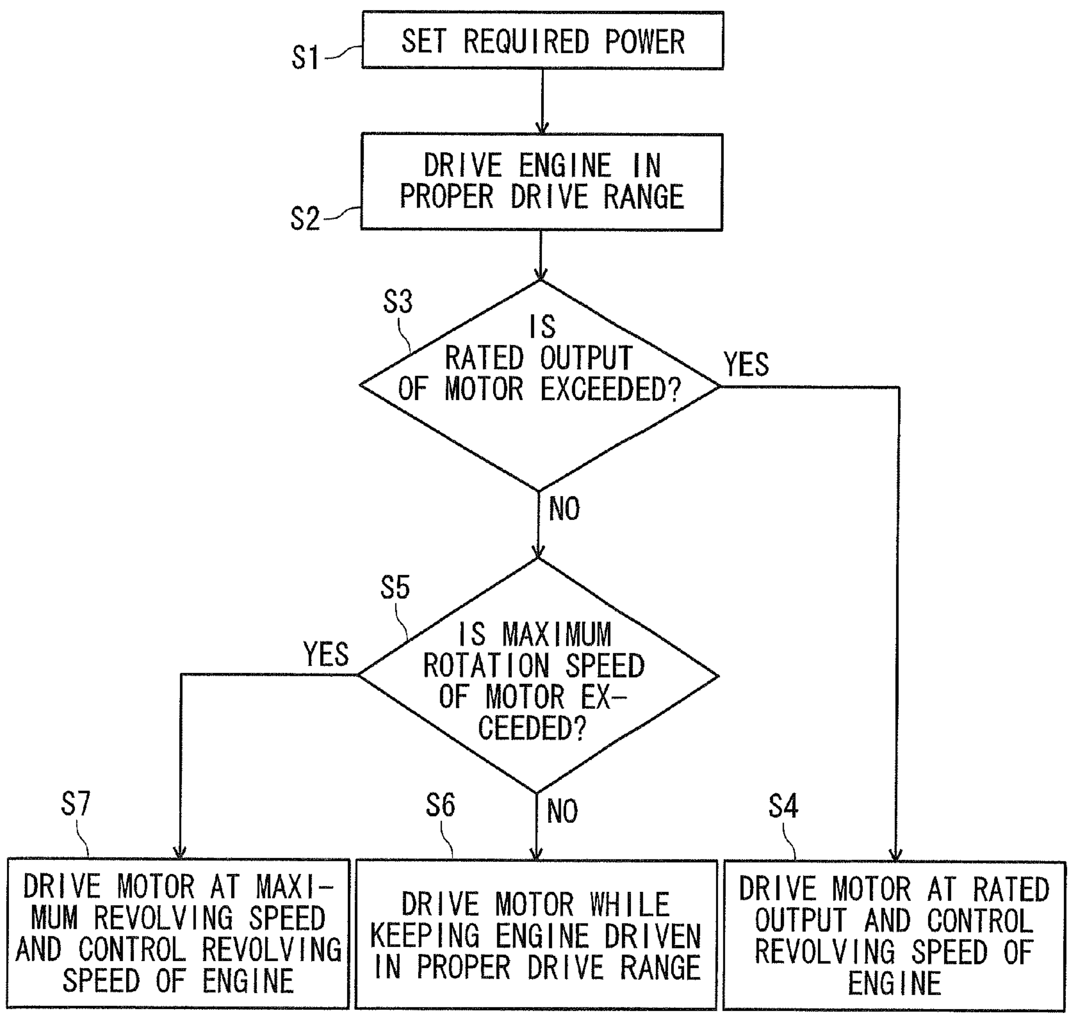
FIG. 28 is a flowchart illustrating a control flow when the vehicle is accelerated with torques combined.

Here, a control flow of the engine 6 and the electric motor 2 in FIGS. 26(*a*) and 26(*b*) will be described by reference to FIG. 28.

Firstly, the ECU 116 sets a required power which is to be transmitted to the drive shafts 9, 9 (S1). Following this, the ECU 116 drives the engine 6 in a proper drive range of the engine 6 (S2) and determines whether or not a rated output of the electric motor 2 is surpassed (S3). If the ECU 116 determines that the rated output of the electric motor 2 is surpassed, the ECU 116 drives the electric motor 2 at its rated output and controls the revolving speed of the engine 6 (S4). On the other hand, if the ECU 116 determines that the rated output of the electric motor 2 is not surpassed, the ECU 116 determines whether or not a maximum revolving speed of the electric motor 2 is surpassed (S5). As a result of the determination, if it is determined that the maximum revolving speed of the electric motor 2 is not surpassed, the ECU 116 drives the electric motor 2 while continuing to drive the engine 6 in the proper drive range thereof (S6). If it is determined that the maximum revolving speed of the electric motor 2 is surpassed, the ECU 116 drives the electric motor 2 at its maximum revolving speed and controls the revolving speed of the engine 6 (S7). The proper drive range of the engine 6 means a range where the efficiency of the engine 6 is not deteriorated remarkably.

In this way, the engine 6 is driven within the range ranging from the engine stall range where no engine stall occurs to its maximum revolving speed or preferably in the proper drive range of the engine 6. Then, the power of the electric motor 2 is controlled by comparing the required power with the combined power from the secondary rotor 5, so that the electric motor 2 is driven within the range where the rated output and the maximum revolving speed thereof are not surpassed, thereby making it possible to suppress the occurrence of a drawback in the engine 6 and the electric motor 2.

Next, a control of upshift from the Low driving to a second speed driving in the power output system 1 will be described.

Figure 29:
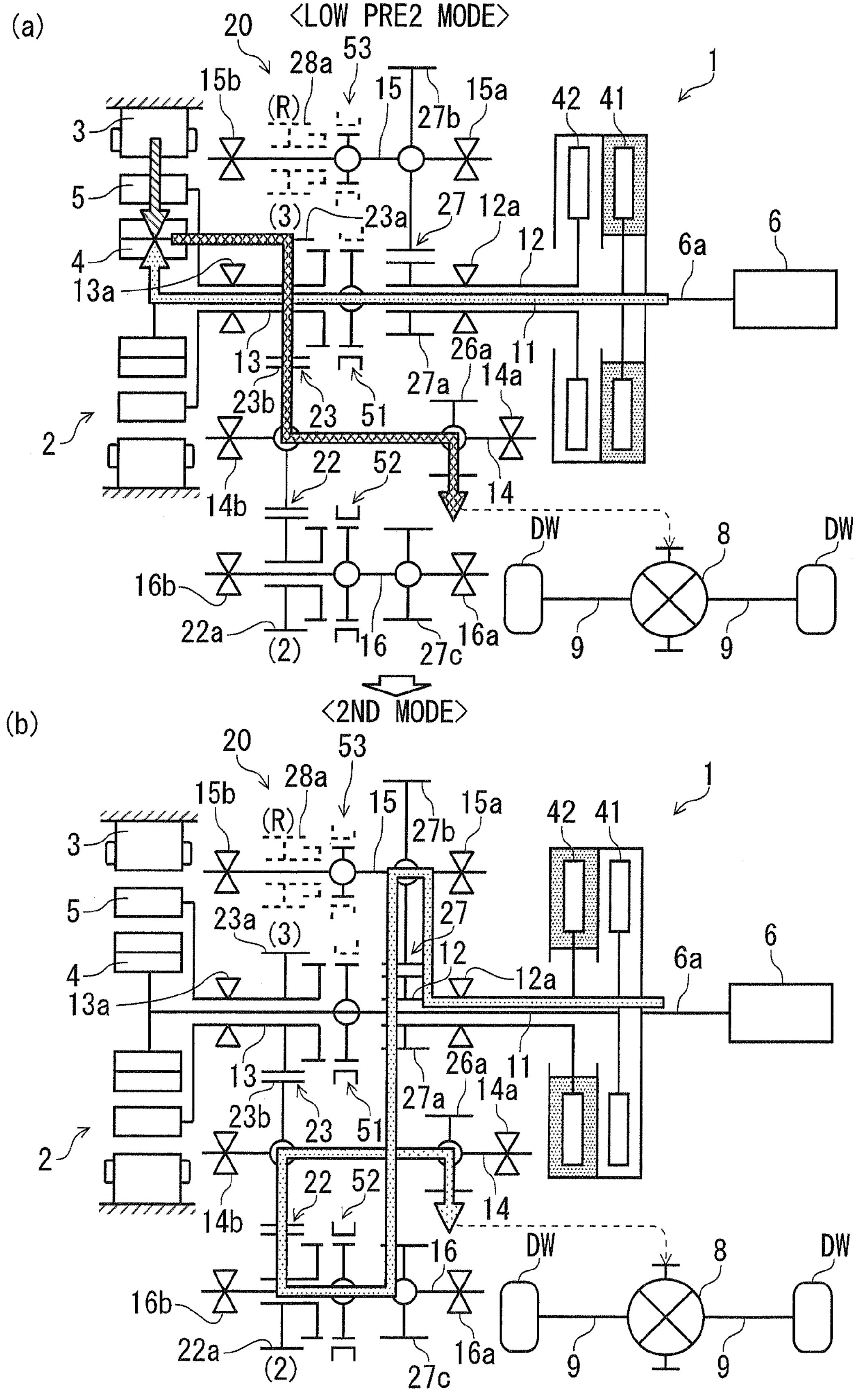
FIG. 29(*a*) is a diagram illustrating a state of torque transmission of the power output system in a Low Pre2 mode, and FIG. 29(*b*) is a diagram illustrating a state of torque transmission of the power output system in a $2^{nd}$ mode.

The second change-speed shifter 52 is shifted in the second speed connecting position for gear engagement as is shown in FIG. 29(*a*) from the state where the vehicle is accelerated in the Low mode shown in FIG. 26(*b*) with only the primary clutch 41 engaged, and the secondary intermediate shaft 16 and the second speed drive gear 22*a* are connected together (Low Pre2 mode). Following this, the primary clutch 41 is disengaged and the secondary clutch 42 is engaged, whereby as FIG. 29(*b*) shows, the power of the engine 6 is transmitted to the drive shafts 9, 9 by way of the second transmission path, and a second speed driving is realized ($2^{nd}$ mode).

Following this, a case will be described in which the electric motor 2 is used to assist in engine driving or to charge the battery 114 by two modes ($2^{nd}$ driving first mode, $2^{nd}$ driving second mode) while the vehicle is being driven in the $2^{nd}$ mode. The $2^{nd}$ driving first mode is, as FIG. 30(*b*) shows, realized by engaging further the primary clutch 41 from the state shown in FIG. 29(*b*) in which the secondary clutch 42 is engaged. This means that a certain ratio is forced to be produced between the engine 6 and the electric motor 2 by making use of the fact that in the second speed driving where the vehicle is driven via the second speed gear pair 22, by engaging the primary clutch 41, the rotating speed of the primary rotor 4 which is connected to the engine 6 via the primary main shaft 11 is inevitably higher than the rotating speed of the secondary rotor 5 which rotates through mesh engagement of the third speed drive gear 23*a* with the third speed driven gear 23*b*. When the rotating speed of the secondary rotor 5 is lower than the rotating speed of the primary rotor 4, from the characteristics of the electric motor 2, an imaginary supporting point P of the electric motor 2 is positioned upwards in FIG. 30(*a*), and the revolving speed of the revolving magnetic field of the stator 3 is inevitably lower than the rotating speed of the secondary rotor 5.

Figure 30:
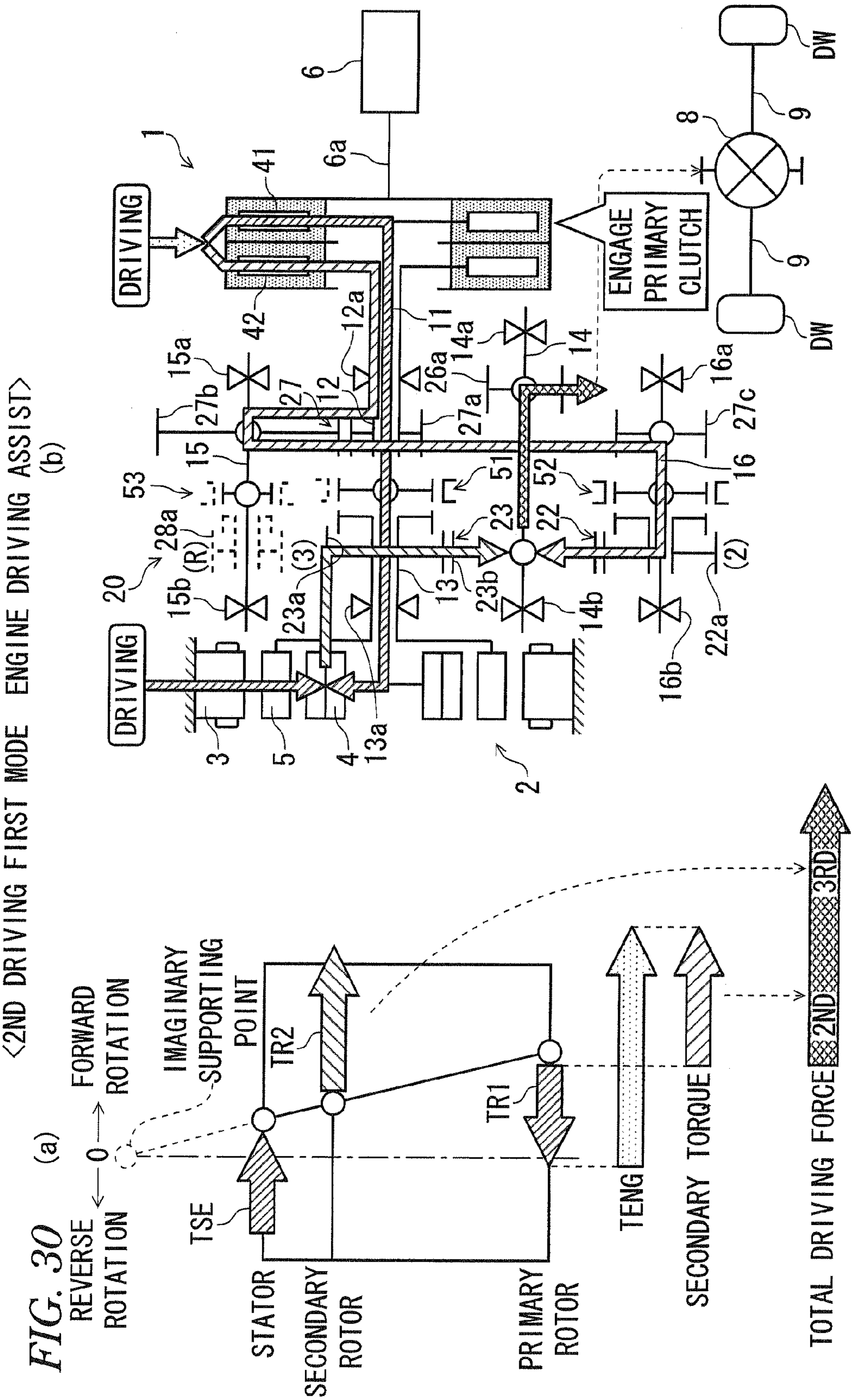
FIG. 30 shows diagrams illustrating states when assist is made in a $2^{nd}$ driving first mode, of which (a) is a speed diagram, and (b) is a diagram illustrating a state of torque transmission of the power output system.

When the electric motor 2 is used to assist in engine driving in this mode, as FIGS. 30(*a*) and 30(*b*) show, by supplying electric power to the stator 3 so that the revolving magnetic field in the forward rotating direction is increased in the stator 3, a driving equivalent torque TSE in the forward rotating direction acts on the stator 3 which corresponds to the electric power supplied to the stator 3. Then, a secondary rotor transfer torque TR2 in the forward rotating direction is outputted from the secondary rotor 5 and is transmitted from the third speed drive gear 23*a* to the third speed driven gear 23*b* as a $3^{rd}$ torque. In addition, a primary rotor transfer torque TR1 in the reverse rotating direction acts on the primary rotor 4 as a reaction force, and therefore, a secondary torque obtained by subtracting the primary rotor transfer torque TR1 from the engine torque TENG is transmitted from the secondary main shaft 12 to the second speed gear train 22 via the idle gear train 27 as a $2^{nd}$ torque. Consequently, a combined torque of the $3^{rd}$ torque and the $2^{nd}$ torque is transmitted from the counter shaft 14 or the third speed driven gear 23*b* here to the drive wheels DW, DW as a total driving force by way of the final gear 26*a*, the differential gear mechanism 8 and the drive shafts 9, 9. As a result, the electric motor 2 can assist in engine driving.

Figure 31:
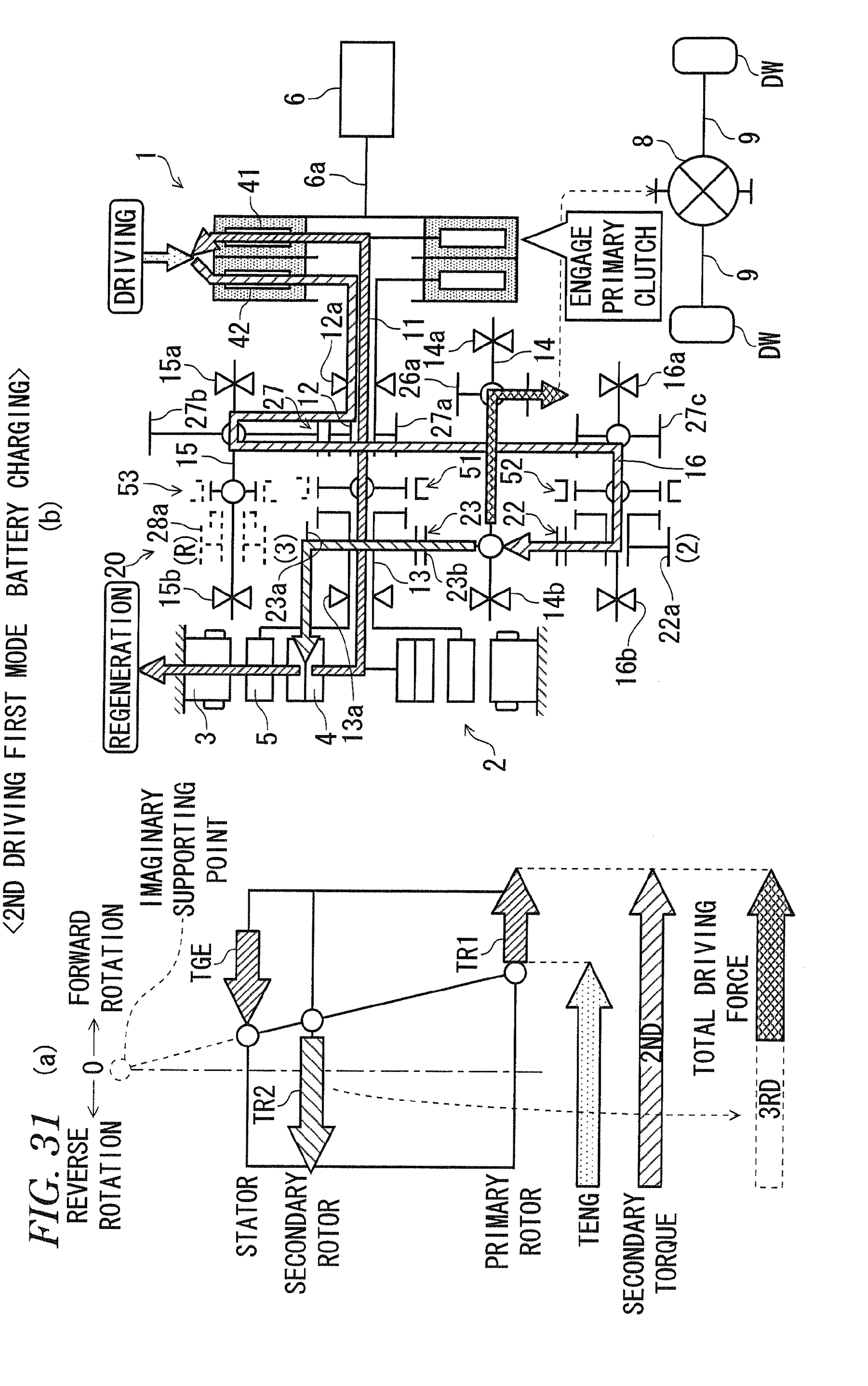
FIG. 31 shows diagrams illustrating states when charging is made in the $2^{nd}$ driving first mode, of which (a) is a speed diagram, and (b) is a diagram illustrating a state of torque transmission of the power output system.

In this mode, when the electric motor 2 is used to charge the battery 114, as FIGS. 31(*a*) and 31(*b*) show, electric power is generated in the stator 3 by use of the secondary rotor transfer torque TR2 which is transferred to the secondary rotor 5. As this occurs, by applying a generating equivalent torque TGE in the reverse rotating direction to the stator 3 so as to decrease the revolving magnetic field, the secondary rotor transfer torque TR2 in the reverse rotating direction acts on the secondary rotor 5 so as to decrease the rotating speed of the secondary rotor 5. On the other hand, a primary rotor transfer torque TR1 in the forward rotating acts on the primary rotor 4 as a reaction force. By the actions of these transfer torques, a secondary torque resulting from addition of the engine torque TENG and the primary rotor transfer torque TR1 is transmitted from the secondary main shaft 12 to the second speed gear pair 22 by way of the idle gear train 27 as a $2^{nd}$ torque. In addition, by mesh engagement of the third speed drive gear 23*a* with the third speed driven gear 23*b*, the secondary rotor transfer torque TR2 in the reverse rotating direction is transmitted to the third speed driven gear 23*b* as a $3^{rd}$ torque. Consequently, a torque resulting from subtraction of the $3^{rd}$ torque from the $2^{nd}$ torque is transmitted from the counter shaft 14 or the third speed driven gear 23*b* here to the drive wheels DW, DW as a total driving force by way of the final gear 26*a*, the differential gear mechanism 8 and the drive shafts 9, 9. As a result, the electric motor 2 can charge the battery 114 while the vehicle is driving.

Following this, a case will be described in which the electric motor 2 is used to assist in engine driving or to charge the battery 114 in the $2^{nd}$ driving second mode.

Figure 32:
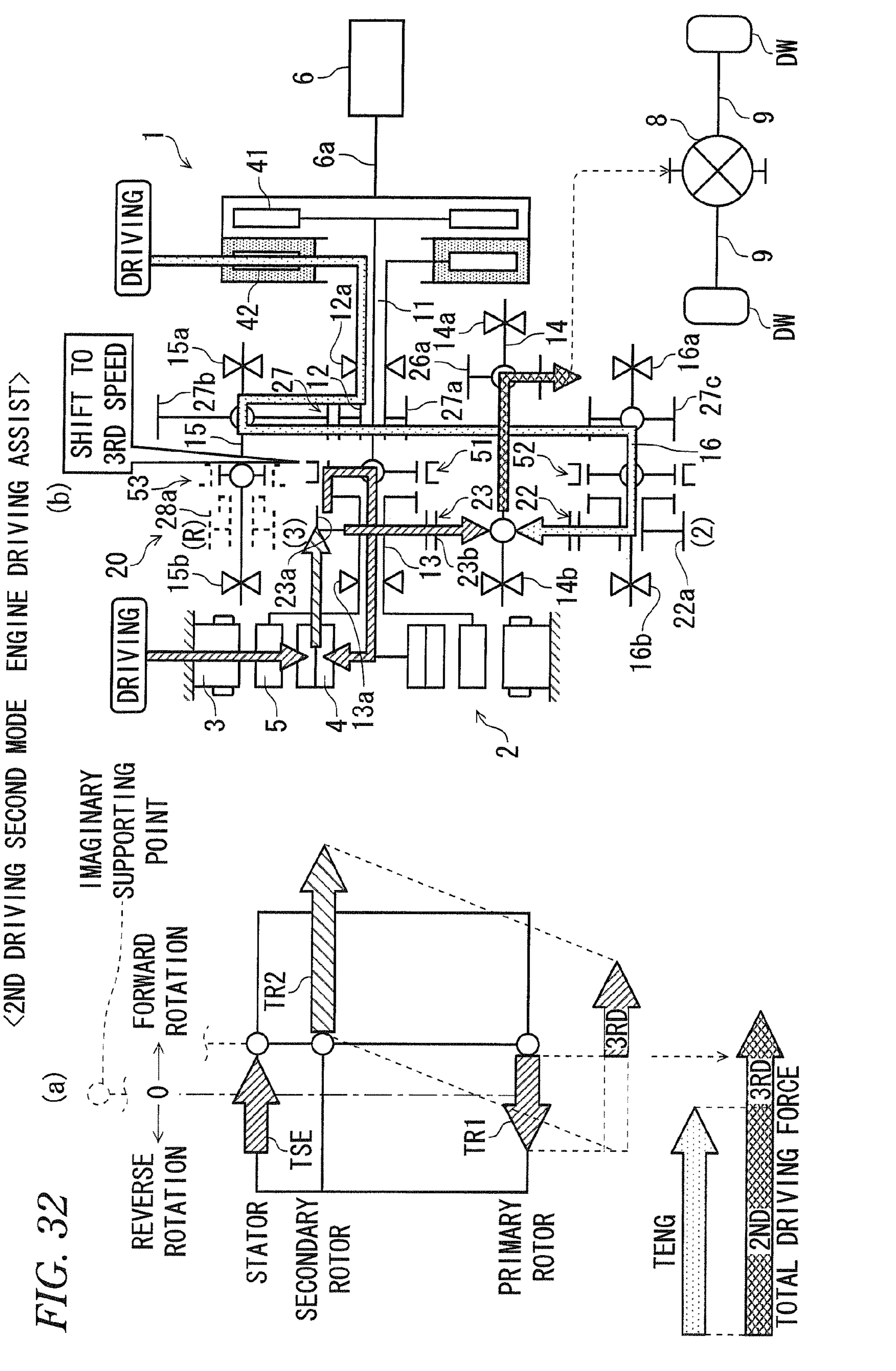
FIG. 32 shows diagrams illustrating states when assist is made in a $2^{nd}$ driving second mode, of which (a) is a speed diagram, and (b) is a diagram illustrating a state of torque transmission of the power output system.

As FIG. 32(*b*) shows, the $2^{nd}$ driving second mode is realized by shifting the first change-speed shifter 51 in the third speed connecting position for gear engagement from the state in FIG. 29(*b*) in which the secondary clutch 42 is engaged. By shifting the first change-speed shifter 51 in the third speed connecting position for gear engagement, the primary shaft 11 and the third speed drive gear 23*a* are connected together to rotate together, whereby the primary rotor 4 connected to the primary main shaft 11 and the secondary rotor 5 connected to the third speed drive gear 23*a* via the connecting shaft 13 are inevitably locked to rotate together.

Consequently, by shifting the first change-speed shifter 51 in the third speed connecting position for gear engagement, a state in which the revolving speed of the engine 6 is caused forcibly to coincide with the revolving speed of the electric motor 2, that is, a state in which the ratio between the engine 6 and the electric motor 2 is 1 is produced. As this occurs, when the revolving speed of the engine 6 equals the revolving speed of the electric motor 2, from the characteristics of the electric motor 2, the imaginary supporting point P is positioned at a point at infinity in FIG. 32(*a*).

When the electric motor 2 is used to assist in engine driving in this mode, as FIGS. 32(*a*) and 32(*b*) show, by supplying electric power to the stator 3 so that the revolving magnetic field in the forward rotating direction is increased in the stator 3, a driving equivalent torque TSE in the forward rotating direction acts on the stator 3 which corresponds to the electric power supplied to the stator 3. Then, a secondary rotor transfer torque TR2 in the forward rotating direction is outputted from the secondary rotor 5. In addition, a primary rotor transfer torque TR1 in the reverse rotating direction acts on the primary rotor 4 as a reaction force, and therefore, a torque obtained by subtracting the primary rotor transfer torque TR1 from the secondary rotor transfer torque TR2 is transmitted to the third speed driven gear 23*b* as a $3^{rd}$ torque by the connection of the primary main shaft 11 with the third speed drive gear 23*a* which is effected by the first change-speed shifter 51. In addition, the engine torque TENG is transmitted from the secondary main shaft 12 to the second speed gear train 22 by way of the idle gear train 27 as a $2^{nd}$ torque. Then, a combined torque of the $3^{rd}$ torque and the $2^{nd}$ torque is transmitted from the counter shaft 14 or the third speed driven gear 23*b* here to the drive wheels DW, DW as a total driving force by way of the final gear 26*a*, the differential gear mechanism 8 and the drive shafts 9, 9. As a result, the electric motor 2 can assist in engine driving. Here, the $3^{rd}$ torque equals the driving equivalent torque TSE. By locking the primary rotor 4 and the secondary rotor 5 together by the first change-speed shifter 51, the driving equivalent torque TSE of the stator 3 is transmitted to the counter shaft 14 in whole. Thus, the engine torque TENG and the driving equivalent torque TSE of the stator 3 are transmitted to the drive shafts 9, 9 in whole.

Figure 33:
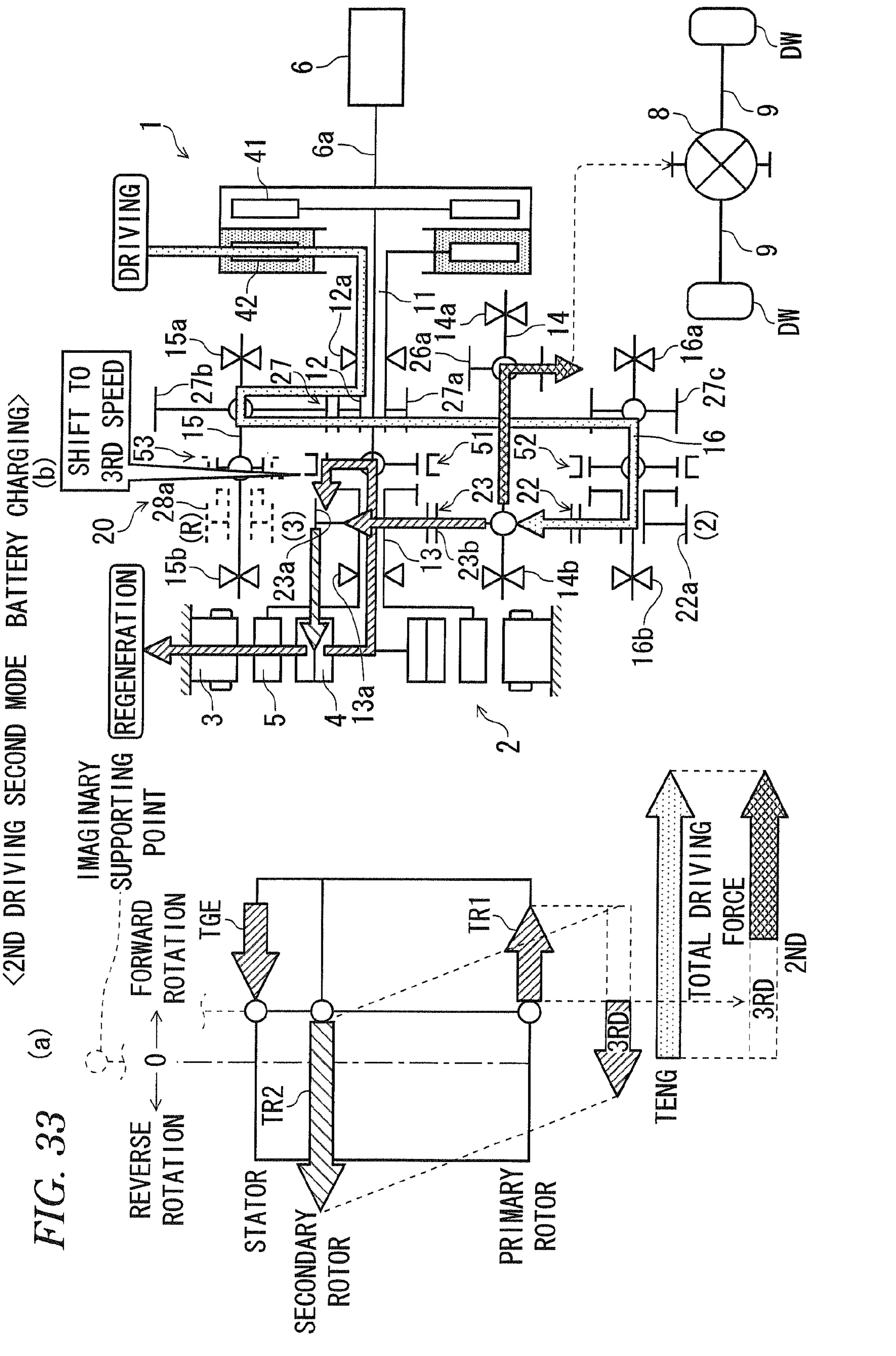
FIG. 33 shows diagrams illustrating states when charging is made in the $2^{nd}$ driving second mode, of which (a) is a speed diagram, and (b) is a diagram illustrating a state of torque transmission of the power output system.

In this mode, when the electric motor 2 is used to charge the battery 114, as FIGS. 33(*a*) and 33(*b*) show, electric power is generated in the stator 3 by use of the secondary rotor transfer torque TR2 which is transferred to the secondary rotor 5. As this occurs, by applying a generating equivalent torque TGE in the reverse rotating direction to the stator 3 so as to decrease the revolving magnetic field, the secondary rotor transfer torque TR2 in the reverse rotating direction acts on the secondary rotor 5 so as to decrease the rotating speed of the secondary rotor 5. On the other hand, a primary rotor transfer torque TR1 in the forward rotating direction acts on the primary rotor 4 as a reaction force. In addition, the engine torque TENG is transmitted from the secondary main shaft 12 to the second speed gear pair 22 by way of the idle gear train 27 as a $2^{nd}$ torque. By mesh engagement of the third speed drive gear 23*a* with the third speed driven gear 23*b*, a torque resulting from subtraction of the primary rotor transfer torque TR1 from the $2^{nd}$ torque is transmitted to the secondary rotor 5 as a $3^{rd}$ torque. Then, a torque resulting from subtraction the $3^{rd}$ torque from the $2^{nd}$ torque is transmitted from the counter shaft 14 or the third speed driven gear 23*b* here to the drive wheels DW, DW as a total driving force by way of the final gear 26*a*, the differential gear mechanism 8 and the drive shafts 9, 9. As a result, the electric motor 2 can charge the battery 114 while the vehicle is driving.

Next, a control of upshift from the second speed driving to a third speed driving will be described.

While the vehicle is driving in the $2^{nd}$ mode shown in FIG. 29(*b*), as FIG. 34(*a*) shows, the first change-speed shifter 51 is shifted into the third speed connecting position for gear engagement so as to connect the primary main shaft 11 with the third speed drive gear 23*a* ($2^{nd}$ Pre3 mode). Following this, by disengaging the secondary clutch 42 while engaging the primary clutch 41, as FIG. 34(*a*) shows, the torque of the engine 6 is transmitted to the drive wheels DW, DW by way of the first transmission path, whereby a third speed driving is realized ($3^{rd}$ Pre2 mode).

With the second change-speed shifter 52 kept shifted in the second speed connecting position for gear engagement, the secondary intermediate shaft 16, the primary intermediate shaft 15 and the secondary main shaft 12 are caused to rotate in association with the rotation of the primary main shaft 11 and the third speed drive gear 23*a*. Therefore, the second change-speed shifter 52 is preferably moved to the neutral position (a $3^{rd}$ mode).

Next, a case will be described in which the electric motor 2 is used to assist in engine driving or to charge the battery 114 during the third speed driving. Hereinafter, a state will firstly be described in which the second change-speed shifter 52 is shifted in the neutral position (the $3^{rd}$ mode). As a matter of convenience, the following mode is referred to as a $3^{rd}$ driving first mode.

In this state, the state in which the primary rotor 4 and the secondary rotor 5 are locked together so that the revolving speeds of the engine 6 and the electric motor 2 are forced to coincide with each other or the state in which the ratio between the engine 6 and the electric motor 2 is 1 has already been produced by shifting the first change-speed shifter 51 in the third speed connecting position for gear engagement.

Figure 35:
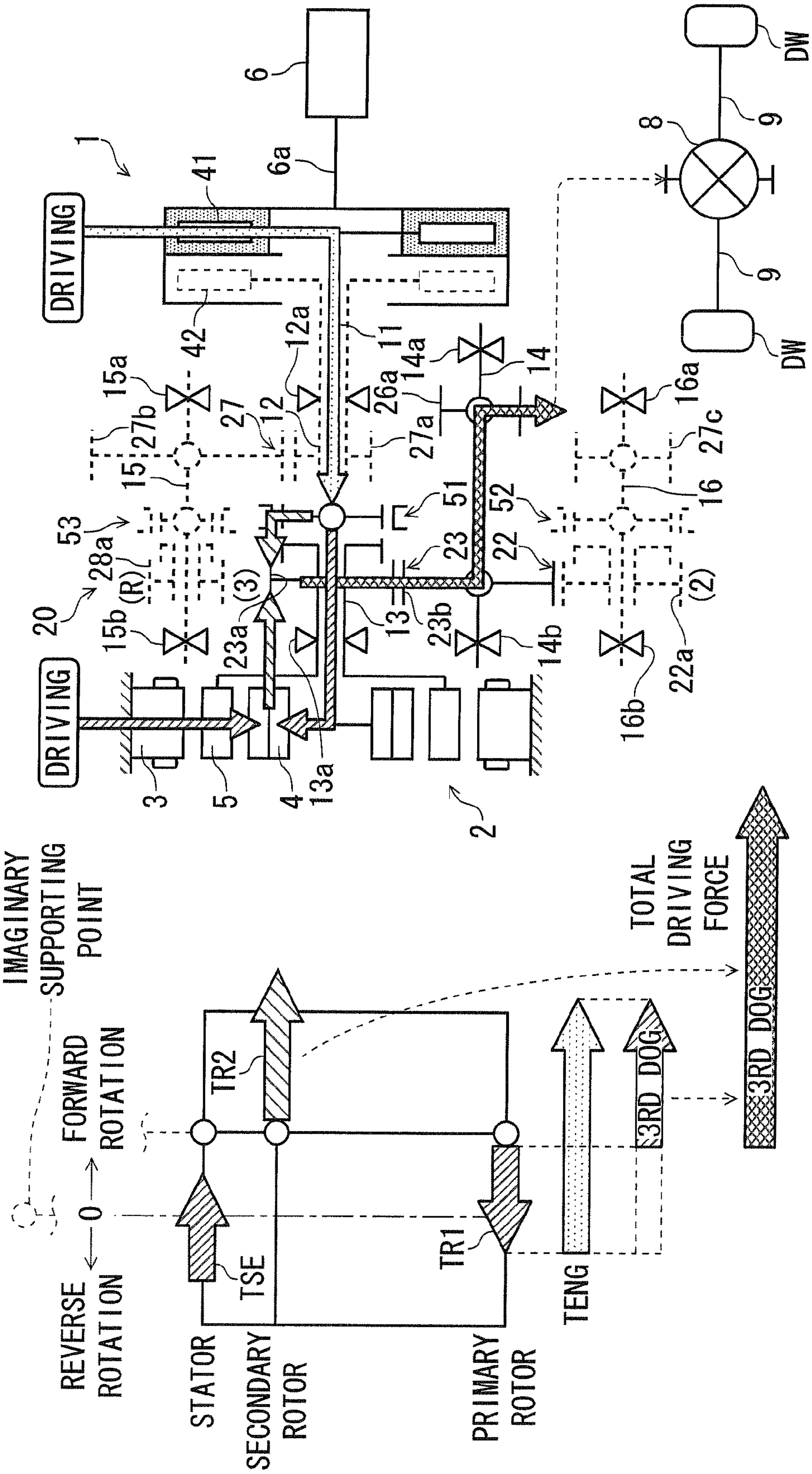
FIG. 35 shows diagrams illustrating states when assist is made in a $3^{rd}$ driving first mode, of which (a) is a speed diagram, and (b) is a diagram illustrating a state of torque transmission of the power output system.

When the electric motor 2 is used to assist in engine driving in this mode, as FIGS. 35(*a*) and 35(*b*) show, by supplying electric power to the stator 3 so that the revolving magnetic field in the forward rotating direction is increased in the stator 3, a driving equivalent torque TSE acts on the stator 3 which corresponds to the electric power supplied to the stator 3. Then, a secondary rotor transfer torque TR2 in the forward rotating direction is outputted from the secondary rotor 5. In addition, a primary rotor transfer torque TR1 in the reverse rotating direction acts on the primary rotor 4 as a reaction force, and therefore, a torque obtained by subtracting the primary rotor transfer torque TR1 from the engine torque TENG is transmitted to the third speed drive gear 23*a* as a $3^{rd}$ Dog torque. Then, the $3^{rd}$ Dog torque and the secondary rotor transfer torque TR2 are added together at the third speed drive gear 23*a*, and the resulting added torque is transmitted to the drive wheels DW, DW as a total driving force by way of the third speed driven gear 23*b*, the final gear 26*a*, the differential gear mechanism 8 and the drive shafts 9, 9. As a result, the electric motor 2 can be used to assist in engine driving.

Figure 36:
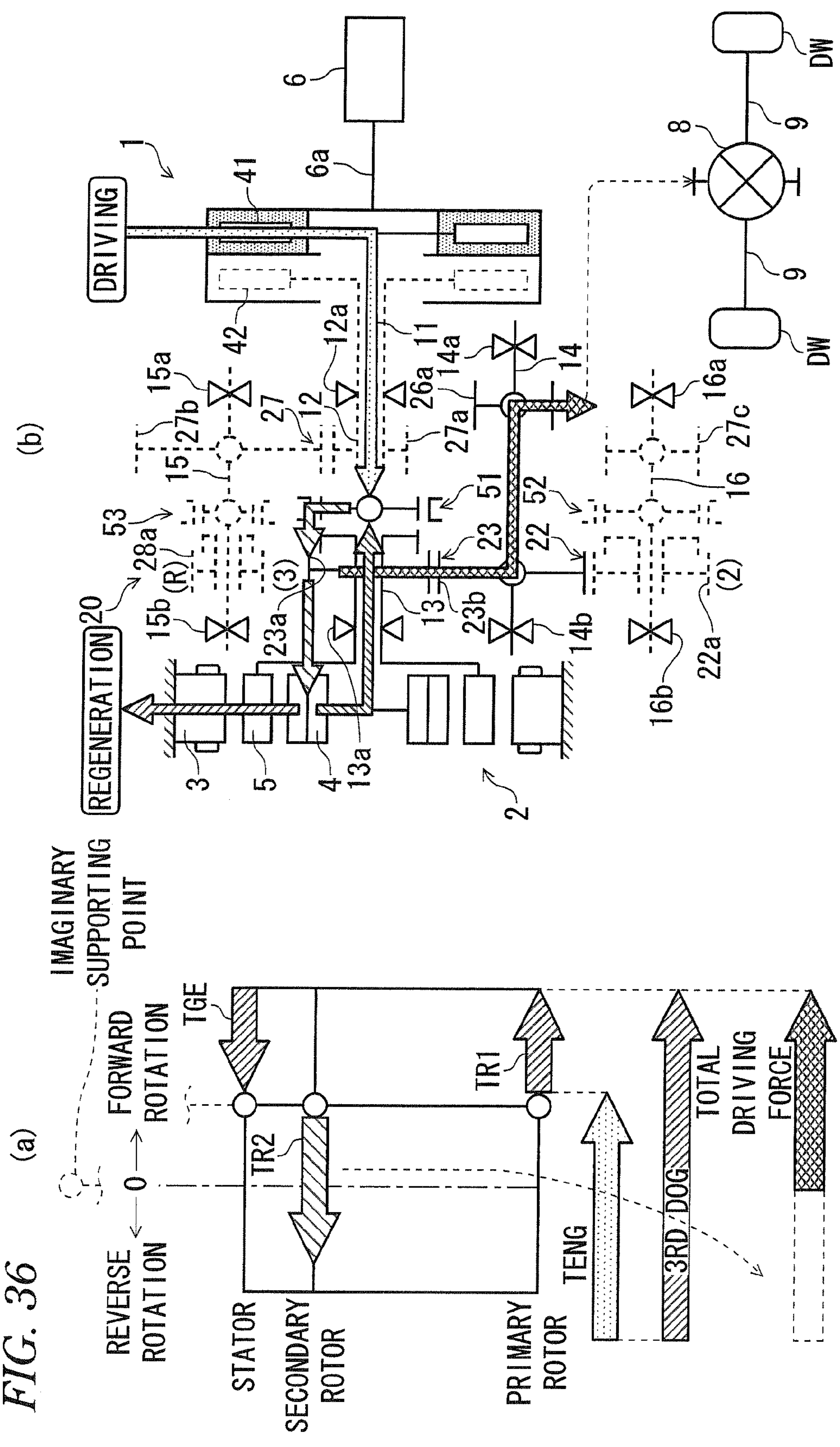
FIG. 36 shows diagrams illustrating states when charging is made in the $3^{rd}$ driving first mode, of which (a) is a speed diagram, and (b) is a diagram illustrating a state of torque transmission of the power output system.

In this mode, when the electric motor 2 is used to charge the battery 114, as FIGS. 36(*a*) and 36(*b*) show, electric power is generated in the stator 3 by use of the secondary rotor transfer torque TR2 which is transferred to the secondary rotor 5. As this occurs, a generating equivalent torque TGE in the reverse rotating direction acts on the stator 3 so as to decrease the revolving magnetic field, while the secondary rotor transfer torque TR2 in the reverse rotating direction acts on the secondary rotor 5 so as to decrease the rotating speed of the secondary rotor 5. On the other hand, a primary rotor transfer torque TR1 in the forward rotating direction acts on the primary rotor 4 as a reaction force. Therefore, a torque resulting from the addition of the engine torque TENG and the primary rotor transfer torque TR1 which results, in turn, from the connection of the primary main shaft 11 and the third speed drive gear 23*a* by the first change-speed shifter 51 is transmitted to the third speed drive gear 23*a* as a $3^{rd}$ Dog torque. Then, the secondary rotor transfer torque TR2 is removed from the $3^{rd}$ Dog torque at the third speed drive gear 23*a*, and a torque resulting from subtraction of the secondary rotor transfer torque TR2 from the $3^{rd}$ Dog torque is transmitted to the drive wheels DW, DW by way of the third speed driven gear 23*b*, the final gear 26*a*, the differential gear mechanism 8 and the drive shafts 9, 9 as a total driving force. As a result, the electric motor 2 can charge the battery 114 while the vehicle is driving.

Next, the motor driving in the power output system 1 will be described.

As a matter of convenience, the following mode will be referred to as a motor driving first mode.

Figure 37:
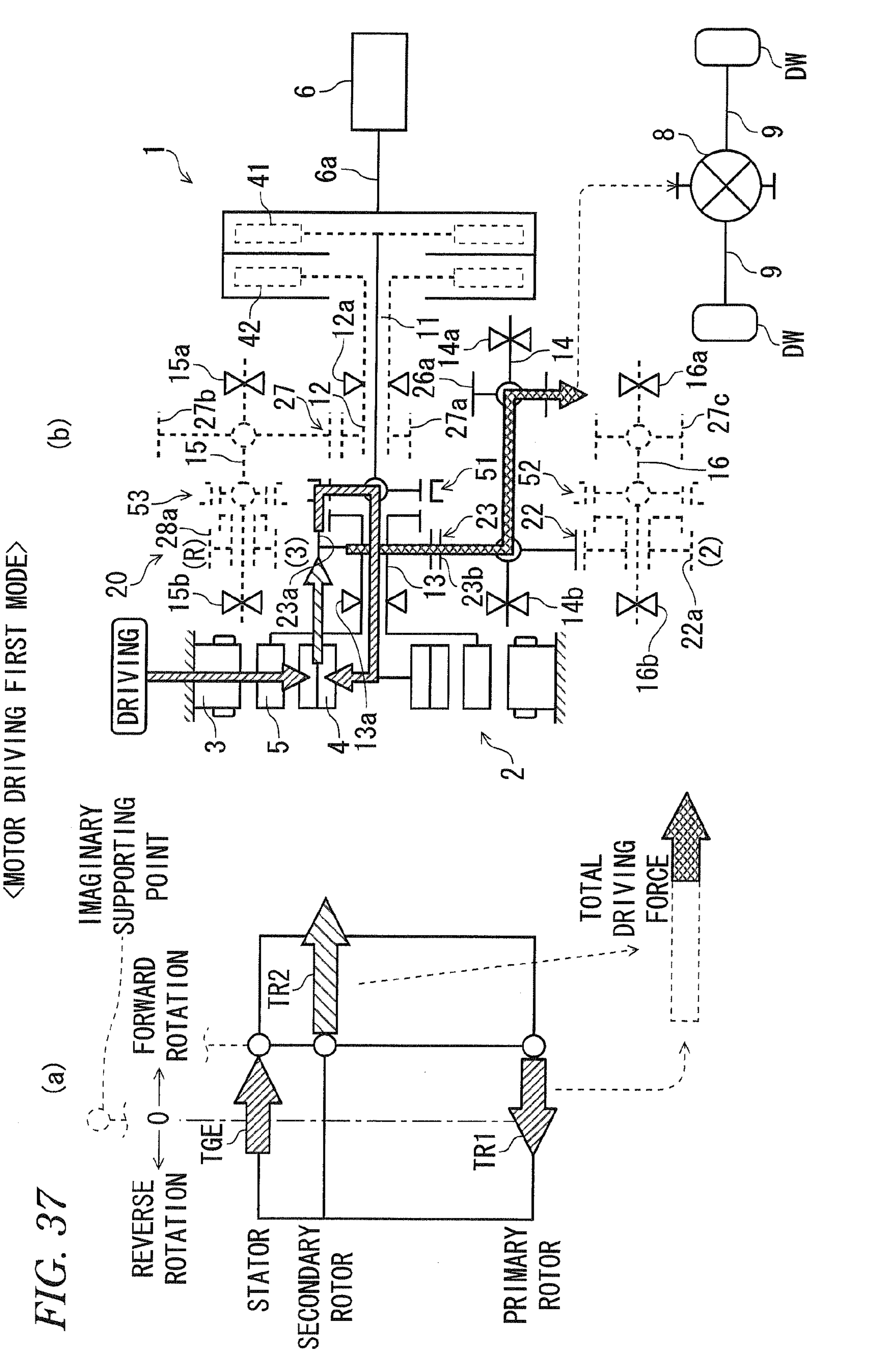
FIG. 37 shows diagrams illustrating states in a motor driving first mode, of which (a) is a speed diagram, and (b) is a diagram illustrating a state of torque transmission of the power output system.

A motor driving first mode is realized by, as FIG. 37(*a*) shows, shifting the first change-speed shifter 51 into the third speed connecting position for gear engagement and disengaging the primary and secondary clutches 41, 42. The power transfer from the engine 6 is cut off by disengaging the primary and secondary clutches 41, 42. In addition, by shifting he first change-speed shifter 51 into the third speed connecting position for gear engagement, as has been described above, the primary rotor 4 and the secondary rotor 5 are locked together, whereby the state in which the revolving speeds of the engine 6 and the electric motor 2 are forced to coincide with each other or the state in which the ratio between the engine 6 and the electric motor 2 is 1 is produced.

In this state, by supplying electric power to the stator 3 so that the revolving magnetic field in the forward rotating direction is increased, a driving equivalent torque TSE which corresponds to the electric power supplied to the stator 3 acts on the stator 3, and a secondary rotor transfer torque TR2 in the forward rotating direction is outputted from the secondary rotor 5. In addition, a primary rotor transfer torque TR1 in the reverse rotating direction acts on the primary rotor 4 as a reaction force. Therefore, a torque resulting from removal of the primary rotor transfer torque TR1 from the secondary rotor transfer torque TR2 which results, in turn, from the connection of the primary main shaft 11 and the third speed drive bear 23*a* by the first change-speed shifter 51 is transmitted to the drive wheels DW, DW as a total driving force by way of the third speed driven gear 23*b*, the final gear 26*a*, the differential gear mechanism 8 and the drive shafts 9, 9. As a result, the vehicle can be driven only by the torque of the electric motor 2.

Next, an engine start during the motor driving in the power output system 1 will be described.

As a case in which the engine 6 is started during the motor driving of the vehicle, two modes (hereinafter, referred to as a motor driving first starting mode and a motor driving second starting mode) will be described.

Figure 38:
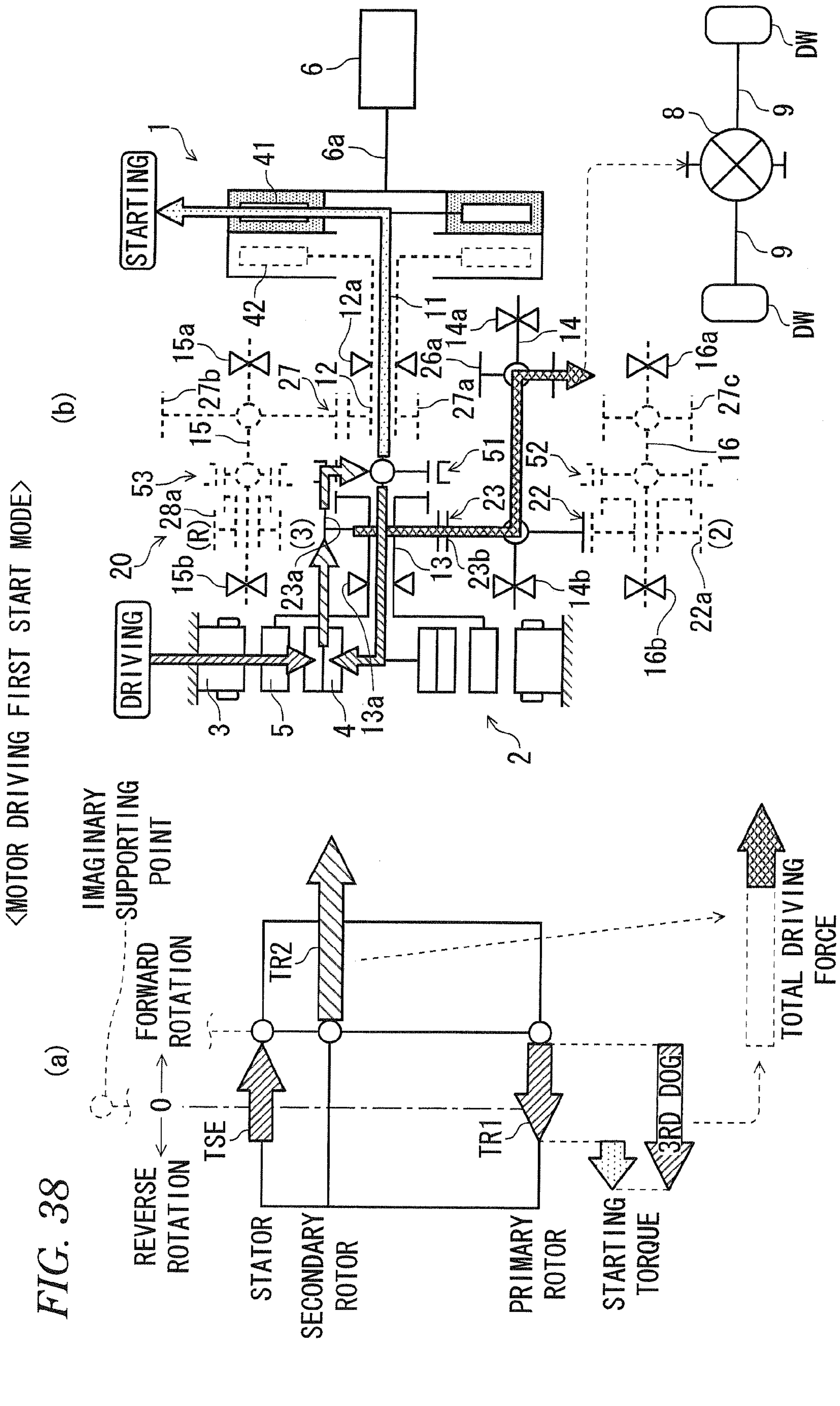
FIG. 38 shows diagrams illustrating states in a motor driving first start mode, of which (a) is a speed diagram, and (b) is a diagram illustrating a state of torque transmission of the power output system.

A motor driving first starting mode is realized by, as FIG. 38(*b*) shows, engaging the primary clutch 41 during the motor driving shown in FIG. 37(*b*). As this occurs, the primary rotor transfer torque TR1 is removed from the secondary rotor transfer torque TR2, and as a result of engaging the primary clutch 41, a starting torque in the reverse rotating direction is removed further. Consequently, a torque resulting from subtracting the $3^{rd}$ Dog torque to which the primary rotor transfer torque TR1 and the starting toque are added from the secondary rotor transfer torque TR2 is transmitted to the third speed driven gear 23*b* and is then transmitted as a total driving force to the drive wheels DW, DW by way of the final gear 26*a*, the differential gear mechanism 8 and the drive shafts 9, 9. The crankshaft 6*a* of the engine 6 is caused to rotate by the primary main shaft 11 in association with rotation thereof, and cranking occurs, thereby making it possible to ignite the engine, whereby the engine 6 can be started while the vehicle is driving on the electric motor 2. After the engine 6 has been started, the Low mode results by shifting the first change-speed shifter 51 back into the neutral position.

Figure 39:
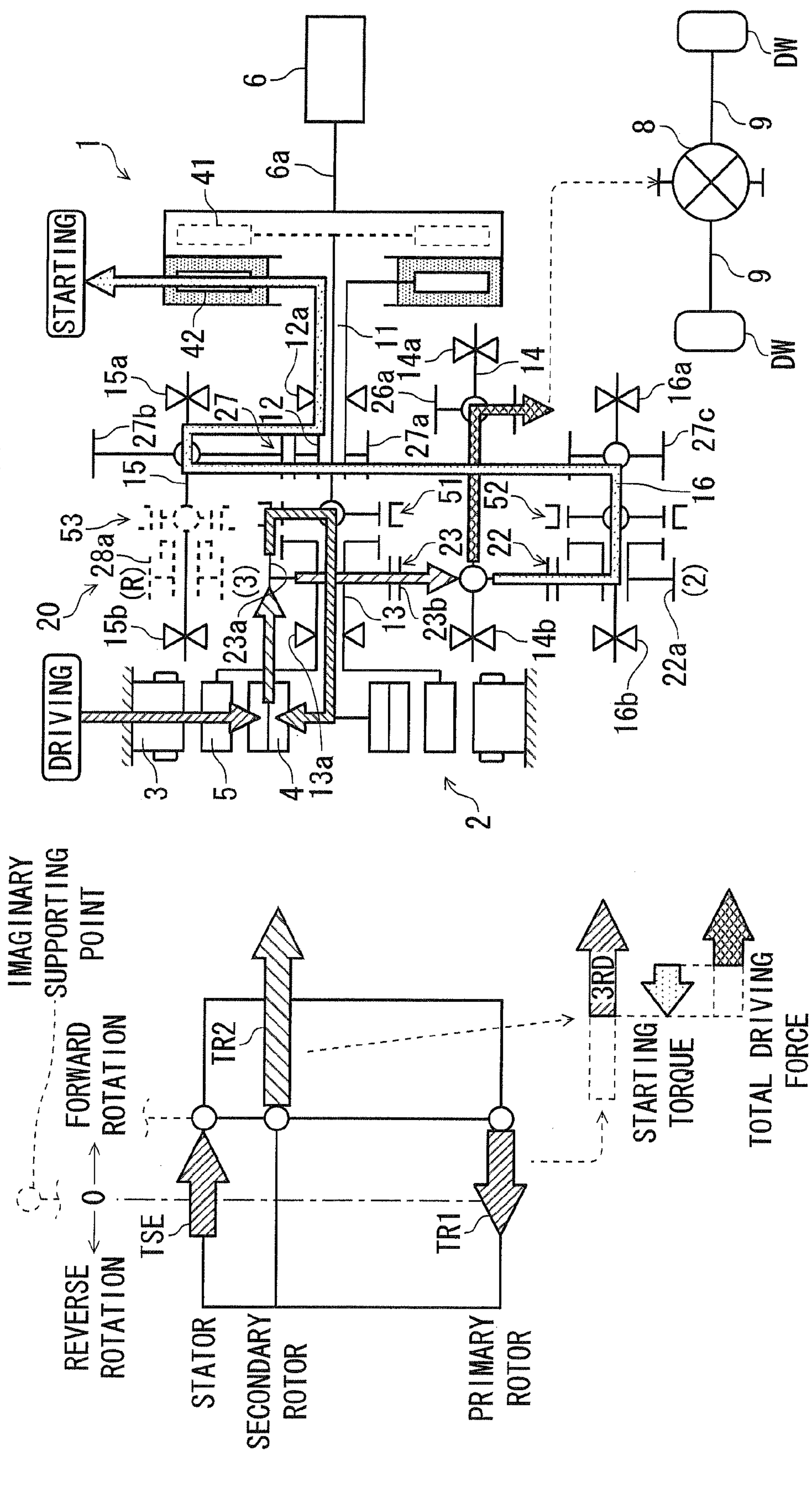
FIG. 39 shows diagrams illustrating states in a motor driving second start mode, of which (a) is a speed diagram, and (b) is a diagram illustrating a state of torque transmission of the power output system.

A motor driving second starting mode is realized by, as FIG. 39(*b*) shows, shifting the second change-speed shifter 52 in the second speed connecting position for gear engagement and engaging the secondary clutch 42 during the motor driving shown in FIG. 37(*b*). As this occurs, a starting torque in the reverse rotating direction acts on the third speed driven gear 23*b* as a result of mesh engagement between the third speed driven gear 23*b* and the second speed drive gear 22*a*. Consequently, a torque resulting from subtracting the starting torque from the 3rd torque which results from removing the primary rotor transfer torque TR1 in the reverse rotating direction from the secondary rotor transfer torque TR2 is transmitted as a total driving force to the drive wheels DW, DW by way of the final gear 26*a*, the differential gear mechanism 8 and the drive shafts 9, 9. In addition, the secondary main shaft 12 causes the crankshaft 6*a* of the engine 6 to rotate in association with rotation thereof by the starting torque transmitted from the third speed driven gear 23*b* to the secondary main shaft 12 by way of the second speed gear train 22 and the idle gear train 27, and cranking occurs, thereby making it possible to ignite the engine, whereby the engine 6 can be started while the vehicle is driving on the electric motor 2. After the engine 6 has been started, the Low mode results by shifting the second change-speed shifter 52 back into the neutral position and disengaging the secondary clutch 42 while engaging the primary clutch 41. In addition, the 2nd mode can be realized by shifting the first change-speed shifter 51 back into the neutral position. Alternatively, the 2nd Pre3 mode can be realized without making any changes to the state.

Next, an engine starting while the vehicle is at a halt or during a so-called parking.

Figure 40:
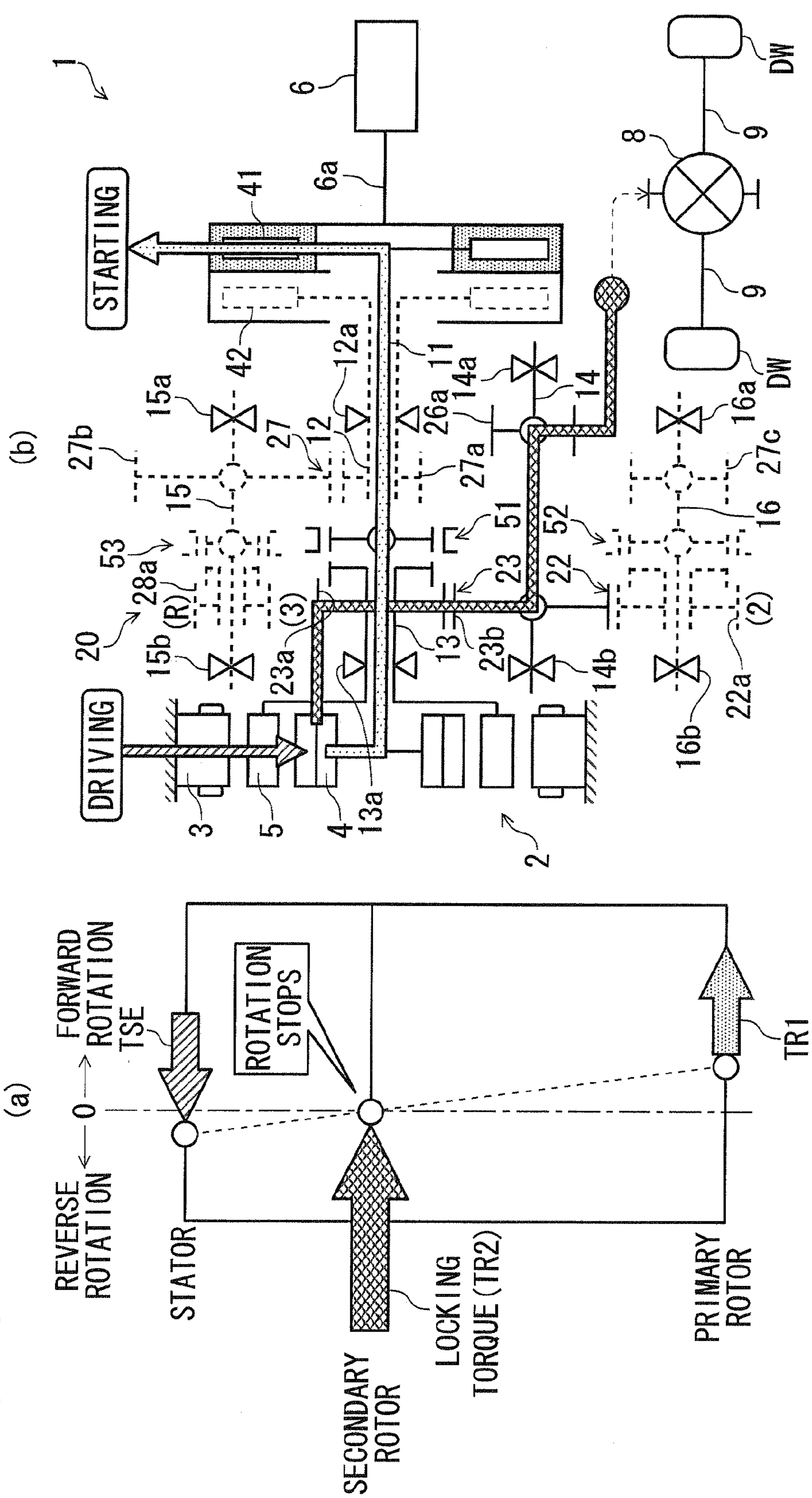
FIG. 40 shows diagrams illustrating states when the engine is started while the vehicle is at a halt, of which (a) is a speed diagram, and (b) is a diagram illustrating a state of torque transmission of the power output system.
Figure 41:
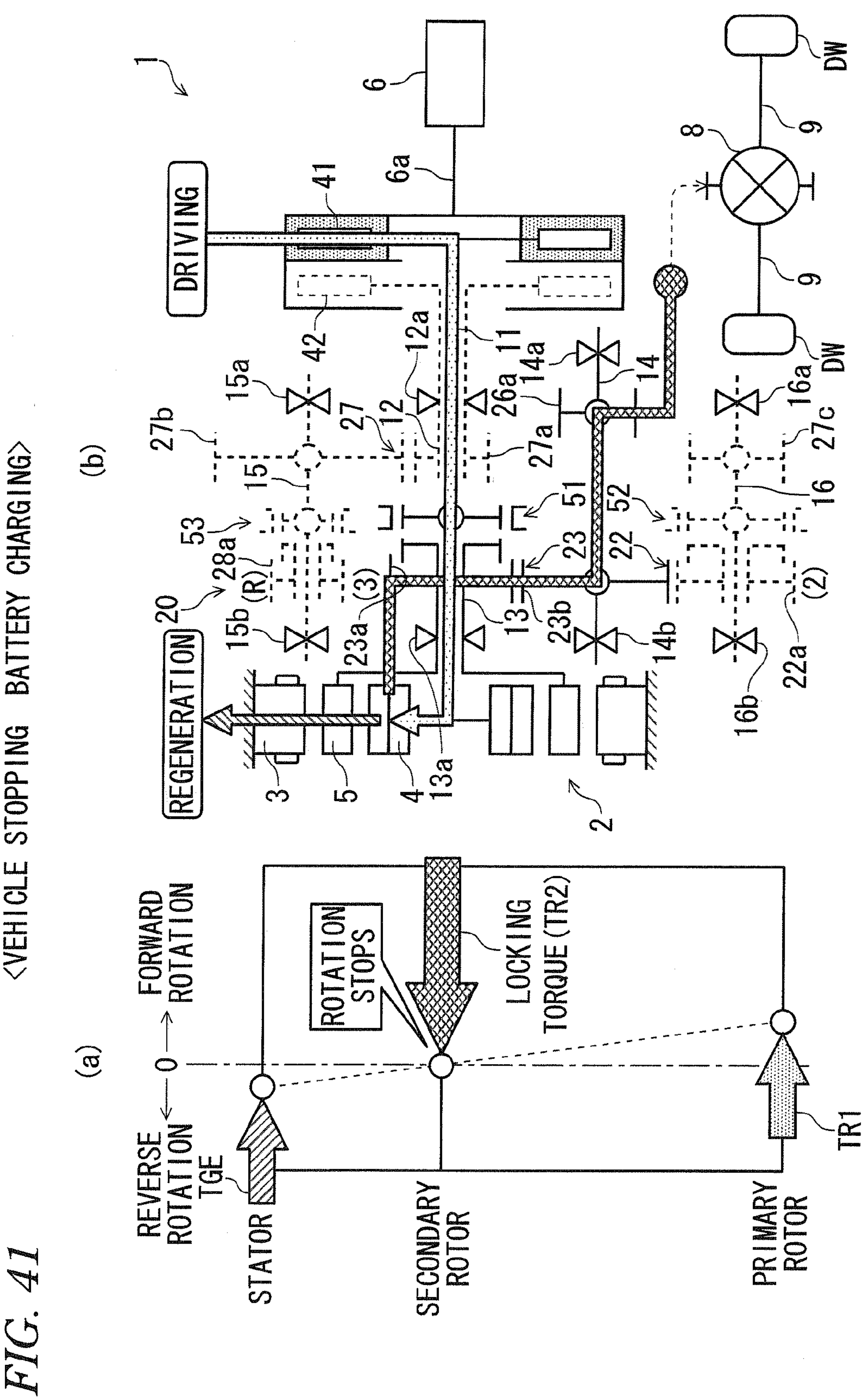
FIG. 41 shows diagrams illustrating states when charging is made while the vehicle is at a halt, of which (a) is a speed diagram, and (b) is a diagram illustrating a state of torque transmission of the power output system.

When the engine 6 is started while the vehicle is at a halt, firstly, the primary clutch 41 is engaged so that the engine 6 is connected to the electric motor 2 via the primary main shaft 11, and as FIG. 40(*a*) shows, electric power is supplied to the stator 3 so that a revolving magnetic force in the reverse rotating direction is generated in the stator 3. In addition, a locking torque is caused to act in the forward rotating direction from the final gear 26*a* by use of a parking mechanism or a vehicle driving stabilizing apparatus (hereinafter, referred to as VSA), not shown, whereby the rotation of the secondary rotor 5 is stopped (locked). As this occurs, a primary rotor transfer torque TR1 in the forward rotating direction acts on the primary rotor 4 as a reaction force, and the primary main shaft 11 causes the crankshaft 6*a* of the engine 6 to rotate in association with rotation thereof by the primary rotor transfer torque TR1, whereby cranking occurs, thereby making it possible to ignite the engine 6.

Next, a charging while the vehicle is at a halt or during a so-called parking.

The engine 6 is started from the state shown in FIG. 40(*b*) in which the engine is started while the vehicle is at a halt, and thereafter, the torque of the engine 6 is increased so as to control the engine torque TENG to increase the revolving speed. In addition, a locking torque is caused to act in the reverse rotating direction from the final gear 26*a* by use of the parking mechanism or the vehicle driving stabilizing apparatus (hereinafter, referred to as VSA), not shown, whereby the rotation of the secondary rotor 5 is stopped (locked). Then, the electric motor 2 is caused to operate for regeneration by causing the generating equivalent torque TGE in the forwarding direction on the stator 3 so as to decrease the revolving magnetic field in the stator 3, whereby the electric motor 2 can charge the battery 114.

Next, a reverse driving in the power output system 1 will be described.

When only the torque of the engine 6 is used for reverse driving, the reverse of the vehicle is realized by shifting the reverse driving shifter 53 in the reverse connecting position for gear engagement and engaging the secondary clutch 42. As a result of this, the torque of the engine 6 is transmitted to the drive wheels DW, DW by way of the secondary main shaft 12, the idle drive gear 27*a*, the first idle driven gear 27*b*, the reverse gear pair 28 made up of the reverse drive gear 28*a* and the third speed driven gear 23*b*, the final gear 26*a*, the differential gear mechanism 8 and the drive shafts 9, 9. Thus, the vehicle can be reversed.

In addition, when the vehicle is reversed through motor driving, the first change-speed shifter 51 is shifted into the third seed connecting position for gear engagement and electric power is supplied to the stator 3 so that the revolving magnetic field in the reverse rotating direction is increased in such a state that the primary and secondary clutches 41, 42 are disengaged. Then, the secondary rotor transfer torque TR2 in the reverse rotating direction acts from the secondary rotor 5 and is then transmitted to the drive wheels DW, DW by way of the third speed driven gear 23*b*, the final gear 26*a*, the differential gear mechanism 8 and the drive shafts 9, 9. Thus, the vehicle can be reversed.

Second Embodiment

Next, referring to FIGS. 43 to 59, a power output system 1A according to a second embodiment of the invention will be described. The power output system 1A of the second embodiment has the same configuration as that of the power output system 1 of the first embodiment except that a transmission 20A includes a fourth speed gear pair 24 whose gear ratio is smaller than that of a third speed gear pair 23 and a fifth speed gear pair 25 whose gear ratio is smaller than that of the fourth speed gear pair 24. Because of this, like reference numerals or corresponding reference numerals will be given to the same or like portions to those of the power output system 1 of the first embodiment, and the description thereof will be simplified or omitted.

Figure 43:
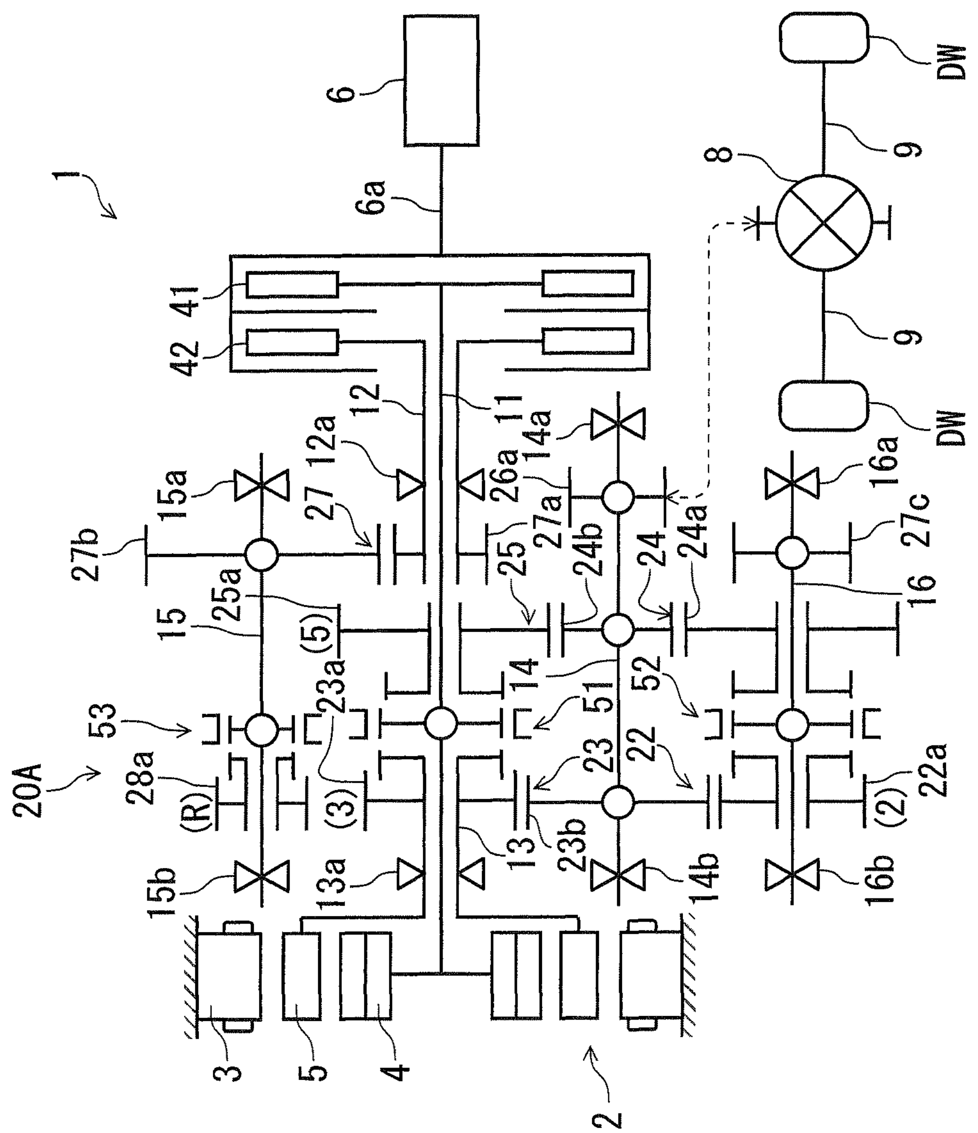
FIG. 43 is a diagram showing schematically a power output system according to a second embodiment of the invention and is a sectional view taken along the line B-B in FIG. 44.
Figure 44:
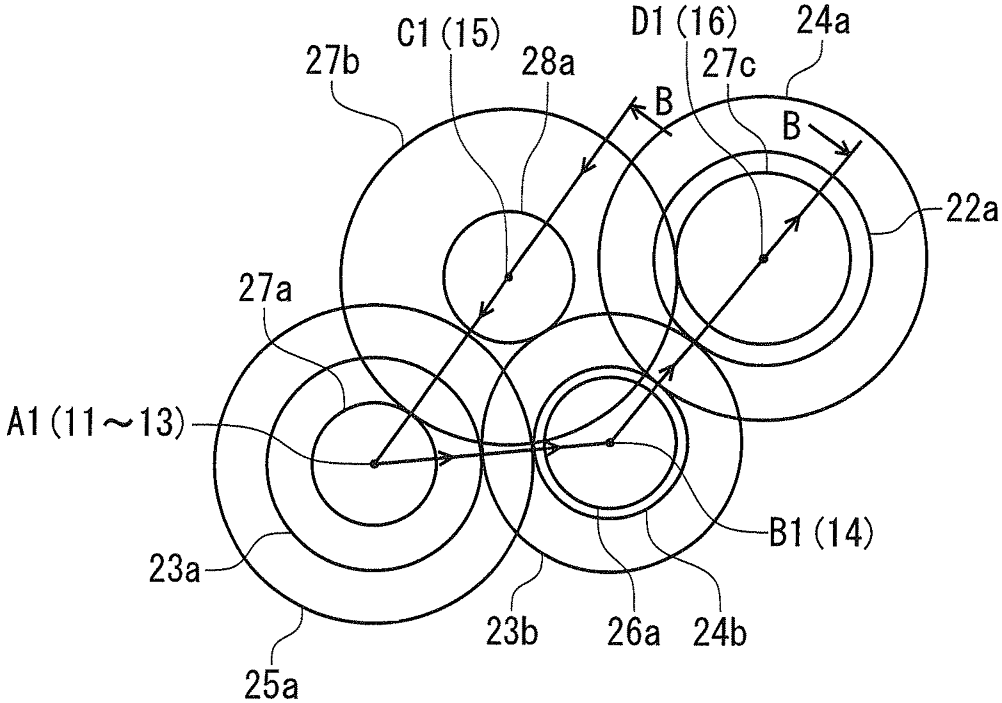
FIG. 44 is an explanatory diagram illustrating a relation of a power transmission mechanism of the power output system shown in FIG. 43.

FIG. 43 schematically shows the power output system 1A according to the second embodiment of the invention.

In the transmission 20A in the power output system 1A of the second embodiment, a fourth speed drive gear 24*a* which can rotate relatively to a primary intermediate shaft 16 is provided on the secondary input shaft 16 between a second aped drive gear 22*a* and a second speed driven gear 27*c*. A secondary change-speed shifter 52 which is provided on the secondary intermediate shaft 16 to connect or disconnect the secondary intermediate shaft 16 to or from the second speed drive gear 22*a* is configured further to connect or disconnect the primary intermediate shaft 16 to or from the fourth speed drive gear 24*a*. The secondary change-speed shifter 52 is configured to be shifted into a second speed connecting position, a neutral position and a fourth speed connecting position. Consequently, when the primary change-speed shifter 52 is shifted into the second speed connecting position for gear engagement, a second idle driven gear 27*c* mounted on the secondary intermediate shaft 16 and the second speed drive gear 22*a* rotate together. When the secondary change-speed shifter 52 is shifted into the fourth speed connecting position for gear engagement, the second idle driven gear 27*c* mounted on the secondary intermediate shaft 16 and the fourth speed drive gear 24*a* rotate together. When the secondary change-speed shifter 52 is shifted into the neutral position, the second idle driven gear 27*c* rotates relatively to the second speed drive gear 22*a* and the fourth speed drive gear 24*a*.

In addition, a fifth speed drive gear 25*a* which can rotate relatively to a primary main shaft 11 is provided on the primary main shaft 11 between a third speed drive gear 23*a* which is mounted on a connecting shaft 13 and an idle drive gear 27*a* which is mounted on a secondary main shaft 12. A primary change-speed shifter 51 which is provided on the primary main shaft 11 to connect or disconnect the primary main shaft 11 to or from the third speed drive gear 23*a* is configured further to connect or disconnect the primary main shaft 11 to or from the fifth speed drive gear 25*a*. The primary change-speed shifter 51 is configured to be shifted into a third speed connecting position, a neutral position and a fifth speed connecting position. Consequently, when the primary change-speed shifter 51 is shifted into the third speed connecting position for gear engagement, the primary main shaft 11 and the third speed drive gear 23*a* rotate together. When the primary change-speed shifter 51 is shifted into the fifth speed connecting position for gear engagement, the primary main shaft 11 and the fifth speed drive gear 25*a* rotate together. When the primary change-speed shifter 51 is shifted into the neutral position, the primary main shaft 11 rotates relatively to the third speed drive gear 23*a* and the fifth speed drive gear 25*a*.

Additionally, a fourth speed driven gear 24*b* is mounted on a counter shaft 14 between a third speed driven gear 23*b* and a final gear 26*a*. The fourth speed driven gear 24*b* is configured to mesh with the fourth speed drive gear 24*a* which is provided on the secondary intermediate shaft 16 and the fifth speed drive gear 25*a* which is provided on the primary main shaft 11. The fourth speed driven gear 24*b* makes up the fourth speed gear pair 24 together with the fourth speed drive gear 24*a* and makes up the fifth gear pair 25 together with the fifth speed drive gear 25*a*.

Consequently, in the transmission 20A, the third speed drive gear 23*a* and the fifths speed drive gear 25*a* which are odd-numbered transmission gears are provided around the primary main shaft 11 which is one transmission shaft of two transmission shafts of the transmission 20A, and the second speed drive gear 22*a* and the fourth speed drive gear 24*a* which are even-numbered transmission gears are provided on the secondary intermediate shaft 16 which is the other transmission shafts of the two transmission shafts of the transmission 20A. In addition, a primary rotor 4 of an electric motor 2 which makes up a power combining mechanism 30 is mounted on the primary main shaft 11.

Based on the configuration described above, by engaging a secondary clutch 42 and shifting the secondary change-speed shifter 52 into the fourth speed connecting position for gear engagement, a crankshaft 6*a* of an engine 6 is connected to drive wheels DW, DW by way of the secondary main shaft 12, the idle ear train 27 (the idle drive gear 27*a*, the first idle driven gear 27*b*, the second idle driven gear 27*c*), the secondary intermediate shaft 16, the fourth speed gear pair 24 (the fourth speed drive gear 24*a*, the fourth speed driven gear 24*b*), the counter shaft 14, the final gear 26*a*, and drive shafts 9, 9. Hereinafter, the series of constituent components from the secondary main shaft 12 to the drive shafts 9, 9 is referred to as a "fourth transmission path" as required.

In addition, by engaging a primary clutch 41 and shifting the primary change-speed shifter 51 into the fifth speed connecting position for gear engagement, the crankshaft 6*a* of the engine 6 is connected to the drive wheels DW, DW by way of the primary main shaft 11, the fifth speed gear pair 25 (the fifth speed drive gear 25*a*, the fourth speed driven gear 24*b*), the counter shaft 14, the final gear 26*a*, a differential gear mechanism 8 and the drive shafts 9, 9. Hereinafter, the series of constituent components from the primary main shaft 11 to the drive shafts 9, 9 is referred to as a "fifth transmission path" as required. In this way, the power output system 1A of this embodiment has the fourth transmission path and the fifth transmission path in addition to the first to third transmission paths of the power output system 1 of the first embodiment.

Next, a control of the power output system 1A that is configured as described above will be described.

In this power output system 1A, a torque combining drive (Low mode, Low Pre2 mode) is performed by the same control as that performed in the first embodiment, and therefore, the description thereof will be omitted here. In addition, a normal driving, a motor driving, an engine start during motor driving and a reverse driving are also performed by the same controls as those performed in the first embodiment, and therefore, only a driving mode will be described here which is enabled by the provision of the fourth speed gear pair 24 and the fifth speed gear pair 25.

This power output system 1A includes a $2^{nd}$ driving third mode in addition to a $2^{nd}$ driving first mode and a $2^{nd}$ driving second mode as assist and charge patterns by the electric motor 2 in the second speed driving.

Figure 45:
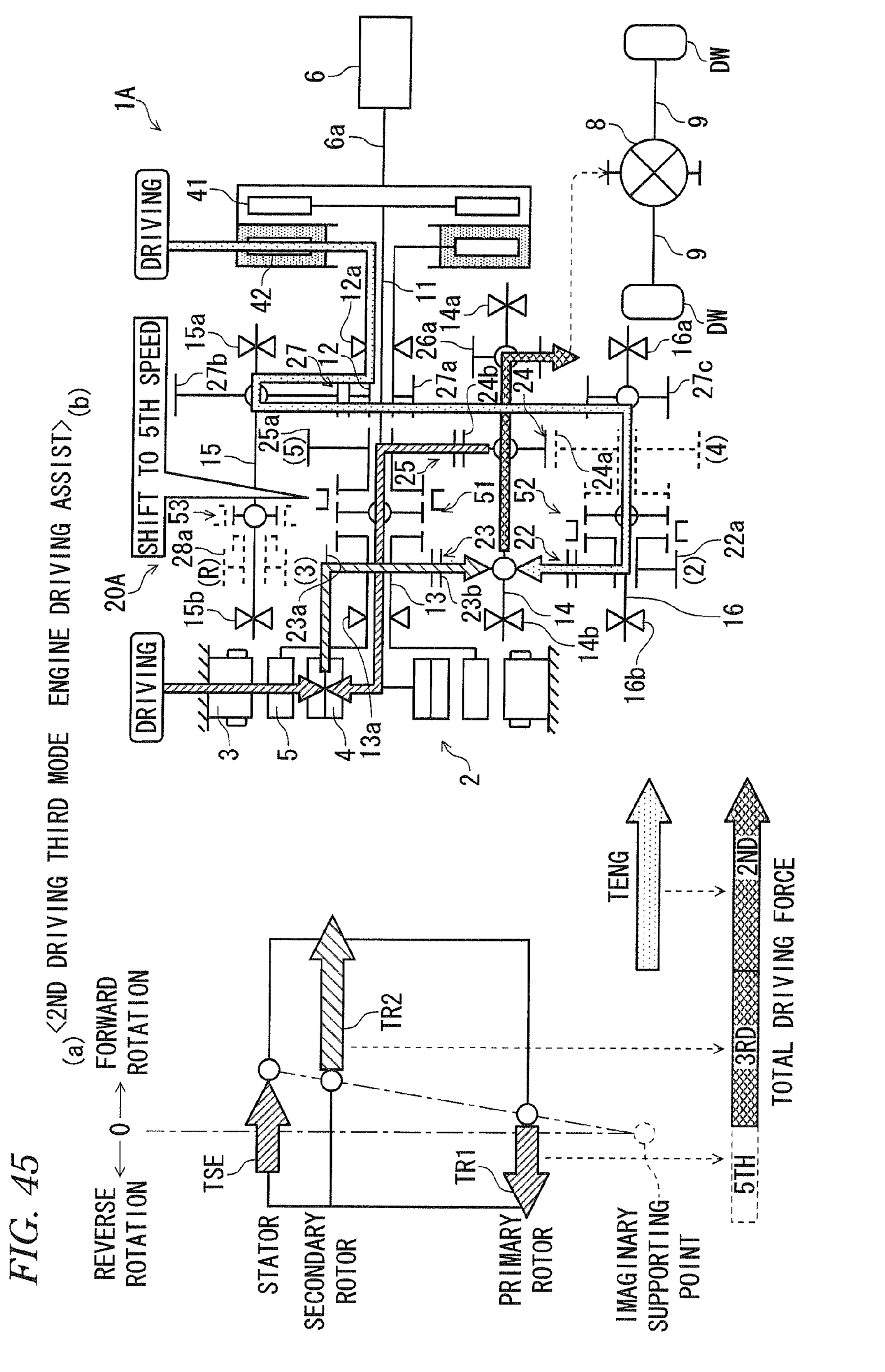
FIG. 45 shows diagrams illustrating states when assist is made in a $2^{nd}$ driving third mode, of which (a) is a speed diagram, and (b) is a diagram illustrating a state of torque transmission of the power output system.

As FIG. 45(*b*) shows, the $2^{nd}$ driving third mode is realized by shifting further the primary change-speed shifter 51 into the fifth speed connecting position for gear engagement from the $2^{nd}$ mode in which the secondary clutch 42 is engaged. This means that a certain ratio is forced to be produced between the engine 6 and the electric motor 2 by making use of the fact that the rotating speed of a primary rotor 4 which is connected to the counter shaft 14 via the fifth gear pair 25 is inevitably lower than the rotating speed of the secondary rotor 5 which is connected to the counter shaft 14 via the third speed gear pair 23 by shifting the primary change-speed shifter 51 into the fifth speed connecting position for gear engagement. When the rotating speed of the secondary rotor 5 is higher than the rotating speed of the primary rotor 4, from the characteristics of the electric motor 2, an imaginary supporting point P of the electric motor 2 is positioned downwards in FIG. 45(*a*), and the revolving speed of a revolving magnetic field in a stator inevitably becomes higher than the rotating speed of the secondary rotor 25.

When the electric motor 2 is used to assist in engine driving in this mode, as FIGS. 45(*a*) and 45(*b*) show, by supplying electric power to the stator 3 so that the revolving magnetic field in a forward rotating direction is increased in the stator 3, a driving equivalent torque TSE in the forward rotating direction acts on the stator 3 which corresponds to the electric power supplied to the stator 3. Then, a secondary rotor transfer torque TR2 in the forward rotating direction is outputted from the secondary rotor 5 and is transmitted from the third speed drive gear 23*a* to the third speed driven gear 23*b* as a $3^{rd}$ torque. In addition, the engine torque is transmitted from the secondary main shaft 12 to the second speed gear train 22 via the idle gear train 27 as a $2^{nd}$ torque. Additionally, a primary rotor transfer torque TR1 in a reverse rotating direction acts on the primary rotor 4 as a reaction force, and therefore, the primary rotor transfer torque TR1 is removed from the fourth speed driven gear 24*b* as a $5^{th}$ torque through mesh engagement of the fifth speed drive gear 25*a* with the fourth speed driven gear 24*b*. Consequently, a torque resulting from subtraction of the $5^{th}$ torque from a torque resulting from addition of the $3^{rd}$ torque and the $2^{nd}$ torque is transmitted from the counter shaft 14 to the drive wheels DW, DW as a total driving force by way of the final gear 26*a*, the differential gear mechanism 8 and the drive shafts 9, 9. As a result, the electric motor 2 can assist in engine driving.

Figure 46:
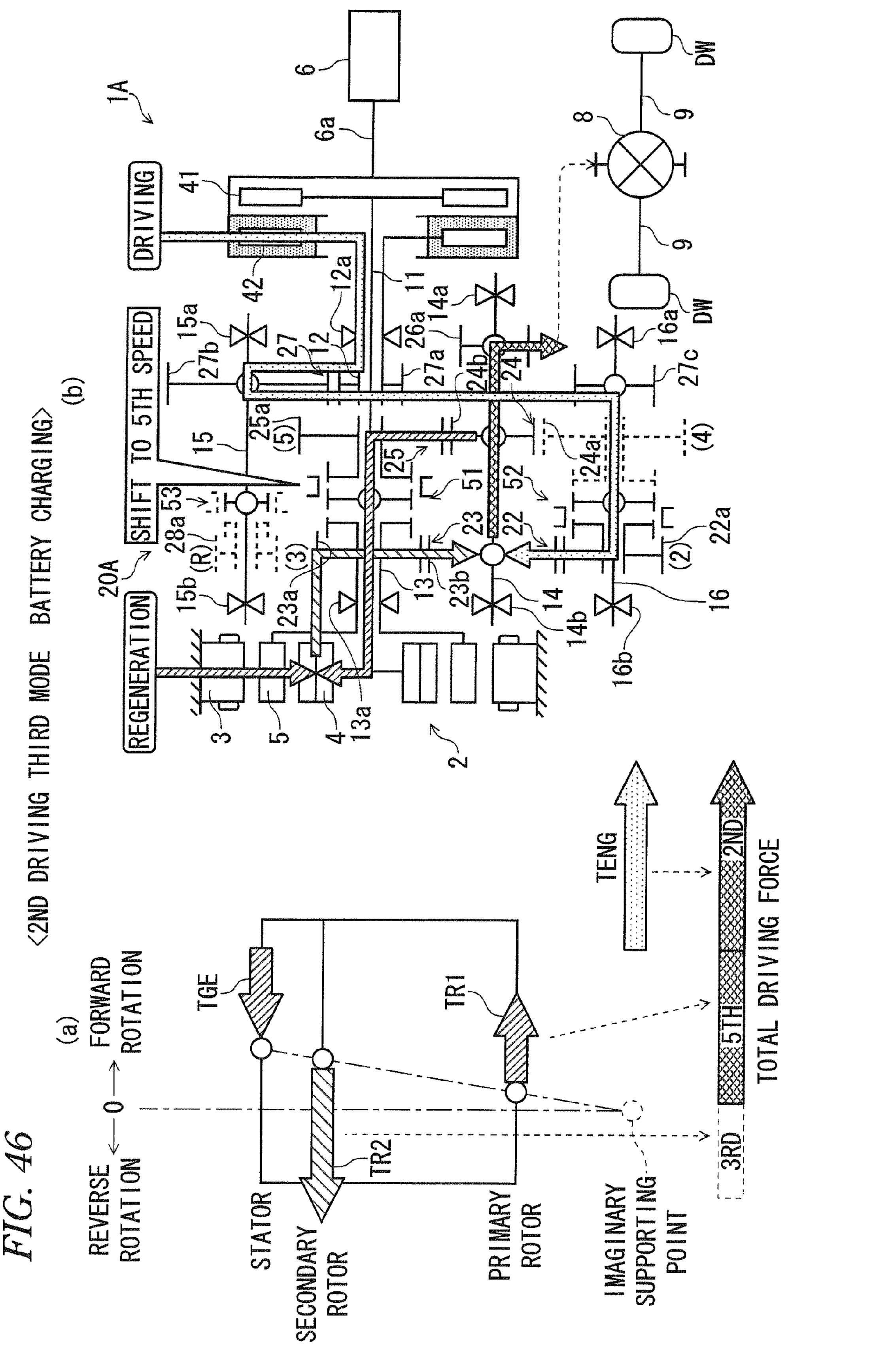
FIG. 46 shows diagrams illustrating states when charging is made in the $2^{nd}$ driving third mode, of which (a) is a speed diagram, and (b) is a diagram illustrating a state of torque transmission of the power output system.

In this mode, when the electric motor 2 is used to charge a battery 114, as FIGS. 46(*a*) and 46(*b*) show, electric power is generated in the stator 3 by use of the secondary rotor transfer torque TR2 which is transferred to the secondary rotor 5. As this occurs, by applying a generating equivalent torque TGE in the reverse rotating direction to the stator 3 so as to decrease the revolving magnetic field, the secondary rotor transfer torque TR2 in the reverse rotating direction acts on the secondary rotor 5 so as to decrease the rotating speed of the secondary rotor 5. On the other hand, a primary rotor transfer torque TR1 in the forward rotating acts on the primary rotor 4 as a reaction force and is transmitted to the fourth speed driven gear 24*b* as a $5^{th}$ torque through mesh engagement of the fifth speed drive gear 25*a* with the fourth speed driven gear 24*b*. In addition, the engine torque is transmitted from the secondary main shaft 12 to the second speed gear train 22 by way of the idle gear train 27 as a $2^{nd}$ torque, and the secondary rotor transfer torque TR2 is removed as a $3^{rd}$ torque at the third speed driven gear 23*b* through mesh engagement of the third speed drive gear 23*a* with the third speed driven gear 23*b*. Consequently, a torque resulting from addition of the $2^{nd}$ torque and the $5^{th}$ torque and subtraction of the $3^{rd}$ torque therefrom is transmitted from the counter shaft 14 to the drive wheels DW, DW as a total driving force by way of the final gear 26*a*, the differential gear mechanism 8 and the drive shafts 9, 9. As a result, the electric motor 2 can charge the battery 114 while the vehicle is driving.

Next, a control of upshift from the third speed driving to the fourth speed driving will be described.

In the $3^{rd}$ mode driving in which the primary clutch 41 is engaged and the primary change-speed shifter 51 is shifted into the third speed connecting position for gear engagement, as FIG. 47(*a*) shows, the secondary change-speed shifter 52 is shifted into the fourth speed connecting position for gear engagement, and the secondary intermediate shaft 16 is connected to the fourth speed drive gear 24*a* ($3^{rd}$ Pre4 mode). Following this, by disengaging the primary clutch 41 and engaging the secondary clutch 42, as FIG. 47(*b*) shows, the torque of the engine 6 is transmitted to the drive wheels DW, DW by way of the fourth transmission path ($4^{th}$ Pre3 mode).

Next, a case will be described in which the electric motor 2 is used to assist in engine drive or to charge the battery 114 in the fourth speed driving. Hereinafter, to start with, a state will be described in which the primary change-speed shift 51 is shifted into the neutral position ($4^{th}$ mode).

A case will be described in which the electric motor 2 is used to assist in engine driving or to charge the battery 114 by making use of three modes ($4^{th}$ driving first mode, $4^{th}$ driving second mode, $4^{th}$ driving third mode) while the vehicle is driving in the $4^{th}$ mode.

Figure 48:
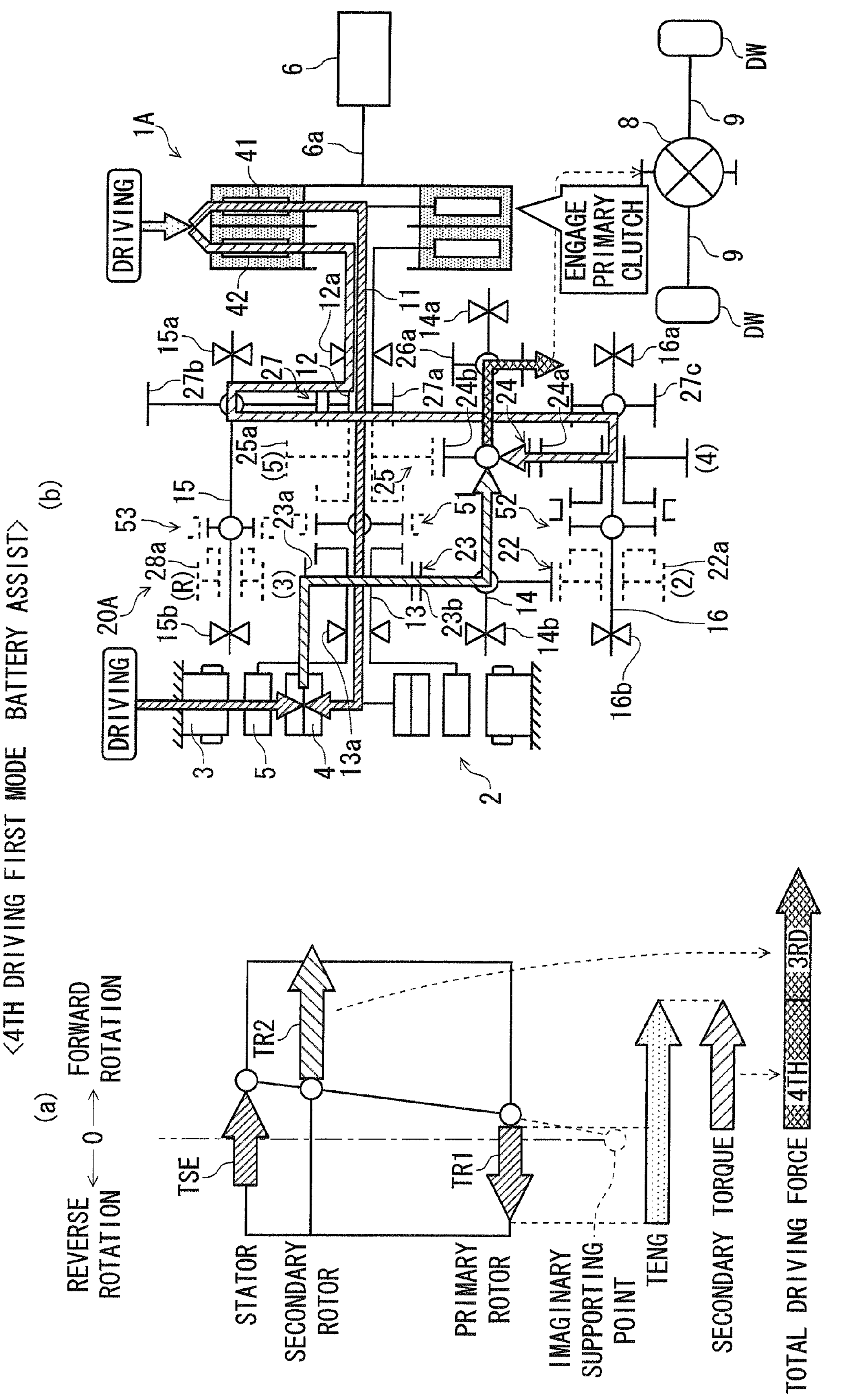
FIG. 48 shows diagrams illustrating states when assist is made in a $4^{th}$ driving first mode, of which (a) is a speed diagram, and (b) is a diagram illustrating a state of torque transmission of the power output system.

As FIG. 48(*a*) shows, the $4^{th}$ driving first mode is realized by engaging further the primary clutch 41 from the $4^{th}$ mode in which the secondary clutch 42 is engaged. This means that a certain ratio is forced to be produced between the engine 6 and the electric motor 2 by making use of the fact that the rotating speed of the primary rotor 4 which is connected to the engine 6 via the primary main shaft 11 is inevitably lower than the rotating speed of the secondary rotor 5 which rotates through mesh engagement of the third speed drive gear 23*a* with the third speed driven gear 23*b* in the fourth speed driving in which the vehicle is driving via the fourth speed gear pair 24 by engaging the primary clutch 41. When the rotating speed of the secondary rotor 5 is higher than the rotating speed of the primary rotor 4, from the characteristics of the electric motor 2, the imaginary supporting point P of the electric motor 2 is positioned downwards in FIG. 48(*a*), and the revolving speed of the revolving magnetic field in the stator 3 is inevitably higher than the rotating speed of the secondary rotor 5.

When the electric motor 2 is used to assist in engine driving in this mode, as FIGS. 48(*a*) and 48(*b*) show, by supplying electric power to the stator 3 so that the revolving magnetic field in the forward rotating direction is increased in the stator 3, a driving equivalent torque TSE in the forward rotating direction acts on the stator 3 which corresponds to the electric power supplied to the stator 3. Then, a secondary rotor transfer torque TR2 in the forward rotating direction is outputted from the secondary rotor 5 and is transmitted from the third speed drive gear 23*a* to the third speed driven gear 23*b* as a $3^{rd}$ torque. In addition, a primary rotor transfer torque TR1 in the reverse rotating direction acts on the primary rotor 4 as a reaction force, and therefore, a secondary torque resulting from subtraction of the primary rotor transfer torque TR1 from the engine torque TENG is transmitted from the secondary main shaft 12 to the fourth speed gear pair 24 by way of the idle gear train 27 as a $4^{th}$ torque. Then, a torque resulting from addition of the $3^{rd}$ torque and the $2^{nd}$ torque at the counter shaft 14 is transmitted therefrom to the drive wheels DW, DW as a total driving force by way of the final gear 26*a*, the differential gear mechanism 8 and the drive shafts 9, 9. As a result, the electric motor 2 can assist in engine driving.

Figure 49:
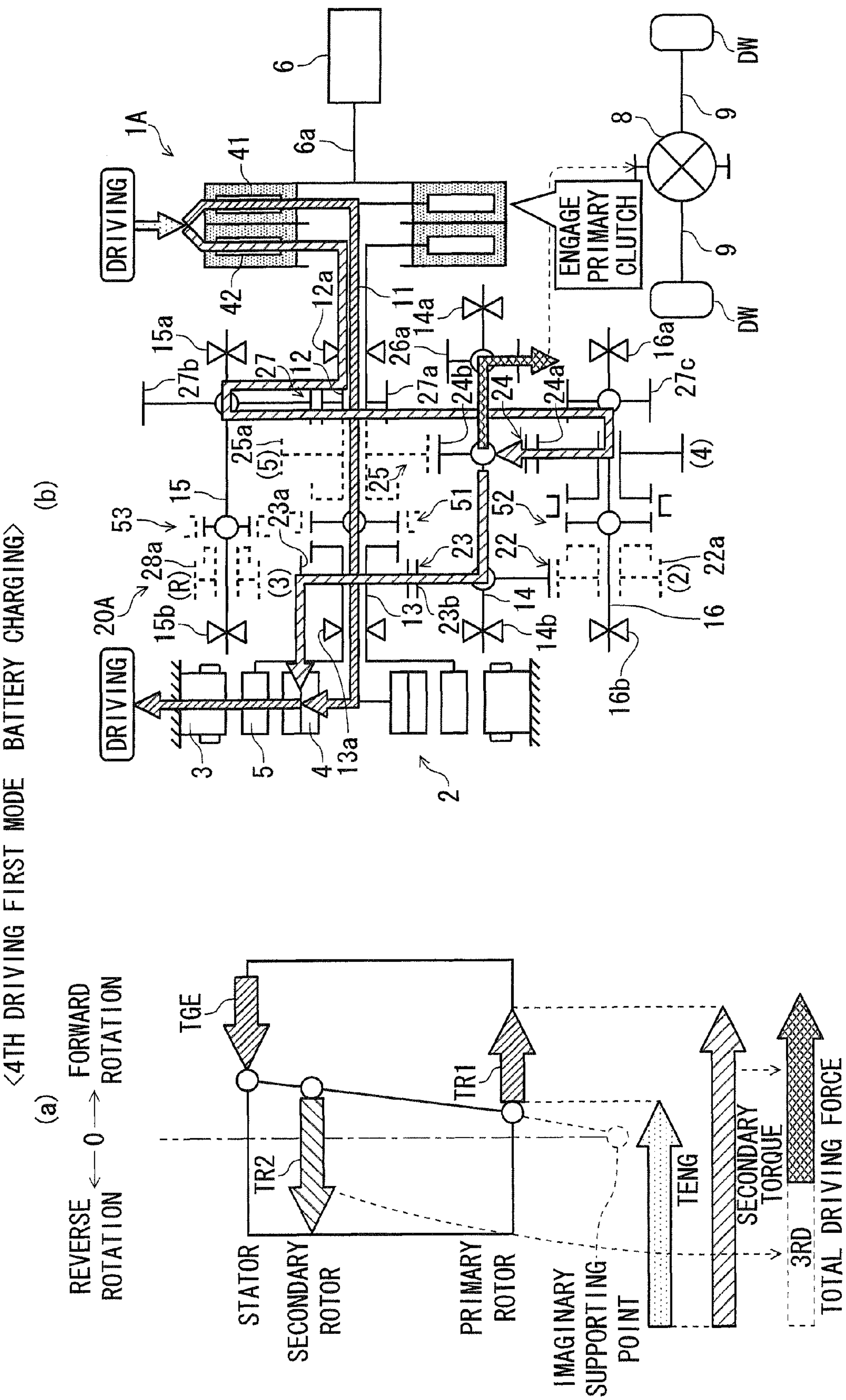
FIG. 49 shows diagrams illustrating states when charging is made in the $4^{th}$ driving first mode, of which (a) is a speed diagram, and (b) is a diagram illustrating a state of torque transmission of the power output system.

In this mode, when the electric motor 2 is used to charge the battery 114, as FIGS. 49(*a*) and 49(*b*) show, electric power is generated in the stator 3 by use of the secondary rotor transfer torque TR2 which is transferred to the secondary rotor 5. As this occurs, by applying a generating equivalent torque TGE in the reverse rotating direction to the stator 3 so as to decrease the revolving magnetic field, a secondary rotor transfer torque TR2 in the reverse rotating direction acts on the secondary rotor 5 so as to decrease the rotating speed of the secondary rotor 5. On the other hand, a primary rotor transfer torque TR1 in the forward rotating acts on the primary rotor 4 as a reaction force, whereby a torque resulting from subtraction of the $3^{rd}$ torque from the secondary torque which results from addition of the engine torque TENG and the primary rotor transfer torque TR1 is transmitted to the drive wheels DW, DW as a total driving force by way of the final gear 26*a*, the differential gear mechanism 8 and the drive shafts 9, 9. As a result, the electric motor 2 can charge the battery 114 while the vehicle is driving.

Next, a case will be described in which the electric motor 2 is used to assist in engine driving or to charge the battery 114 in the $4^{th}$ driving second mode.

Figure 50:
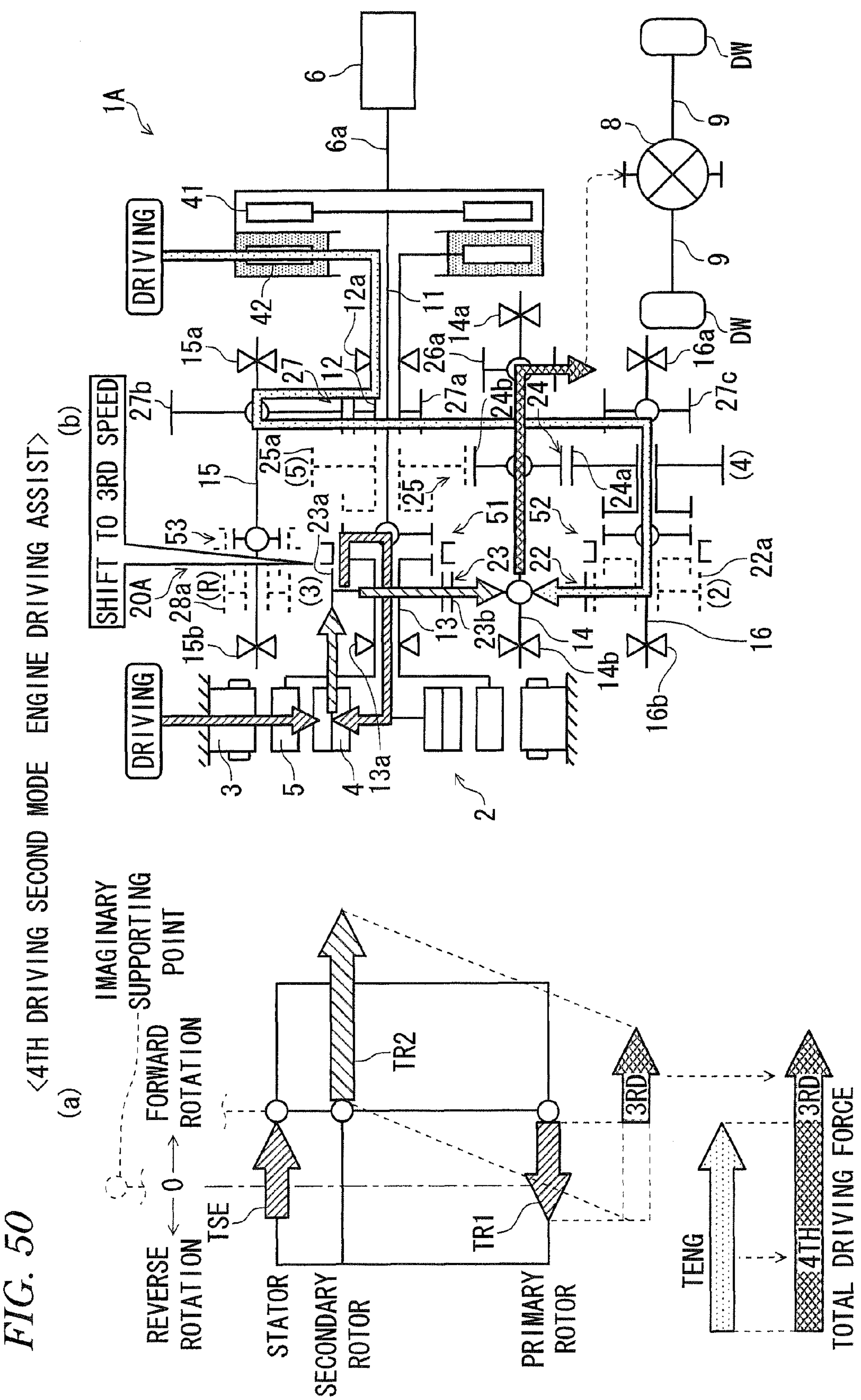
FIG. 50 shows diagrams illustrating states when assist is made in a $4^{th}$ driving second mode, of which (a) is a speed diagram, and (b) is a diagram illustrating a state of torque transmission of the power output system.

As FIG. 50(*b*) shows, the $4^{th}$ driving second mode is realized by shifting the primary change-speed shifter 51 into the third speed connecting position for gear engagement from the $4^{th}$ mode in which the secondary clutch 42 is engaged. The electric motor 2 is locked as has been described above by shifting the primary change-speed shifter 51 into the third speed connecting position for gear engagement. In this case, when the rotating speed of the primary rotor 4 equals the rotating speed of the secondary rotor 5, from the characteristics of the electric motor 2, the imaginary supporting point P of the electric motor 2 is positioned at a point at infinity in FIG. 50(*a*).

When the electric motor 2 is used to assist in engine driving in this mode, as FIGS. 50(*a*) and 50(*b*) show, by supplying electric power to the stator 3 so that the revolving magnetic field in the forward rotating direction is increased in the stator 3, a driving equivalent torque TSE in the forward rotating direction acts on the stator 3 which corresponds to the electric power supplied to the stator 3. Then, a secondary rotor transfer torque TR2 in the forward rotating direction is outputted from the secondary rotor 5. In addition, a primary rotor transfer torque TR1 in the reverse rotating direction acts on the primary rotor 4 as a reaction force, and therefore, a torque obtained by subtracting the primary rotor transfer torque TR1 from the secondary rotor transfer torque TR2 is transmitted to the third speed driven gear 23*b* as a 3$^{rd}$ torque by the connection of the primary main shaft 11 with the third speed drive gear 23*a* which is effected by the first change-speed shifter 51. In addition, the engine torque TENG is transmitted from the secondary main shaft 12 to the fourth speed gear pair 24 by way of the idle gear train 27 as a 4$^{th}$ torque. Then, a torque resulting from addition of the 3$^{rd}$ torque and the 2$^{nd}$ torque at the counter shaft 14 is transmitted therefrom to the drive wheels DW, DW as a total driving force by way of the final gear 26*a*, the differential gear mechanism 8 and the drive shafts 9, 9. As a result, the electric motor 2 can assist in engine driving.

Figure 51:
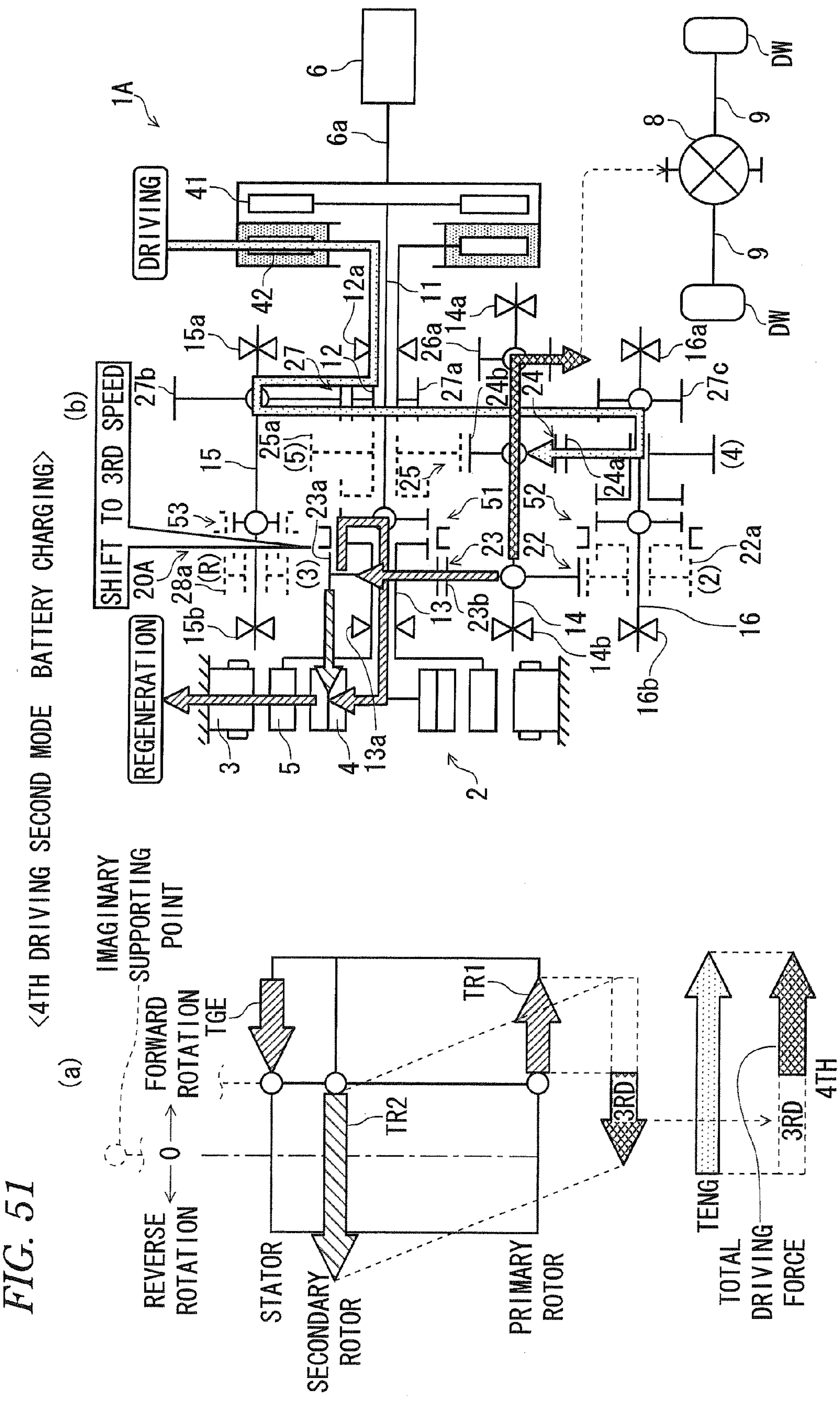
FIG. 51 shows diagrams illustrating states when charging is made in the $4^{th}$ driving second mode, of which (a) is a speed diagram, and (b) is a diagram illustrating a state of torque transmission of the power output system.

In this mode, when the electric motor 2 is used to charge the battery 114, as FIGS. 51(*a*) and 51(*b*) show, electric power is generated in the stator 3 by use of the secondary rotor transfer torque TR2 which is transferred to the secondary rotor 5. As this occurs, by applying a generating equivalent torque TGE in the reverse rotating direction to the stator 3 so as to decrease the revolving magnetic field, the secondary rotor transfer torque TR2 in the reverse rotating direction acts on the secondary rotor 5 so as to decrease the rotating speed of the secondary rotor 5. On the other hand, a primary rotor transfer torque TR1 in the forward rotating direction acts on the primary rotor 4 as a reaction force. In addition, the engine torque is transmitted from the secondary main shaft 12 to the fourth speed gear pair 24 by way of the idle gear train 27 as a 4$^{th}$ torque. By mesh engagement of the third speed drive gear 23*a* with the third speed driven gear 23*b*, a torque resulting from subtraction of the primary rotor transfer torque TR1 from the 4$^{th}$ torque is transmitted to the secondary rotor 5 as a 3$^{rd}$ torque. Then, a torque resulting from subtraction the 3$^{rd}$ torque from the 4$^{th}$ torque at the counter shaft 14 is transmitted therefrom to the drive wheels DW, DW as a total driving force by way of the final gear 26*a*, the differential gear mechanism 8 and the drive shafts 9, 9. As a result, the electric motor 2 can charge the battery 114 while the vehicle is driving.

Next, a case will be described in which the electric motor 2 is used to assist in engine driving or to charge the battery 114 in the 4$^{th}$ driving third mode.

Figure 52:
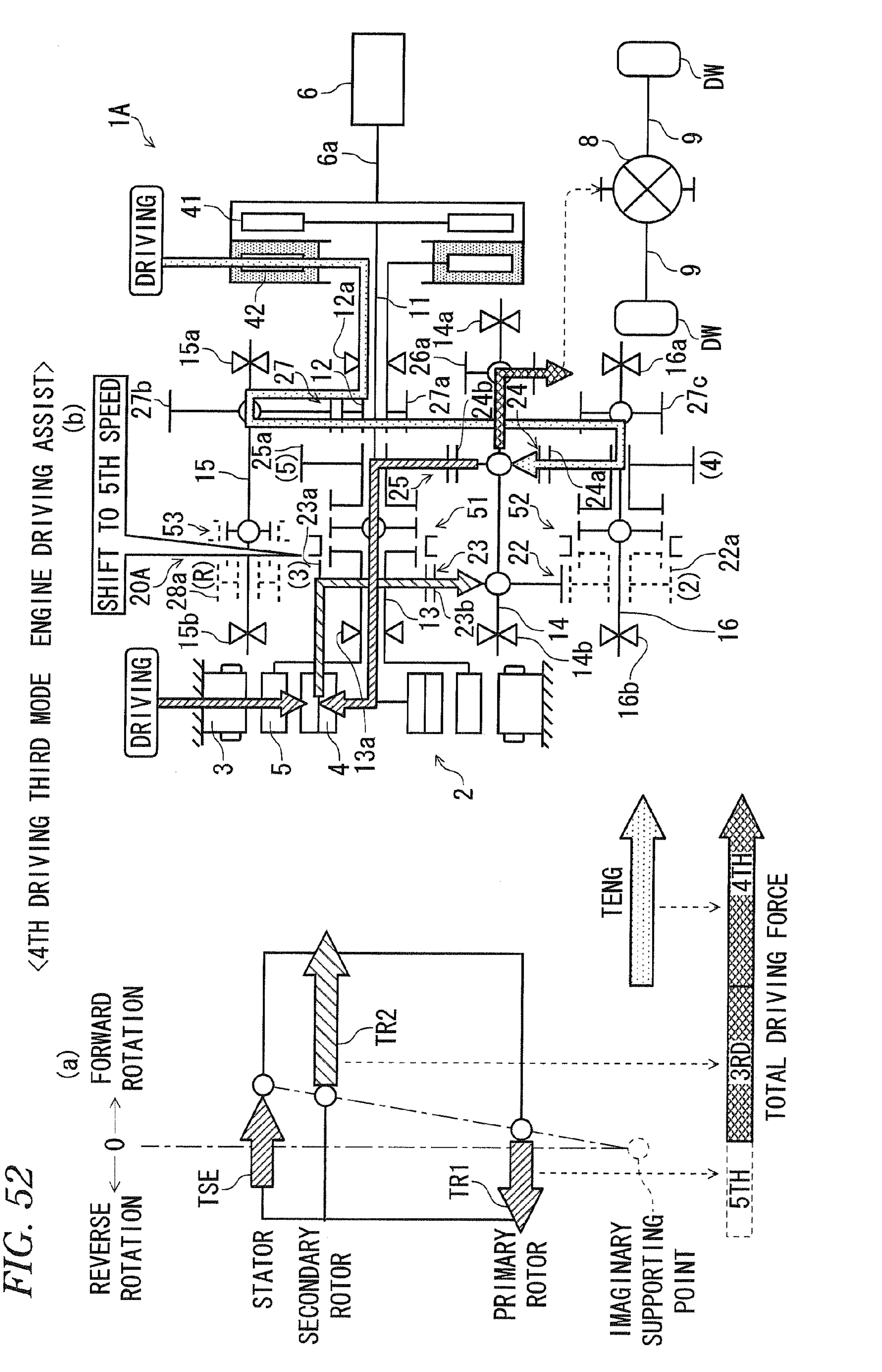
FIG. 52 shows diagrams illustrating states when assist is made in a $4^{th}$ driving third mode, of which (a) is a speed diagram, and (b) is a diagram illustrating a state of torque transmission of the power output system.

As FIG. 52(*b*) shows, the 4$^{th}$ driving third mode is realized by shifting further the primary change-speed shifter 51 into the fifth speed connecting position for gear engagement from the 4$^{th}$ mode in which the secondary clutch 42 is engaged. This means that a certain ratio is forced to be produced between the engine 6 and the electric motor 2 by making use of the fact that the rotating speed of the primary rotor 4 is inevitably lower than the rotating speed of the secondary rotor 2 as has been described above by shifting the primary change-speed shifter 51 into the fifth speed connecting position for gear engagement.

When the electric motor 2 is used to assist in engine driving in this mode, as FIGS. 52(*a*) and 52(*b*) show, by supplying electric power to the stator 3 so that the revolving magnetic field in the forward rotating direction is increased in the stator 3, a driving equivalent torque TSE in the forward rotating direction acts on the stator 3 which corresponds to the electric power supplied to the stator 3. Then, a secondary rotor transfer torque TR2 in the forward rotating direction is outputted from the secondary rotor 5 and is transmitted from the third speed drive gear 23*a* to the third speed driven gear 23*b* as a 3$^{rd}$ torque. In addition, the engine torque is transmitted from the secondary main shaft 12 to the fourth speed gear train 24 by way of the idle gear train 27 as a 4$^{th}$ torque. Additionally, a primary rotor transfer torque TR1 in the reverse rotating direction acts on the primary rotor 4 as a reaction force, and therefore, the primary rotor transfer torque TR1 is removed as a 5$^{th}$ torque at the fourth speed driven gear 24*b* through mesh engagement of the fifth speed drive gear 25*a* with the fourth speed driven gear 24*b*. Consequently, a torque obtained by subtracting the 5$^{th}$ torque from a torque resulting from addition of 3$^{rd}$ torque and the 4$^{th}$ torque at the counter shaft 14 is transmitted to the drive wheels DW, DW as a total driving force by way of the final gear 26*a*, the differential gear mechanism 8 and the drive shafts 9, 9. As a result, the electric motor 2 can assist in engine driving.

Figure 53:
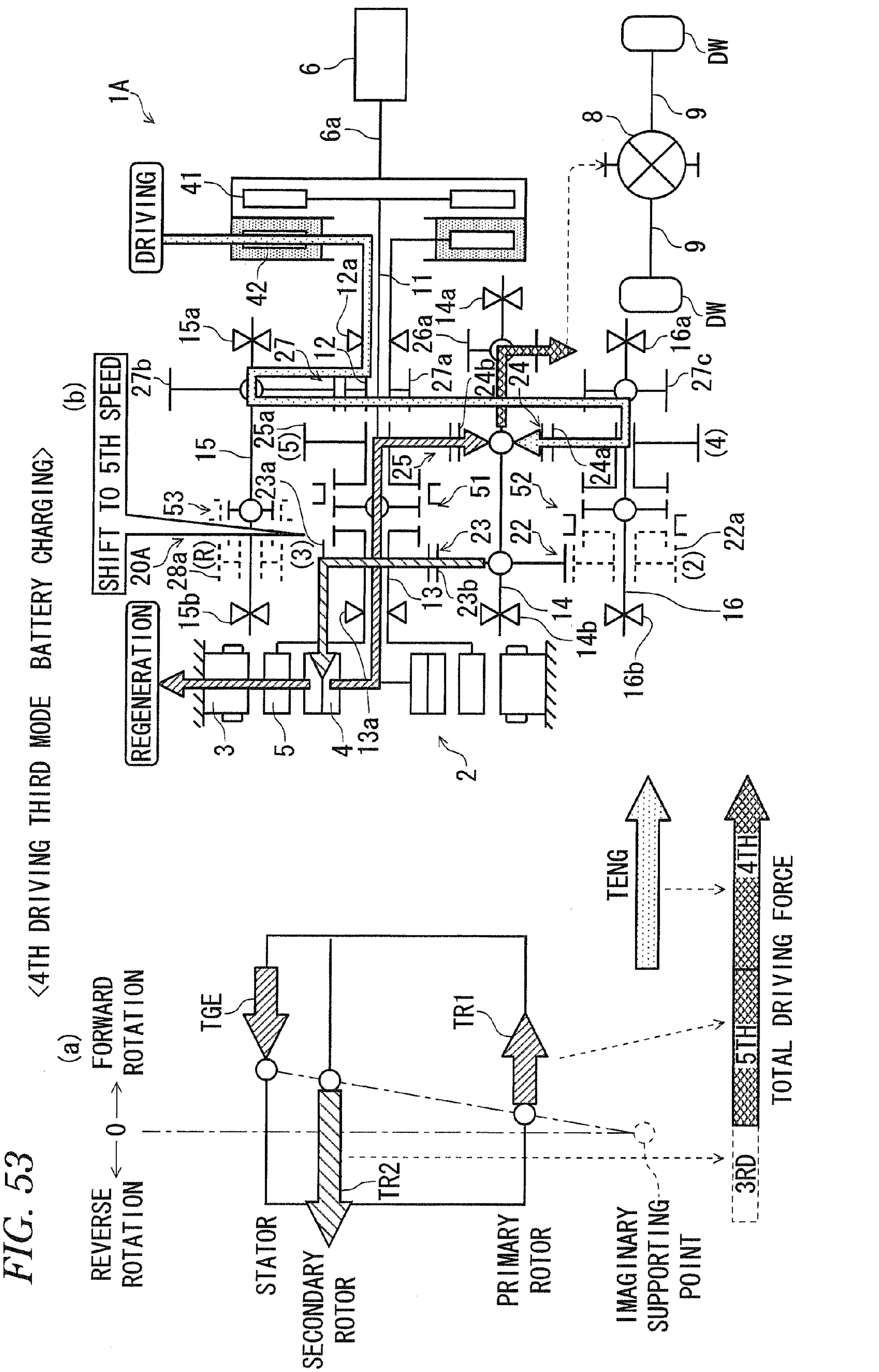
FIG. 53 shows diagrams illustrating states when charging is made in the $4^{th}$ driving third mode, of which (a) is a speed diagram, and (b) is a diagram illustrating a state of torque transmission of the power output system.

In this mode, when the electric motor 2 is used to charge the battery 114, as FIGS. 53(*a*) and 53(*b*) show, electric power is generated in the stator 3 by use of the secondary rotor transfer torque TR2 which is transferred to the secondary rotor 5. As this occurs, by applying a generating equivalent torque TGE in the reverse rotating direction to the stator 3 so as to decrease the revolving magnetic field, the secondary rotor transfer torque TR2 in the reverse rotating direction acts on the secondary rotor 5 so as to decrease the rotating speed of the secondary rotor 5. On the other hand, a primary rotor transfer torque TR1 in the forward rotating direction acts on the primary rotor 4 as a reaction force and is transmitted to the fourth speed driven gear 24*b* as a 5$^{th}$ torque through mesh engagement of the fifth speed drive gear 25*a* with the fourth speed driven gear 24*b*. In addition, the engine torque is transmitted from the secondary main shaft 12 to the fourth speed gear pair 24 by way of the idle gear train 27 as a 4$^{th}$ torque. By mesh engagement of the third speed drive gear 23*a* with the third speed driven gear 23*b*, the secondary rotor transfer torque TR2 is removed as a 3$^{rd}$ torque at the third speed driven gear 23*b*. Consequently, a torque resulting from addition of the 4$^{th}$ torque and the 5$^{th}$ torque and subtraction of the 3$^{rd}$ torque therefrom at the counter shaft 14 is transmitted therefrom to the drive wheels DW, DW as a total driving force by way of the final gear 26*a*, the differential gear mechanism 8 and the drive shafts 9, 9. As a result, the electric motor 2 can charge the battery 114 while the vehicle is driving.

Next, a control of upshift from the fourth speed driving to the fifth speed driving will be described.

In the 4$^{th}$ mode in which the secondary clutch 42 is engaged and the secondary change-speed shifter 52 is shifted into the fourth speed connecting position for gear engagement, as FIG. 54(*a*) shows, the primary main shaft 11 is connected to the fifth speed drive gear 25*a* by shifting the primary change-speed shifter 51 into the fifth speed connecting position for gear engagement (4$^{th}$ Pre5 mode). Following this, by disengaging the secondary clutch 42 and engaging the primary clutch 41, as FIG. 54(*b*) shows, the engine torque is transmitted to the drive wheels DW, DW by way of the fifth transmission path (5$^{th}$ Pre4 mode).

In the event that the secondary change-speed shifter 52 is kept shifted in the fourth speed connecting position for gear engagement, the secondary intermediate shaft 16, the primary intermediate shaft 15 and the secondary main shaft 12 are caused to rotate together in association with rotation of the primary main shaft 11. Thus, to prevent the involvement of these intermediate shafts and the secondary main shaft the secondary change-speed shifter 52 is preferably shifted to the neutral position (5$^{th}$ mode).

Next, a case will be described in which the electric motor 2 is used to assist in engine drive or to charge the battery 114 in the fifth speed driving. Hereinafter, to start with, a state will be described in which the primary change-speed shift 51 is shifted into the fifth speed connecting position for gear engagement (5$^{th}$ mode). The following mode is referred to as a 5$^{th}$ driving first mode as a matter of convenience.

In this state, a state has already been produced by shifting the primary change-speed shifter 51 in the fifth speed connecting position for gear engagement in which a certain ratio is forced to be produced between the engine 6 and the electric motor 2 by making use of the fact that the rotating speed of the primary rotor 4 which is connected via the fifth gear pair 25 is inevitably lower than the rotating speed of the secondary rotor 5 which rotates through mesh engagement of the third speed drive gear 23*a* with the third speed driven gear 23*b* in the fifth speed driving in which the vehicle is driving through the fifth speed gear pair 25.

Figure 55:
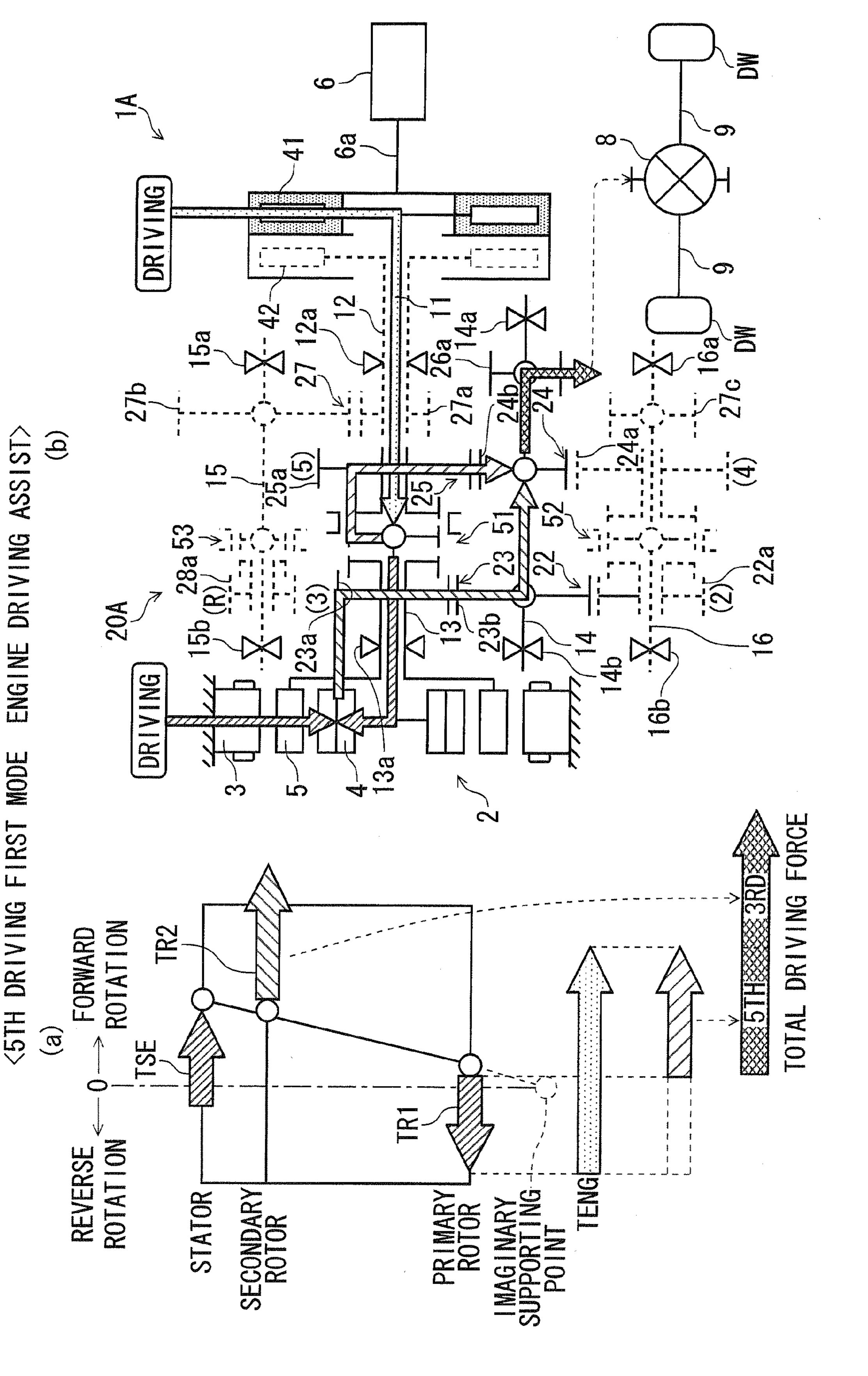
FIG. 55 shows diagrams illustrating states when assist is made in a $5^{th}$ driving first mode, of which (a) is a speed diagram, and (b) is a diagram illustrating a state of torque transmission of the power output system.

When the electric motor 2 is used to assist in engine driving in this mode, as FIGS. 55(*a*) and 55(*b*) show, by supplying electric power to the stator 3 so that the revolving magnetic field in the forward rotating direction is increased in the stator 3, a driving equivalent torque TSE in the forward rotating direction acts on the stator 3 which corresponds to the electric power supplied to the stator 3. Then, a secondary rotor transfer torque TR2 in the forward rotating direction is outputted from the secondary rotor 5 and is transmitted from the third speed drive gear 23*a* to the third speed driven gear 23*b* as a $3^{rd}$ torque. In addition, a primary rotor transfer torque TR1 in the reverse rotating direction acts on the primary rotor 4 as a reaction force, and therefore, a torque resulting from subtraction of the primary rotor transfer torque TR1 from the engine torque TENG is transmitted from the fifth speed drive gear 25*a* to the fourth speed driven gear 24*b* as a $5^{th}$ torque. Then, a torque resulting from addition of the $3^{rd}$ torque and the $5^{th}$ torque at the counter shaft 114 is transmitted to the drive wheels DW, DW as a total driving force by way of the final gear 26*a*, the differential gear mechanism 8 and the drive shafts 9, 9. As a result, the electric motor 2 can assist in engine driving.

Figure 56:
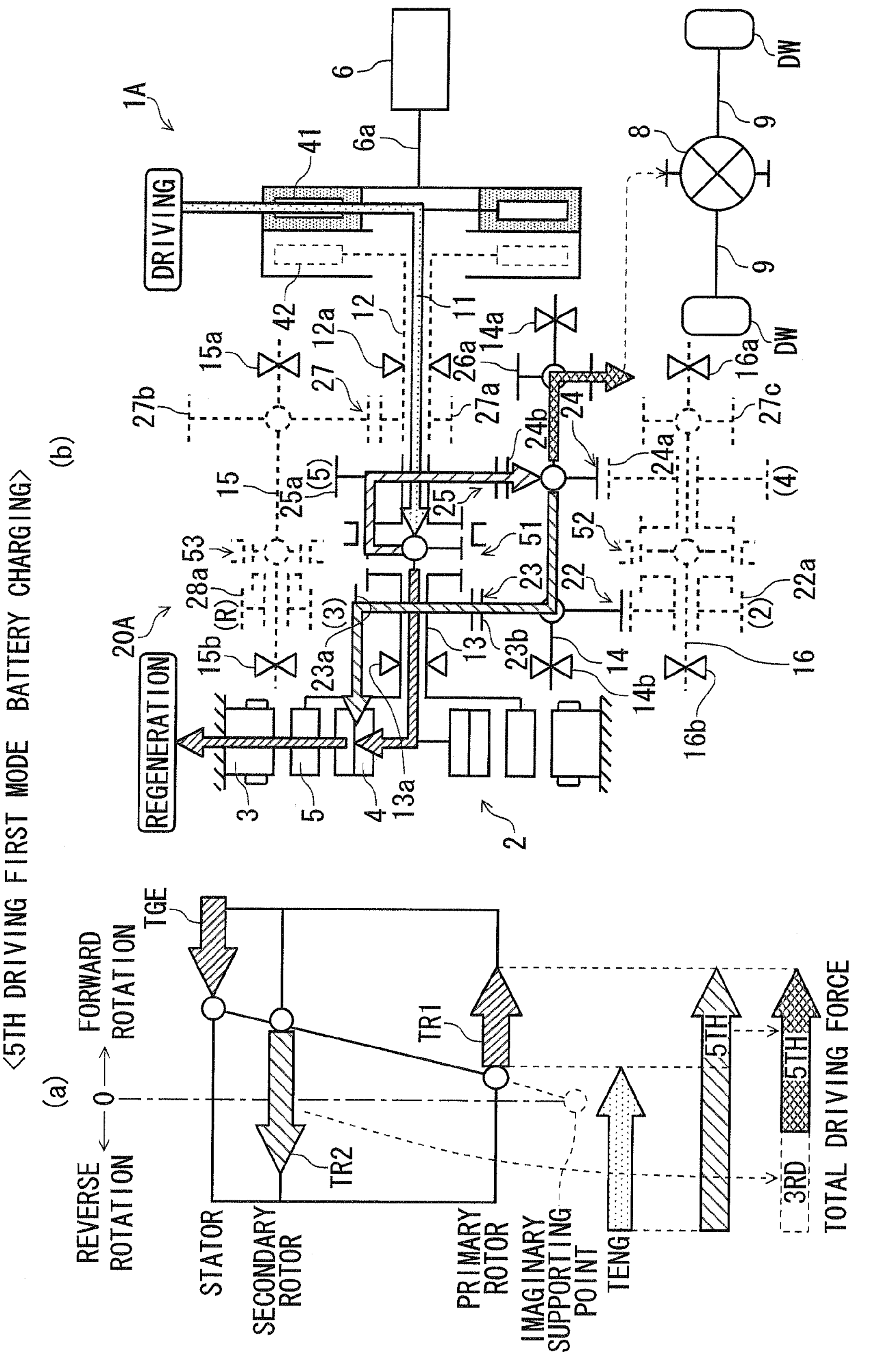
FIG. 56 shows diagrams illustrating states when charging is made in the $5^{th}$ driving first mode, of which (a) is a speed diagram, and (b) is a diagram illustrating a state of torque transmission of the power output system.

In this mode, when the electric motor 2 is used to charge the battery 114, as FIGS. 56(*a*) and 56(*b*) show, electric power is generated in the stator 3 by use of the secondary rotor transfer torque TR2 which is transferred to the secondary rotor 5. As this occurs, a generating equivalent torque TGE in the reverse rotating direction acts on the stator 3 so as to decrease the revolving magnetic field therein, and the secondary rotor transfer torque TR2 in the reverse rotating direction acts on the secondary rotor 5 so as to decrease the rotating speed of the secondary rotor 5. On the other hand, a primary rotor transfer torque TR1 in the forward rotating direction acts on the primary rotor 4 as a reaction force, and therefore, a torque resulting from addition of the engine torque TENG and the primary rotor transfer torque TR1 as a result of connection of the primary main shaft 11 with the fifth speed drive gear 25*a* by the primary change-speed shifter 51 is transmitted to the fifth speed drive gear 25*a* as a $5^{th}$ torque. In addition, by mesh engagement of the third speed drive gear 23*a* with the third speed driven gear 23*b*, the secondary rotor transfer torque TR2 is removed as a $3^{rd}$ torque at the third speed driven gear 23*b*. Consequently, a torque resulting from subtraction of the $3^{rd}$ torque from the $5^{th}$ torque at the counter shaft 14 is transmitted therefrom to the drive wheels DW, DW as a total driving force by way of the final gear 26*a*, the differential gear mechanism 8 and the drive shafts 9, 9. As a result, the electric motor 2 can charge the battery 114 while the vehicle is driving.

In addition, the power output system 1 A includes a motor driving second mode in addition to the motor driving first mode as assisting and charging modes performed by the electric motor 2 during the motor driving.

Figure 57:
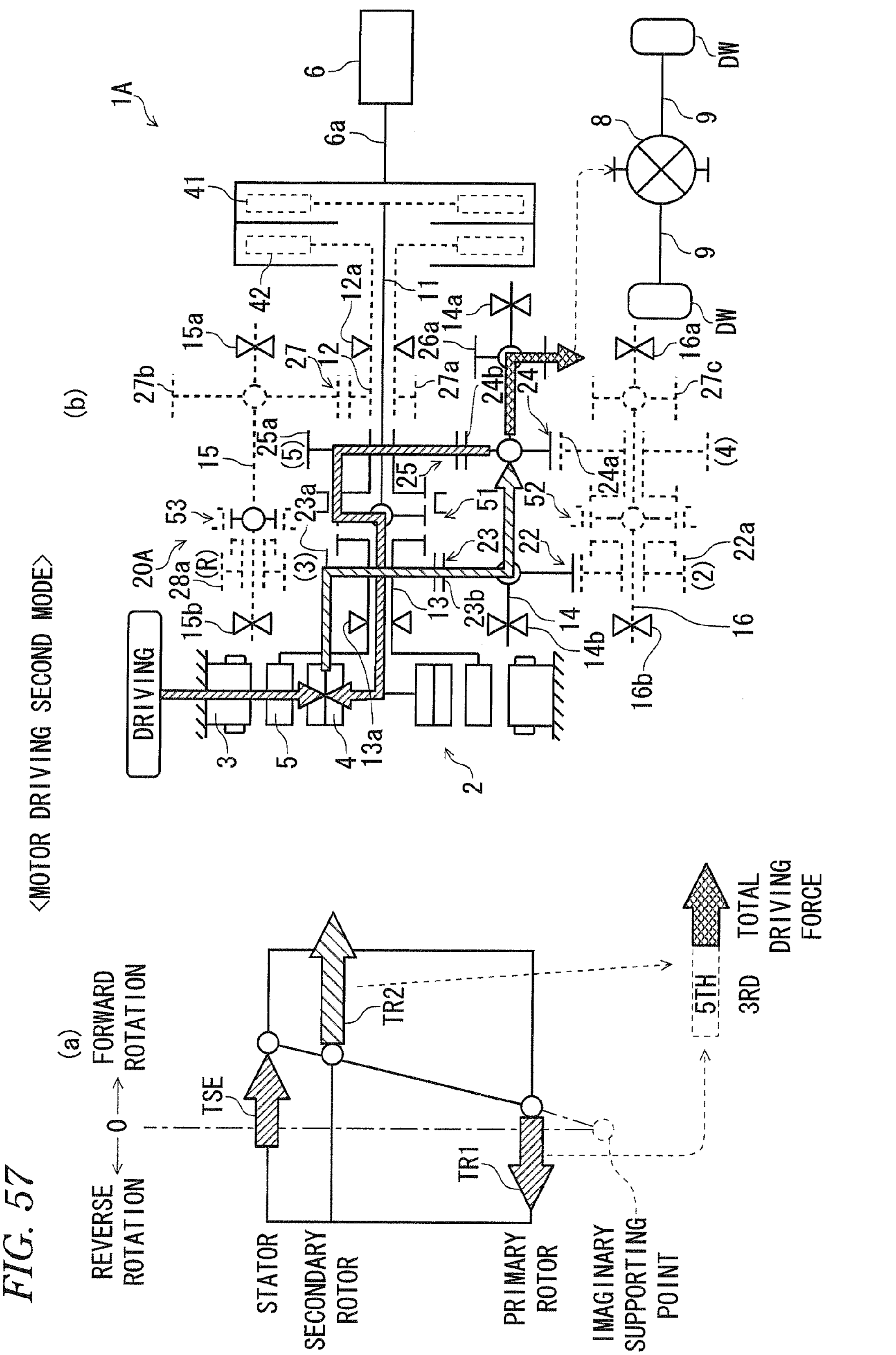
FIG. 57 shows diagrams illustrating states in a motor driving second mode, of which (a) is a speed diagram, and (b) is a diagram illustrating a state of torque transmission of the power output system.

As FIG. 57(*b*) shows, the motor driving second mode is realized by disengaging the primary and secondary clutches 41, 42 and shifting the primary change-speed shifter 51 into the fifth speed connecting position for gear engagement. A certain ratio is produced between the engine 6 and the electric motor 2 by making use of the fact that the rotating speed of the primary rotor 4 is inevitably higher than the rotating speed of the secondary rotor 5 as has been described above by shifting the primary change-speed shifter 51 into the fifth speed connecting position for gear engagement.

In this state, by supplying electric power to the stator 3 so that the revolving magnetic field in the forward rotating direction is increased in the stator 3, a driving equivalent torque TSE in the forward rotating direction acts on the stator 3 which corresponds to the electric power supplied to the stator 3. Then, a secondary rotor transfer torque TR2 in the forward rotating direction is outputted from the secondary rotor 5 and is transmitted from the third speed drive gear 23*a* to the third speed driven gear 23*b* as a $3^{rd}$ torque. In addition, a primary rotor transfer torque TR1 in the reverse rotating direction acts on the primary rotor 4 as a reaction force, and therefore, the primary rotor transfer torque TR1 is removed as a $5^{th}$ torque as a result of connection of the primary main shaft 11 with the fifth speed drive gear 25*a* by the primary change-speed shifter 51. Consequently, a torque resulting from subtraction of the $5^{th}$ torque from the $3^{rd}$ torque at the counter shaft 14 is transmitted therefrom to the drive wheels DW, DW as a total driving force by way of the final gear 26*a*, the differential gear mechanism 8 and the drive shafts 9, 9. As a result, the vehicle can be driven only by the torque of the electric motor 2.

In addition, in the power output system 1A, the electric motor 2 can be used to assist in engine driving or to charge the battery 114 during the reverse driving. The following mode is referred to as a reverse driving first mode as a matter of convenience.

As FIGS. 58(*a*) and 58(*b*) show, the reverse driving first mode is realized by shifting a reverse driving shifter 53 in a reverse driving connecting position for gear engagement, engaging the secondary clutch 42 and shifting the primary change-speed shifter 51 into the fifth speed connecting position for gear engagement so as to apply a generating equivalent torque TGE in the reverse rotating direction to the stator 3 so that the revolving magnetic field in the reverse rotating direction is increased. By realizing the reverse driving first mode, the engine torque in the reverse rotating direction is transmitted to the secondary main shaft 12, the idle drive gear 27*a*, the first idle driven gear 27*b*, a reverse drive gear 28*a*, and the third speed driven gear 23*b*. In addition, the secondary rotor transfer torque TR2 in the reverse rotating direction is outputted from the secondary rotor 5 and is then transmitted from the third speed drive gear 23*a* to the third speed driven gear 23*b* as a $3^{rd}$ torque. On the other hand, the primary rotor transfer torque TR1 in the forward rotating direction acts on the primary rotor 4 as a reaction force and is then removed as a $5^{th}$ torque at the fourth speed driven gear 24*b* as a result of mesh engagement of the fifth speed drive gear 25*a* with the fourth speed driven gear 24*b*. Consequently, a torque resulting from subtraction of the $5^{th}$ torque from a torque resulting from addition of the engine torque and the $3^{rd}$ torque at the counter shaft 14 is transmitted to the drive wheels DW, DW as a total driving force by way of the final gear 26*a*, the differential gear mechanism 8 and the drive shafts 9, 9, whereby the vehicle can be reversed while the electric motor 2 is assisting in engine driving.

According to the power output systems 1, 1 A of the first and second embodiments which are configured as has been described heretofore, the primary rotor 4 is connected to the primary main shaft which is one of the two transmission shafts thereof, the secondary rotor 5 is connected to the drive shafts 9, 9, and the ring gear 35 is connected to the electric motor 2. Therefore, the secondary rotor 5 can combine the torque transmitted from the primary rotor 4 and the torque corresponding to the electric power of the electric motor 2 for transmission to the drive shafts 9, 9. Consequently, the torque of the engine 6 and the torque of the electric motor 2 can be combined together for transmission to the drive shafts 9, 9, thereby making is possible to transmit a larger driving force to the drive shafts 9, 9.

Third Embodiment

Figure 60:
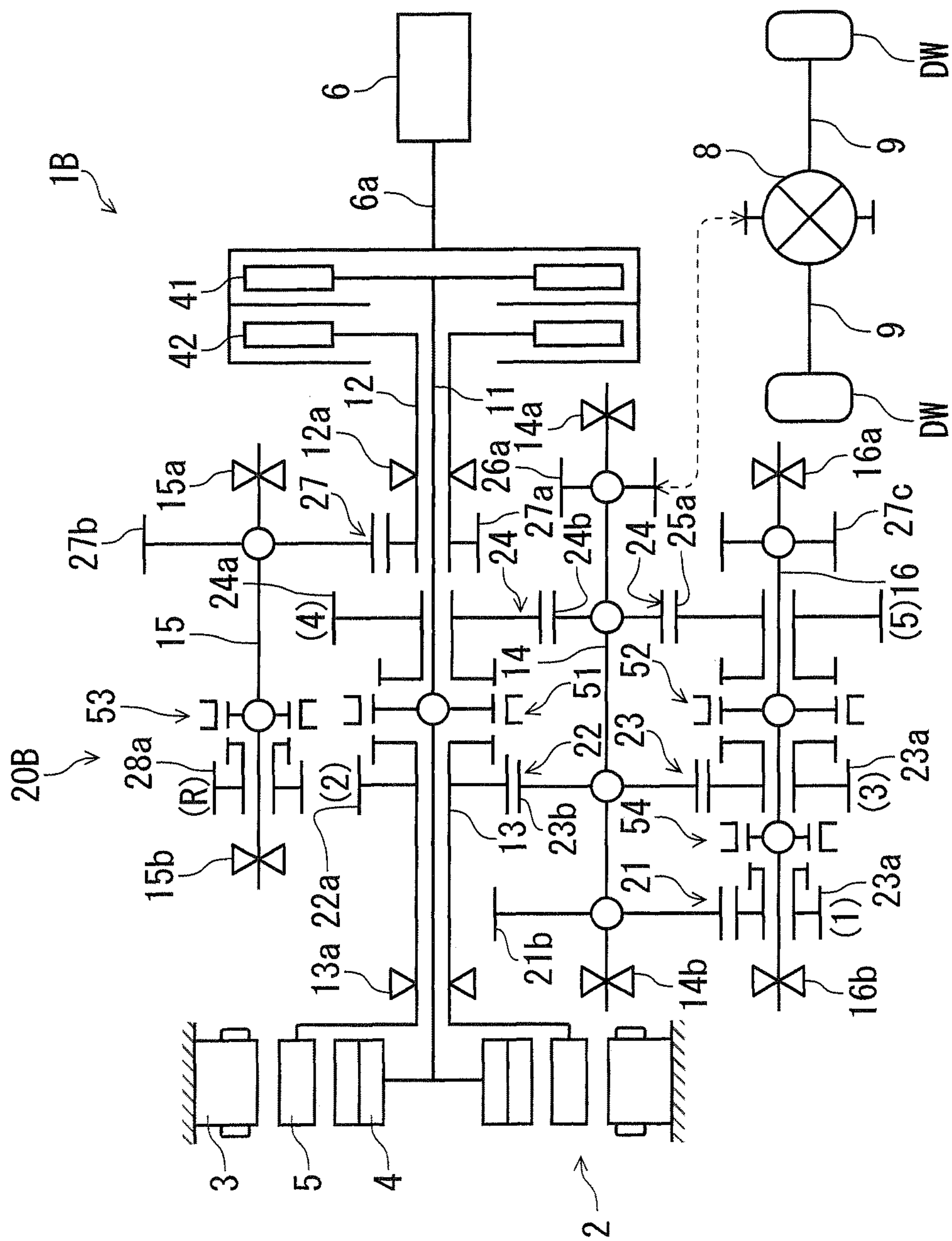
FIG. 60 is a diagram showing schematically a power output system according to a third embodiment of the invention.

Next, a power output system according to a third embodiment of the invention will be described by reference to FIG. 60. The power output system of the third embodiment has the same configuration as that of the power output system 1 A of the second embodiment except that the configuration of a transmission differs from that of the transmission 20A of the second embodiment. Because of this, like reference numerals or corresponding reference numerals will be given to the same or like portions to those of the power output system 1 A of the second embodiment, and the description thereof will be simplified or omitted.

In a transmission 20B of this embodiment, a second speed drive gear 22*a* and a fourth speed drive gear 24*a* which are even-numbered transmission gears are provided around a primary main shaft 11 (a primary transmission shaft) which is one transmission shaft of two transmission shafts of the transmission 20B. In addition, a first speed drive gear 21*a*, a third speed drive gear 23*a* and a fifth speed drive gear 25*a* which are odd-numbered transmission gears are provided on a secondary intermediate shaft 16 (a secondary transmission shaft) which is the other transmission shaft of the two transmission shafts. Further, a primary rotor 4 of an electric motor 2 which makes up a power combining mechanism 30 is mounted on the primary main shaft 11.

More specifically speaking, a primary change-speed shifter 51 is provided between the second speed drive gear 22*a* which is mounted on a connecting shaft 12 and an idle drive gear 27*a* which is mounted on the secondary main shaft 12. This primary change-speed shifter 51 connects or disconnects a fourth speed drive gear 24*a* which can rotate relatively to the primary main shaft 11 to or from the second speed drive gear 22*a* which is mounted on the primary main shaft 11 and the connecting shaft 13 and also connects or disconnects the primary main shaft 11 to or from the fourth speed drive gear 24*a*. Then, the primary change-speed shifter 51 can be shifted into a second speed connecting position, a neutral position and a fourth speed connecting position. When the primary change-speed shifter 51 is shifted into the second speed connecting position for gear engagement, the primary main shaft 11 and the second speed drive gear 22*a* rotate together. When the primary change-speed shifter 51 is shifted into the fourth speed connecting position for gear engagement, the primary main shaft 11 and the fourth speed drive gear 24*a* rotate together. When the primary change-speed shifter 51 is shifted into the neutral position, the primary main shaft 11 rotates relatively to the second speed drive gear 22*a* and the fourth speed drive gear 24*a*. In addition, when the primary main shaft 11 and the second speed drive gear 22*a* rotate together, the primary rotor 4 which is mounted on the primary main shaft 11 and the secondary rotor 5 which is connected to the second speed drive gear 22*a* via the connecting shaft 13 rotate together, and the ring gear 35 also rotates together, whereby the electric motor 2 is locked together.

Mounted on a counter shaft 14 are a first speed driven gear 21*b*, a third speed driven gear 23*b* which meshes with the second speed drive gear 22*a* which is mounted on the connecting shaft 13, a fourth speed driven gear 24*b* which meshes with the fourth speed drive gear 24*a* which is provided on the primary main shaft 11, and a final gear 26*a* which meshes with a differential gear mechanism 8. The third speed driven gear 23*b* makes up a second speed gear pair 22 together with the second speed drive gear 22*a*, and the fourth speed driven gear 24*b* makes up a fourth speed gear pair 24 together with the fourth speed drive gear 24*a*.

The first speed drive gear 21*a* which can rotate relatively to a primary intermediate shaft 16, the third speed drive gear 23*a*, a fifth speed drive 25*a* are provided on the secondary intermediate shaft 16 sequentially in that order from the side of an electric motor 2. The first speed drive gear 21*a* meshes with the first speed driven gear 21*b* which is mounted on the counter shaft 14 and makes up a first speed gear pair 21 together with the first speed driven gear 21*b*. In addition, the third speed drive gear 23*a* meshes with the third speed driven gear 23*b* which is mounted on the counter shaft 14 and makes up a third speed gear pair 23 together with the third speed driven gear 23*b*. The fifth speed drive gear 25*a* meshes with the fourth speed driven gear 24*b* which is mounted on the counter shaft 14 and makes up a fifth speed gear pair 25 together with the fourth speed driven gear 24*b*.

In addition, a tertiary change-speed shifter 54 is provided on the secondary intermediate shaft 16 between the first speed drive gear 21*a* and the third speed drive gear 23*a*. This tertiary change-speed shifter 54 connects or disconnects the secondary intermediate shaft 16 to or from the first speed drive gear 21*a*. Then, when the tertiary change-speed shifter 54 is shifted into a first speed connecting position for gear engagement, the secondary intermediate shaft 16 and the first speed drive gear 21*a* are connected together and rotate together. When the tertiary change-speed shifter 54 is shifted into a neutral position, the secondary intermediate shaft 16 is disconnected from the first speed drive gear 21*a* and rotates relatively thereto.

Further, a secondary change-speed shifter 52 is provided on the primary intermediate shaft 16 between the third speed drive gear 23*a* and the fifth speed drive gear 25*a*. This secondary change-speed shifter 52 connects or disconnects the secondary intermediate shaft 16 to or from the third speed drive gear 23*a*. The secondary change-speed shifter 52 also connects or disconnects the secondary intermediate shaft 16 to or from the fifth speed drive gear 25*a*. Then, the second change-speed shifter 52 is configured to be shifted into a third speed connecting position, a neutral position and a fifth speed connecting position. When the secondary change-speed shifter 52 is shifted into the third speed connecting position for gear engagement, the secondary intermediate shaft 16 and the third speed drive gear 23*a* rotate together. When the secondary change-speed shifter 52 is shifted into the fifth speed connecting position for gear engagement, the secondary intermediate shaft 16 and the fifth speed drive gear 25*a* rotate together. When the secondary change-speed shifter 52 is shifted into the neutral position, the secondary intermediate shaft 16 rotates relatively to the third speed drive gear 23*a* and the fifth speed drive gear 25*a*.

In the power output system 1B which is configured as has been described above, the second speed gear pair 22 and the third speed gear pair 23 of the first and second embodiments are exchanged, and the fourth speed gear pair 24 and the fifth speed gear pair 25 are exchanged. Thus, the same function and advantage are provided when they are replaced as required.

In addition, the power output system 1B of this embodiment includes the first speed gear pair 21. Therefore, even in an emergency of failure of the electric motor 2, by shifting the tertiary change-speed shifter 54 into the first speed connecting position for gear engagement so as to engage the secondary clutch 42, the power of the engine 6 is transmitted to the drive wheels DW, DW by way of the secondary main shaft 12, the idle gear train 27, the secondary intermediate shaft 16, the first speed gear pair 21 (the first speed drive gear 21*a*, the first speed driven gear 21*b*), the counter shaft 14, the final gear 26*a*, the differential gear mechanism 8 and the drive shafts 9, 9, whereby a first speed driving can be effected.

Fourth Embodiment

Figure 61:
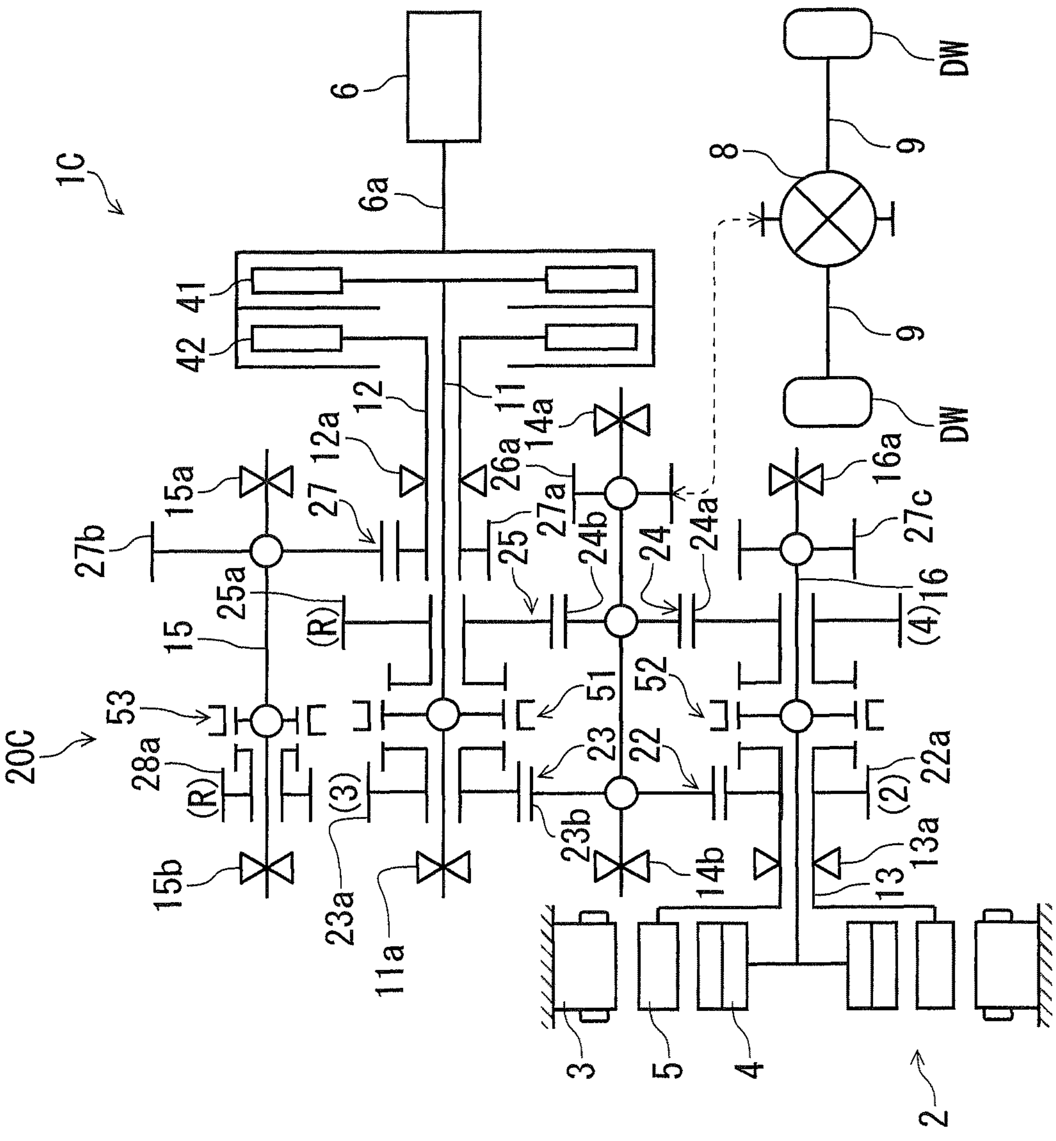
FIG. 61 is a diagram showing schematically a power output system according to a fourth embodiment of the invention.
Figure 62:
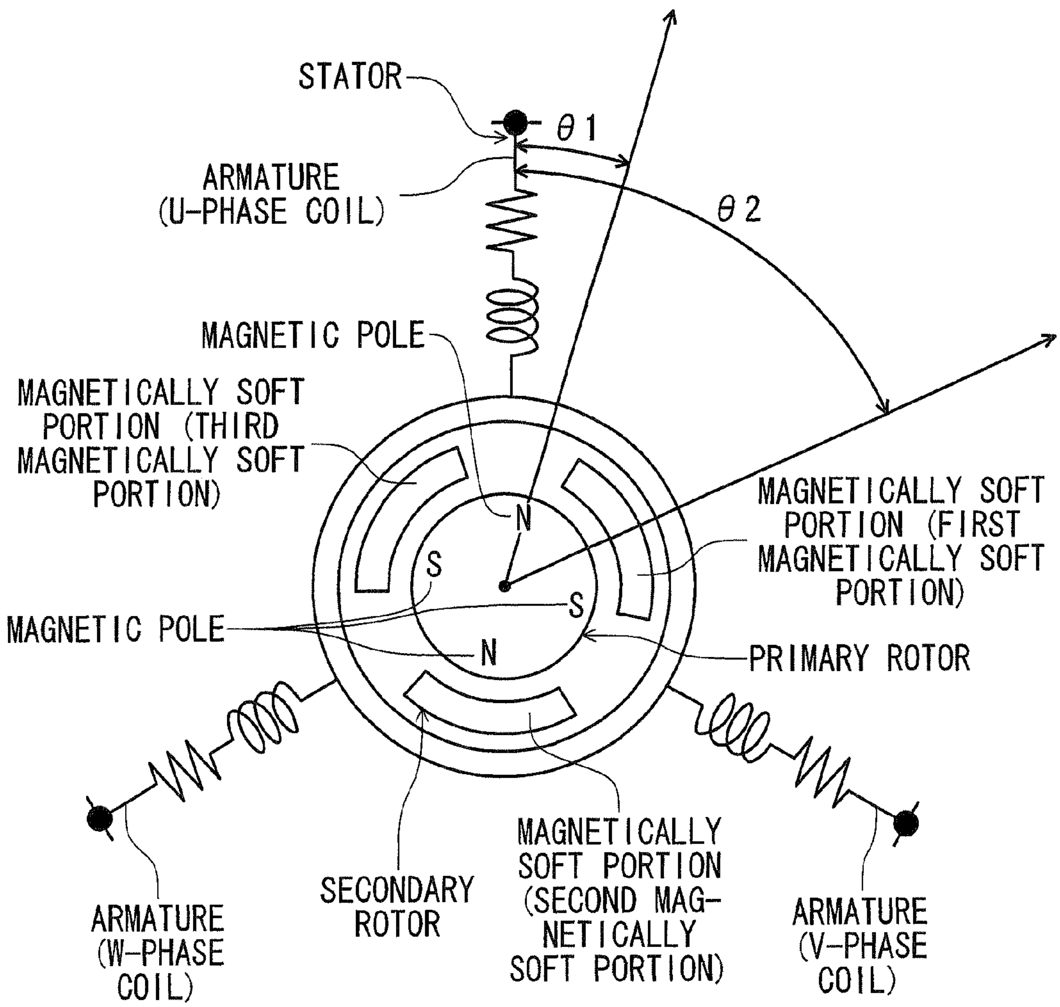
FIG. 62 is a diagram illustrating an equivalent circuit of the electric motor shown in FIG. 3.
Figure 63:
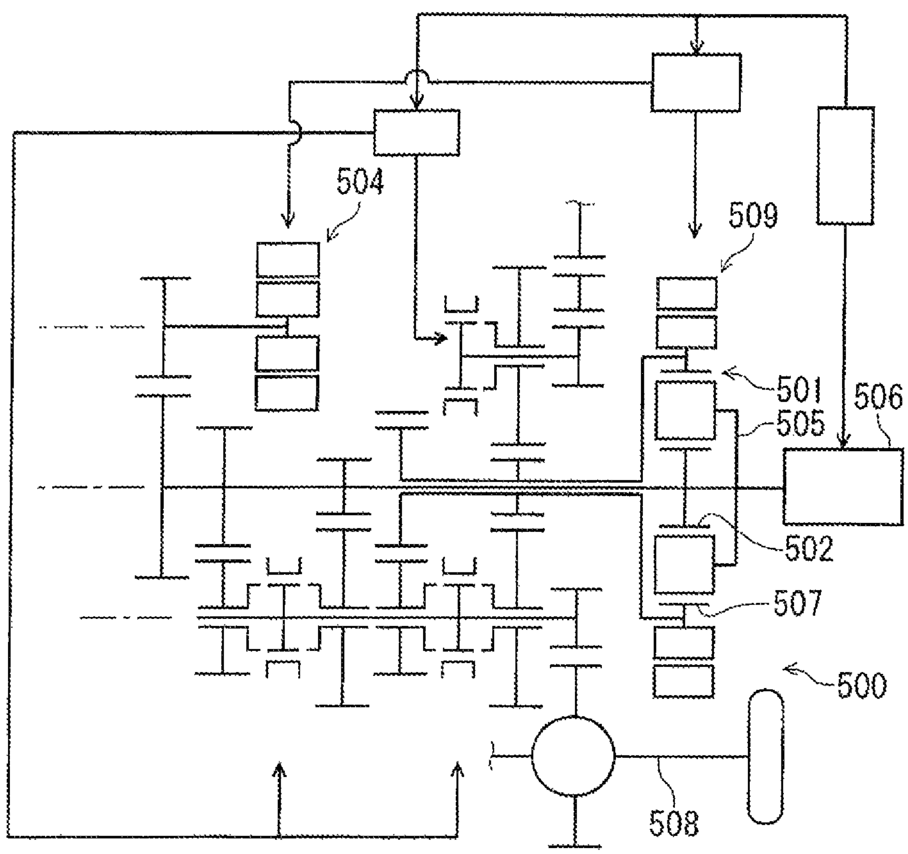
FIG. 63 is a diagram showing schematically a power output system described in Patent Literature 1.

Next, a power output system according to a fourth embodiment of the invention will be described by reference to FIG. 61. The power output system of the fourth embodiment has the same configuration as that of the power output system 1 A of the second embodiment except that a connecting position of an electric motor with a transmission differs. Because of this, like reference numerals or corresponding reference numerals will be given to the same or like portions to those of the power output system 1 A of the second embodiment, and the description thereof will be simplified or omitted.

In a transmission 20C of this embodiment, a third speed drive gear 23*a* and a fifth speed drive gear 25*a* which are odd-numbered transmission gears are provided around a primary main shaft 11 (a secondary transmission shaft) which is one transmission shaft of two transmission shafts of the transmission 20B. In addition, a second speed drive gear 22*a* and a fourth speed drive gear 24*a* which are even-numbered transmission gears are provided on a secondary intermediate shaft 16 (a primary transmission shaft) which is the other transmission shaft of the two transmission shafts. Further, a primary rotor 4 of an electric motor 2 is mounted on the secondary intermediate shaft 16. The primary main shaft 11 is connected to an engine 6 via a primary clutch 41 (a secondary engaging and disengaging device), and the secondary intermediate shaft 16 is connected to the engine 6 by a secondary clutch 42 (a secondary engaging and disengaging device) which is connected to a secondary main shaft 12.

More specifically speaking, the primary main shaft 11 is supported by a bearing 11*a* which is fixed to a casing, not shown, at an opposite end to an end facing the engine 6. A connecting shaft 13 is formed shorter than the secondary intermediate shaft 16 and hollow and is disposed relatively rotatable to the secondary intermediate shaft 16 and so as to cover the periphery of an opposite end of the secondary intermediate shaft 16 to an end facing the engine 6. The connecting shaft 13 is supported by a bearing 13*a* which is fixed to the casing, not shown. In addition, a second speed drive gear 22*a* is mounted on the connecting shaft 13 at an end facing the engine 6, and a secondary rotor 5 of an electric motor 2 on the connecting shaft 13 at an opposite end to the end facing the engine 6. Consequently, the secondary rotor 5 and the second speed drive gear 22*a* which are mounted on the connecting shaft 13 are configured to rotate together.

In addition, a primary rotor of the electric motor 2 is mounted on the secondary intermediate shaft 16 at the opposite end to the end facing the engine 6, whereby the transmission of power from a crankshaft 6*a* to the primary rotor can be controlled by engaging or disengaging the secondary clutch 42 which is connected to the secondary main shaft 12.

The same function and advantage as those of the first to third embodiments are also provided by the power output system 1C which is configured as has been described above.

The invention is not limited to the embodiments that have been described heretofore but can be altered, modified or improved as required.

For example, the electric motor is not limited to the electric motor 2 described in the embodiments, and hence, arbitrary electric motors such as an electric motor described in JP-2008-067592-A, for example, can be adopted, provided that the rotating speed of the primary rotor, the rotating speed of the secondary rotor and the revolving speed of the revolving magnetic field of the stator 3 maintain a collinear relation. JP-2008-067592-A is incorporated herein by reference.

In addition, a seventh speed drive gear, a ninth speed drive gear and so forth may be provided as odd-numbered transmission gears in addition to the third speed drive gear and the fifth speed drive gear. A sixth speed drive gear, an eighth speed drive gear and so forth may be provided as even-numbered transmission gears in addition to the second speed drive gear and the fourth speed drive gear.

This patent application is based on Japanese Patent Application (No. 2009-223210) filed on Sep. 28, 2009, the contents of which are incorporated herein by reference.

The invention claimed is:

1. A power output system comprising an internal combustion engine, an electric motor, and a transmission including two transmission shafts which are connected to the internal combustion engine,
- wherein the electric motor comprises
  - a stator which generates a revolving magnetic field,
  - a primary rotor which includes a plurality of magnetic pole portions and faces the stator in a radial direction, and
  - a secondary rotor which includes a plurality of magnetically soft portions and which is provided between the stator and the primary rotor and is configured so as to rotate while keeping a collinear relation between a revolving speed of a magnetic field of the stator, a rotating velocity of the primary rotor and a rotating velocity of the secondary rotor,
- wherein the primary rotor is connected to either of the two transmission shafts,
- wherein the secondary rotor is connected to a drive shaft, and
- wherein the other transmission shaft of the two transmission shafts transmits power to the drive shaft without involving the electric motor.

2. The system of claim 1, wherein the primary rotor has a row of magnetic poles which includes the plurality of magnetic pole portions which are provided in a predetermined number and are aligned in a predetermined direction and which is disposed so that any two adjacent magnetic poles have different polarities,
- wherein the stator has a row of armatures which is disposed so as to face the row of magnetic poles to generate the revolving magnetic field which moves in the predetermined direction between the row of magnetic poles and the stator itself by a predetermined number of armature magnetic poles which are generated in a plurality of armatures,
- wherein the secondary rotor has a row of magnetically soft portions which includes the magnetically soft portions which are provided in a predetermined number and are aligned at intervals in the predetermined direction and which is disposed so as to be positioned between the row of magnetic poles and the row of armatures, and
- wherein a ratio of the number of the armature magnetic poles to the number of the magnetic poles and to the number of the magnetically soft portions in a predetermined section along the predetermined direction is set to 1:m:(1+m)/2(m≠1,0).

3. The system of claim 2, further comprising a control unit for controlling the electric motor, wherein the control unit comprises a feedback control device for performing a control to reduce a deviation between a target current which is to be supplied to the electric motor and an actual current which is supplied to the electric motor on an orthogonal two-phase coordinates where a first phase and a second phase intersect orthogonally for each phase so as to output a command value for a voltage for each phase which is to be applied to the electric motor, and a decoupling control device for correcting a command value outputted for the second phase by the feedback control device by use of a component of the target current or the actual current which corresponds to the first phase and correcting a command value outputted for the first phase by the feedback control device by use of a component of the target current or the actual current which corresponds to the second phase on the orthogonal two-phase coordinates.

4. The system of claim 3, wherein the control unit supplies electric power to the stator so that the revolving magnetic field in a forward revolving direction is increased when the electric motor is driven.

5. The system of claim 4, wherein the control unit applies a generating equivalent torque in a reverse rotating direction to the stator so that the revolving magnetic field is reduced when the electric motor is driven for regeneration.

6. The system of claim 3, wherein either of the two transmission shafts is connected to the internal combustion engine via a first connecting device, wherein the other transmission shaft of the two transmission shafts is connected to the internal combustion engine via a second connecting device, and wherein at least one of the two transmission shafts and the internal combustion engine are connected to each other selectively.

7. The system of claim 6, wherein either of the two transmission shafts is a primary main shaft, and wherein a secondary main shaft which is shorter than the primary main shaft and is made hollow, and is disposed relatively rotatably on a periphery of the primary main shaft which is situated on an internal combustion side.

8. The system of claim 7, further comprising a primary intermediate shaft, wherein a first idle driven gear adapted to mesh with a first idle drive gear mounted on the secondary main shaft is mounted on the primary intermediate shaft.

9. The system of claim 8, further comprising a secondary intermediate shaft, wherein a second idle driven gear adapted to mesh with the first idle driven gear mounted on the primary intermediate shaft is mounted on the secondary intermediate shaft.

10. The system of claim 9, wherein an odd-numbered transmission gear is provided on the primary main shaft, and wherein an even-numbered transmission gear is provided on the secondary main shaft.

11. The system of claim 9, wherein an even-numbered transmission gear is provided on the primary main shaft, and wherein an odd-numbered transmission gear is provided on the secondary main shaft.

12. The system of claim 3, further comprising a required power setting device for setting a required power and an electric motor output detecting device for detecting an output of the electric motor, wherein, when an output of the electric motor that is detected by the electric motor output detecting device exceeds a rated output of the electric motor, the control unit drives the electric motor at the rated output thereof so as to control the revolution speed of the internal combustion engine.

13. The system of claim 12, further comprising an electric motor revolution speed detecting device for detecting a revolution speed of the electric motor, wherein, when the output of the electric motor that is detected by the electric motor output detecting device does not exceed the rated output of the electric motor and the revolution speed of the electric motor that is detected by the electric motor revolution speed detecting device exceeds a maximum revolution speed of the electric motor, the control unit drives the electric motor at the maximum revolution speed so as to control the revolution speed of the internal combustion engine.

14. The system of claim 13, wherein, when the output of the electric motor that is detected by the electric motor output detecting device does not exceed the rated output of the electric motor and the revolution speed of the electric motor that is detected by the electric motor revolution speed detecting device does not exceed the maximum revolution speed of the electric motor, the control unit drives the electric motor while keeping the internal combustion engine driven in a proper drive range.

15. The system of claim 1, further comprising a control unit for controlling the electric motor, wherein the control unit comprises a feedback control device for performing a control to reduce a deviation between a target current which is to be supplied to the electric motor and an actual current which is supplied to the electric motor on an orthogonal two-phase coordinates where a first phase and a second phase intersect orthogonally for each phase so as to output a command value for a voltage for each phase which is to be applied to the electric motor, and a decoupling control device for correcting a command value outputted for the second phase by the feedback control device by use of a component of the target current or the actual current which corresponds to the first phase and correcting a command value outputted for the first phase by the feedback control device by use of a component of the target current or the actual current which corresponds to the second phase on the orthogonal two-phase coordinates.

* * * * *